(12) United States Patent
Kondo

(10) Patent No.: US 11,179,824 B2
(45) Date of Patent: Nov. 23, 2021

(54) ELECTRIC WORKING MACHINE WITH HEAT RADIATION PLATE PORTION INTEGRALLY FORMED WITH CONNECTION PLATE PORTION CONNECTED TO TERMINAL OF BATTERY PACK TO RADIATE HEAT GENERATED AT CONNECTION PLATE PORTION

(71) Applicant: MAKITA CORPORATION, Anjo (JP)

(72) Inventor: Eiji Kondo, Anjo (JP)

(73) Assignee: MAKITA CORPORATION, Anjo (JP)

( * ) Notice: Subject to any disclaimer, the term of this patent is extended or adjusted under 35 U.S.C. 154(b) by 601 days.

(21) Appl. No.: 16/077,499

(22) PCT Filed: Feb. 16, 2017

(86) PCT No.: PCT/JP2017/005775
§ 371 (c)(1),
(2) Date: Aug. 13, 2018

(87) PCT Pub. No.: WO2017/142039
PCT Pub. Date: Aug. 24, 2017

(65) Prior Publication Data
US 2019/0262971 A1 Aug. 29, 2019

(30) Foreign Application Priority Data
Feb. 16, 2016 (JP) .............................. JP2016-026997

(51) Int. Cl.
*B24B 47/12* (2006.01)
*H01M 10/6551* (2014.01)
(Continued)

(52) U.S. Cl.
CPC ................ *B24B 47/12* (2013.01); *B25F 5/00* (2013.01); *H01M 10/0436* (2013.01);
(Continued)

(58) Field of Classification Search
CPC ......... B24B 47/12; B24B 23/028; B25F 5/00; H02J 7/00; H01M 10/6551;
(Continued)

(56) References Cited

U.S. PATENT DOCUMENTS 5,769,657 A * 6/1998 Kondo ................ H01M 50/213
439/500
9,954,418 B2 * 4/2018 Kawakami ............. H02K 7/145
(Continued)

FOREIGN PATENT DOCUMENTS

CN 1619876 A 5/2005
CN 102046335 A 5/2011
(Continued)

OTHER PUBLICATIONS

Jun. 25, 2019 Office Action issued in Japanese Patent Application No. 2018-500206.
(Continued)

*Primary Examiner* — John K Kim
(74) *Attorney, Agent, or Firm* — Oliff PLC

(57) ABSTRACT

An electric working machine according to one aspect of the present disclosure includes a terminal block electrically connected to a battery pack. The terminal block includes a positive electrode connecting terminal and a negative electrode connecting terminal. The positive electrode connecting terminal includes a plate-shaped positive electrode side connection plate portion that comes in contact with a positive electrode terminal of the battery pack, and the negative electrode connecting terminal includes a plate-shaped negative electrode side connection plate portion that comes in contact with a negative electrode terminal of the battery pack. At least one of the positive electrode side connection plate portion and the negative electrode side connection
(Continued)

plate portion is provided with a heat radiation plate portion in a thermal conductive manner.

6 Claims, 29 Drawing Sheets

(51) Int. Cl.
| | |
|---|---|
| *H01M 10/04* | (2006.01) |
| *H02K 5/22* | (2006.01) |
| *H02K 7/14* | (2006.01) |
| *H02K 9/06* | (2006.01) |
| *H02K 11/00* | (2016.01) |
| *B25F 5/00* | (2006.01) |
| *H02J 7/00* | (2006.01) |
| *B24B 23/02* | (2006.01) |

(52) U.S. Cl.
CPC ........... *H01M 10/6551* (2015.04); *H02J 7/00* (2013.01); *H02K 5/225* (2013.01); *H02K 7/145* (2013.01); *H02K 9/06* (2013.01); *H02K 11/0094* (2013.01); *B24B 23/028* (2013.01)

(58) Field of Classification Search
CPC ... H01M 10/0436; H02K 5/225; H02K 7/145; H02K 9/06; H02K 11/0094; Y02E 60/10
USPC ...................................................... 310/50, 71
See application file for complete search history.

(56) References Cited

U.S. PATENT DOCUMENTS

| | | | | |
|---|---|---|---|---|
| 9,978,541 | B2* | 5/2018 | Mizutani | B25F 5/00 |
| 10,328,567 | B2* | 6/2019 | Oktavec | B24B 23/028 |
| 10,630,135 | B2* | 4/2020 | Sengiku | H02K 5/225 |
| 11,047,528 | B2* | 6/2021 | Vanko | F16P 7/02 |
| 2006/0091858 | A1 | 5/2006 | Johnson et al. | |
| 2011/0180286 | A1 | 7/2011 | Oomori et al. | |
| 2013/0244504 | A1* | 9/2013 | Ogura | H01R 13/113 |
| | | | | 439/759 |
| 2014/0139055 | A1 | 5/2014 | Oomori et al. | |
| 2014/0338948 | A1* | 11/2014 | Hester | B25F 5/02 |
| | | | | 173/217 |
| 2014/0375269 | A1 | 12/2014 | Ogura | |
| 2015/0263579 | A1* | 9/2015 | Sengiku | H02K 3/52 |
| | | | | 310/50 |
| 2015/0263592 | A1* | 9/2015 | Kawakami | H02K 3/522 |
| | | | | 310/50 |
| 2015/0280516 | A1* | 10/2015 | Ekstrom | B23Q 5/041 |
| | | | | 173/93 |
| 2015/0280517 | A1* | 10/2015 | Ekstrom | B25F 5/008 |
| | | | | 173/170 |
| 2015/0326098 | A1* | 11/2015 | Hirata | B25F 5/02 |
| | | | | 310/50 |
| 2019/0262971 | A1* | 8/2019 | Kondo | H02K 7/145 |

FOREIGN PATENT DOCUMENTS

| | | |
|---|---|---|
| GB | 2 420 027 A | 5/2006 |
| GN | 103022580 A | 4/2013 |
| GN | 203942298 U | 11/2014 |
| GN | 104253466 A | 12/2014 |
| JP | S5674947 A | 6/1981 |
| JP | H1096462 A | 4/1998 |
| JP | 2004170877 A | 6/2004 |
| JP | 2005151794 A | 6/2005 |
| JP | 2006-142436 A | 6/2006 |
| JP | 2009-285787 A | 12/2009 |
| JP | 2013-070504 A | 4/2013 |
| JP | 2014-037018 A | 2/2014 |

OTHER PUBLICATIONS

Jan. 14, 2020 Office Action issued in Japanese Patent Application No. 2018-500206.

Aug. 21, 2018 International Preliminary Report on Patentability issued in Patent Application No. PCT/JP2017/005775.

Apr. 4, 2017 International Search Report issued in Patent Application No. PCT/JP2017/005775.

Oct. 12, 2020 Office Action issued in Chinese Patent Application No. 201780011369.4.

* cited by examiner

SECTION B-B

SECTION C-C

ELECTRIC WORKING MACHINE WITH HEAT RADIATION PLATE PORTION INTEGRALLY FORMED WITH CONNECTION PLATE PORTION CONNECTED TO TERMINAL OF BATTERY PACK TO RADIATE HEAT GENERATED AT CONNECTION PLATE PORTION

CROSS-REFERENCE TO RELATED APPLICATION

This international application claims the benefit of Japanese Patent Application No. 2016-026997 filed on Feb. 16, 2016 with the Japan Patent Office, and the entire disclosure of Japanese Patent Application No. 2016-026997 is incorporated herein by reference.

TECHNICAL FIELD

The present disclosure relates to a charging type electric working machine that is detachably attached with a battery pack and is operable by electric power supplied from the battery pack.

BACKGROUND ART

Various charging type electric working machines have been available, such as driver drills, grinders, hammer drills, and bush cutters. These charging-type electric working machines are attached with battery packs for use. Patent Document 1 discloses a configuration in which a tool body is attached with a battery pack and a terminal provided at a terminal holder of the tool body is connected to a terminal at the side of the battery pack. These connected terminals allow electric power supply from the battery pack to the tool body.

PRIOR ART DOCUMENTS

Patent Documents

Patent Document 1: Japanese Unexamined Patent Application Publication 2014-37018

SUMMARY OF THE INVENTION

Problems to be Solved by the Invention

In each electric working machine, as output of a distal end work tool increases, an amount of electric current supplied from the battery pack to the main body of the electric working machine also increases. Heat generation by the electric current also increases as the supplied current increases. Specifically, for example, the terminal of the electric working machine, which receives electric current supplied from the battery pack, shows increased heat generation.

When the heat generation of the terminal for receiving electric current increases, influence of the heat is likely to reach portions being in direct or indirect contact with the terminal. For example, when the terminal for receiving electric current is supported by resin, the resin is likely to melt from the heat.

According to an aspect of the present disclosure, it is preferable to improve a heat radiation performance of a terminal that receives electric power from a battery pack.

Means for Solving the Problems

The electric working machine according to one aspect of the present disclosure includes a mounting portion configured to be attachable to and detachable from a battery pack and a terminal block. The terminal block includes a positive electrode connecting terminal and a negative electrode connecting terminal. The positive electrode connecting terminal is a terminal connected to a positive electrode terminal of the battery pack when the battery pack is mounted on the mounting portion. The negative electrode connecting terminal is a terminal connected to a negative electrode terminal of the battery pack when the battery pack is mounted on the mounting portion. The connection herein refers to direct contact and electrically conductive.

The positive electrode connecting terminal includes a positive electrode side connection plate portion. The positive electrode side connection plate portion is a plate-shaped member configured to contact the positive electrode terminal when the battery pack is mounted on the mounting portion. The negative electrode connecting terminal includes a negative electrode side connection plate portion. The negative electrode side connection plate portion is a plate-shaped member configured to contact the negative electrode terminal when the battery pack is mounted on the mounting portion and is arranged at a distance relative to the positive electrode side connection plate portion so that a plate surface of the negative electrode side connection plate portion faces a plate surface of the positive electrode side connection plate portion in parallel. Here, the term of "parallel" is not limited to being parallel in strict meaning, and the components are not necessarily in parallel in strict meaning as far as the configuration yields the effects to be intended.

Further, at least one of the positive electrode side connection plate portion and the negative electrode side connection plate portion is a heat radiation object and a heat radiation plate portion being a plate-shaped member is provided at the at least one heat radiation object individually and in a thermally conductive manner.

Hereinafter, the positive electrode connecting terminal and the negative electrode connecting terminal can be in total referred to as "respective connecting terminals." The positive electrode side connection plate portion and the negative electrode side connection plate portion may be individually referred to as simply as "connection plate portion," and may be in total referred to as "connection plate portions."

Regarding the electric working machine configured as described above, the plate-shaped heat radiation plate portion is provided at at least one of the heat radiation objects being the connection plate portions each in a plate shape and facing each other. Accordingly, heat generated at the connecting terminal provided with the heat radiation member is not only radiated from the connection plate portion but also is conducted to the heat radiation plate portion so as to be radiated from the heat radiation plate portion. Therefore, according to the above-described configured electric working machine, it is possible to improve heat radiation performance of the respective connecting terminals that receive electric power from the battery pack.

The electric working machine may include a load portion. The load portion is configured to operate by electric power supplied from the battery pack when the battery pack is mounted on the mounting portion. The positive electrode connecting terminal may include a positive electrode side power supply extension, and the negative electrode connecting terminal may include a negative electrode side power supply extension. The positive electrode side power supply extension is provided extending from the positive electrode side connection plate portion and is connected to a wire for supplying the electric power of the battery pack to the load portion. The negative electrode side power supply extension is provided extending from the negative electrode side connection plate portion and is connected to a wire for supplying the electric power of the battery pack to the load portion.

According to such configuration, it is possible to favorably supply the electric power of the battery pack to the load portion. Further, it is possible to radiate heat from the respective power supply extensions, so that heat radiation performance of the entire connecting terminal is improved.

The heat radiation plate portion provided at the at least one heat radiation object may extend integrally from the heat radiation object corresponding thereto. In such configured electric working machine, the connecting terminal including the heat radiation plate portion may be formed integrally including the heat radiation plate portion. Accordingly, it is possible to reduce the manufacturing man-hours and manufacturing costs of the connecting terminal having the heat radiation plate portion.

The term "extension" of the heat radiation plate portion relative to the heat radiation object includes both ideas: one is that the heat radiation plate portion is formed separately from the heat radiation object and both are connected to each other in thermally conductive manner by a predetermined connecting method, and the other one is that both are formed integrally as a single component.

The heat radiation plate portion provided at the at least one heat radiation object may be configured in a manner that a plate surface of the heat radiation plate portion is in non-parallel to the plate surface of the heat radiation object corresponding thereto and the heat radiation plate portion faces the battery pack when the battery pack is mounted on the mounting portion. The term "facing the battery pack" refers to that the battery pack exists in a direction as seen from at least one viewpoint on the plate surface in a direction vertical to the plate surface.

The heat radiation plate portion provided at the at least one heat radiation object may be configured so as to exist within a range between a plane including the plate surface of the positive electrode side connection plate portion and a plane including the plate surface of the negative electrode side connection plate portion. According to the electric working machine configured as described above, downsizing of the terminal block is allowed, and thus it is possible to inhibit the electric working machine from enlarging resulting from the downsized terminal block. The heat radiation plate portion provided at the at least one heat radiation object may include a machine side resin portion. The machine side resin portion is an insulating member (i.e., an insulator) including a resin and is configured so as to cover a machine side plate surface being a plate surface of the heat radiation plate portion provided at the at least one heat radiation object and not facing the battery pack when the battery pack is mounted on the mounting portion.

According to the electric working machine configured as described above, at least a range of the machine side plate surface of the heat radiation plate portion covered by the machine side resin portion is inhibited from direct contact with the exterior of the terminal block. Therefore, it is possible to improve insulation performance between the heat radiation plate portion and the exterior of the terminal block.

As described above, when the machine side plate surface of the heat radiation plate portion is covered by the machine side resin portion, a surface of the machine side resin portion may include at least one recess. When the machine side plate surface is seen in its vertical direction, a portion having the recess is recessed to the side of the heat radiation plate portion more than a portion not having the recess. A surface area of the machine side resin portion is hence increased by the amount of the recess.

Accordingly, the provision of the recess at the machine side resin portion enables to improve heat radiation performance from the heat radiation plate portion via the machine side resin portion. When the machine side resin portion includes at least one recess, at least one of them may penetrate the machine side resin portion. That is, the at least one recess may not only recessed merely but also penetrate the machine side resin portion fully. The provision of the recess penetrating the machine side resin portion generates a state in which the heat radiation plate portion is exposed through the recess, i.e., a space at the obverse side of the machine side resin portion and the heat radiation plate portion at the reverse side is made in communication with each other via the recess.

Accordingly, because the recess penetrates the machine side resin portion, it is possible to improve heat radiation performance at the heat radiation plate portion.

The surface of the machine side resin portion may include at least one convex portion. When the machine side plate surface is viewed from the vertical direction, the portion having the convex portion protrudes toward the side opposite to the heat radiation plate portion more than the portion not having the convex portion. Accordingly, the surface area of the machine side resin portion is increased by the protrusion amount.

Therefore, because of the convex portion provided at the machine side resin portion, it is possible to improve heat radiation performance from the heat radiation plate portion via the machine side resin portion.

The heat radiation plate portion may be provided with a pack side resin portion in addition to the machine side resin portion. The pack side resin portion is an insulating member including a resin and is configured so as to cover a pack side plate surface being a plate surface of the heat radiation plate portion provided at the at least one heat radiation object and facing the battery pack when the battery pack is mounted on the mounting portion.

According to the electric working machine configured as described above, the heat radiation plate portion includes the pack side resin portion at the pack side plate surface in addition to the machine side resin portion at the machine side plate surface. Accordingly, it is possible to further improve insulation performance between the heat radiation plate portion and the outside of the terminal block.

The pack side plate surface of the heat radiation plate portion provided at the at least one heat radiation object may be configured to be fully covered by the pack side resin portion and may be in non-communication with an outside of the terminal block. Because the pack side plate surface is fully covered by the pack side resin portion, the pack side plate surface is not exposed. As a result, it is possible to inhibit electrical contact from the outside through the pack side plate surface and to further improve insulation performance between the heat radiation plate portion and the outside of the terminal block.

The positive electrode side connection plate portion and the negative electrode side connection plate portion each may be the heat radiation object. Specifically, the positive electrode side connection plate portion may be provided with a positive electrode side heat radiation plate portion as the heat radiation plate portion, and the negative electrode side connection plate portion may be provided with a negative electrode side heat radiation plate portion as the heat radiation plate portion. As described above, because the respective connection plate portions are provided with the respective heat radiation plate portions, it is possible to further improve heat radiation performance of the entire terminal block.

The positive electrode side heat radiation plate portion may be provided extending from the positive electrode side connection plate portion in a direction perpendicular to the plate surface of the positive electrode side connection plate portion, the negative electrode side heat radiation plate portion may be provided extending from the negative electrode side connection plate portion in a direction perpendicular to the plate surface of the negative electrode side connection plate portion, and the positive electrode side heat radiation plate portion and the negative electrode side heat radiation plate portion may be provided in a manner that at least a part of the plate surface of the positive electrode side heat radiation plate portion and at least a part of the plate surface of the negative electrode side heat radiation plate portion are positioned on the same plane. Here, the term "vertical" is not limited to being vertical in strict meaning, and the components are not necessarily to be vertical in strict meaning as far as the configuration yields the effects to be intended. The same is applied to "the same plane."

According to the electric working machine configured as described above, because the respective heat radiation plate portions are arranged on the same plane, downsizing of the terminal block is allowed, and thus it is possible to inhibit the electric working machine from enlarging resulting from the downsized terminal block.

A contact restraining portion being an insulating member that restrains contact between the positive electrode side heat radiation plate portion and the negative electrode side heat radiation plate portion may be provided between the positive electrode side heat radiation plate portion and the negative electrode side heat radiation plate portion while being in contact with both of the positive electrode side heat radiation plate portion and the negative electrode side heat radiation plate portion.

According to the electric working machine configured as described above, the contact between the positive electrode side heat radiation plate portion and the negative electrode side heat radiation plate portion is inhibited. As a result, insulation of both of the heat radiation plate portions are maintained favorably and short of both of the heat radiation plate portions is inhibited.

The heat radiation plate portion provided at the at least one heat radiation object may be provided in a manner that the plate surface of the heat radiation plate portion is in parallel to the plate surface of the heat radiation object corresponding thereto. In this case, the electric working machine may include a terminal holding member that is an insulating member including resin and holds the positive electrode connecting terminal and the negative electrode connecting terminal. The positive electrode side connection plate portion and the negative electrode side connection plate portion may protrude relative to the terminal holding member in the same direction from the terminal holding member. The heat radiation plate portion provided at the at least one heat radiation object may protrude relative to the terminal holding member in a direction opposite to the direction in which the positive electrode side connection plate portion and the negative electrode side connection plate portion protrude.

According to such configuration, the heat radiation plate portion protrudes to the inner space of the electric working machine from the terminal holding member. Therefore, it is possible to favorably radiate heat to the inner space of the electric working machine.

At least a part of the heat radiation plate portion provided at the at least one heat radiation object may include a curved shape. As described above, because the heat radiation plate portion is configured not as a single flat plate but as to include a curved shape, it is possible to increase the surface area of the heat radiation plate portion. It is thus possible to improve heat radiation performance from the heat radiation plate portion.

The heat radiation plate portion provided at the at least one heat radiation object may be folded back in a U-shape. According to this configuration, the heat radiation plate portion has a surface area greater than a heat radiation plate portion formed in a single flat-plate shape. As a result, it is possible to improve heat radiation performance from the heat radiation plate portion.

A plate thickness of at least a part of the heat radiation plate portion provided at the at least one heat radiation object may be greater than a plate thickness of the heat radiation object corresponding thereto. Such increase in the plate thickness of the heat radiation plate portion allows increase in heat capacity capable of being conducted from the heat radiation object to the heat radiation plate portion. Further, such increase in the plate thickness increases a surface area of the heat radiation plate portion. As a result, such configuration also enables to improve heat radiation performance from the heat radiation plate portion.

The plate surface of the heat radiation plate portion provided at the at least one heat radiation object may have an area greater than the plate surface of the heat radiation object corresponding thereto.

According to the electric working machine configured as described above, the area of the plate surface of the heat radiation plate portion is greater than the area of the plate surface of the connection plate portion corresponding thereto. Accordingly, it is possible to favorably radiate heat generated at the heat radiation object from the heat radiation plate portion. Therefore, it is possible to supply the terminal block having higher heat radiation performance.

The terminal block may further include a signal connecting terminal. The signal connecting terminal is a terminal configured to be connected to a terminal for signal input and output provided at the battery pack when the battery pack is mounted on the mounting portion. The signal connecting terminal includes a signal connecting portion configured to come in contact with the terminal for signal input and output when the battery pack is mounted on the mounting portion. The signal connecting portion may be configured in a manner that at least a part of the signal connecting portion is positioned within a range between the positive electrode side connection plate portion and the negative electrode side connection plate portion where both of them face each other. Here, the term of "being positioned within a range where both of them face each other" refers to that at least a part of the signal connecting portion is interposed between the respective connection plate portions. In other words, the at least the part of the signal connecting portion exists in directions vertical to the plate surfaces of the respective connection plate portions. Further, the term "signal" refers to at least one of signals which are outputted from the inside of the electric working machine to the battery pack and signals which are outputted from the battery pack to the inside of the electric working machine.

According to the electric working machine configured as described above, the signal connecting terminal is provided in a manner that at least the part of the signal connecting portion configuring the signal connection plate portion is positioned within the opposing range of the respective connection plate portions. That is, the space between the respective connection plate portions is effectively used as at least a part to arrange and position therein the signal connecting portion. Accordingly, it is possible to supply the terminal block having the signal connecting terminal, the terminal block which is inhibited from enlarging.

The terminal block may include a terminal holding member, and the electric working machine may include a housing and a heat radiation member. The terminal holding member is an insulating member including a resin and is configured to hold the positive electrode connecting terminal and the negative electrode connecting terminal. The housing is provided with the mounting portion and the terminal block. The heat radiation member is provided to contact both of the terminal holding member and the housing and is configured to radiate heat generated at the terminal block to the housing. According to this configuration, it is possible to radiate heat generated at the terminal block to the housing via the heat radiation member.

When a controller is further provided inside the housing in the situation where the terminal block includes a terminal holding member and the electric working machine includes a housing and a heat radiation member, the heat radiation member may be configured to radiate heat to the controller. The controller is configured to control electric power supply from the battery pack to the load portion. The heat radiation member is provided to contact both of the terminal holding member and the controller and is configured to radiate heat generated at the terminal block to the controller. According to such configuration, it is possible to radiate heat generated at the terminal block to the controller via the heat radiation member.

The terminal holding member may include at least one rib that restrains movement of the heat radiation member in a specific direction. The heat radiation member may be configured to be arranged to the terminal holding member at a specific position defined by the at least one rib. According to such configuration, it is possible to position stably the heat radiation member relative to the terminal block.

The electric working machine configured as described above may be provided with a housing provided with the mounting portion, a motor housed in the housing, and a fan housed in the housing. The motor is one of the load portions and is configured to operate by electric power supplied from the battery pack via the terminal block. The fan is configured to rotate by rotational driving force of the motor to send cooling wind to the motor. The housing includes an opening where the terminal block is provided. The terminal block is provided to the housing to close the opening. The housing is a casing or a part of the casing configuring the electric working machine. The housing is a member formed with a space for housing therein various components such as the motor and the fan.

According to the electric working machine configured as described above, it is possible to favorably radiate heat generated at the terminal block to the inner space of the housing. The terminal block may be provided to the housing to fully close the opening or to partially close the opening, i.e., to maintain a communication between the internal space and the external space of the housing via the opening.

The fan and the terminal block may be provided to the housing in a manner that wind generated by the fan blows against the terminal block inside the housing. That is, when an air flow is generated inside the housing resulting from the rotation of the fan, it may be configured that the flowing air comes in contact with the terminal block.

According to the electric working machine configured as described above, it is possible to accelerate the heat radiation from the terminal block to the inside of the housing by the wind generated by the fan. Accordingly, it is possible to enhance heat radiating performance to the inside of the housing.

More specifically, the fan and the terminal block may be provided to the housing in a manner that the terminal block is positioned on an axis of a rotational shaft of the fan. Alternatively, the fan and the terminal block may be provided in a manner that the terminal block exists at a position separated from the axis of the rotational shaft of the fan in a direction. According to the former, the fan and the terminal block are in a positional relationship that the rotational shaft of the fan abuts at the terminal block when the rotational shaft of the fan extends in the axial direction. According to the latter, the terminal block is not on the axis of the rotational shaft of the fan.

The positional relationship between the fan and the terminal block may be either the former or the latter described above in response to the type, function, or the like, of the electric working machine. In any cases, it is possible to obtain good heat radiation performance from the terminal block to the inside of the housing.

Here, the fan for cooling the motor is referred to as a first fan. The electric working machine may be provided with a second fan in addition to the first fan. The second fan is housed in the housing and is configured to send cooling air to the terminal block by being operated by electric power supplied from the battery pack via the terminal block. According to such configuration, it is possible to rapidly and efficiently cool the terminal block.

BRIEF DESCRIPTION OF THE DRAWINGS

FIG. 4 is a view illustrating a terminal block according to the first embodiment.

FIG. 6 is a view illustrating connecting terminals of the terminal block of the first embodiment.

FIG. 7 is a view illustrating a terminal holding member of the terminal block of the first embodiment.

FIG. 9 is a view illustrating the battery pack having a cover portion removed.

FIG. 12 is a view illustrating connecting terminals of a terminal block according to a fourth embodiment.

FIG. 13 is a view illustrating the terminal block of the fourth embodiment.

FIG. 14 is a view illustrating connecting terminals of a terminal block according to a fifth embodiment.

FIG. 16 is a view illustrating connecting terminals of a terminal block according to a sixth embodiment.

FIG. 18 is a view illustrating connecting terminals of a terminal block of a seventh embodiment.

FIG. 19 is a view illustrating the terminal block of the seventh embodiment.

FIG. 26 is a view illustrating connecting terminals of the terminal block of the tenth embodiment.

EXPLANATION OF REFERENCE NUMERALS

1 . . . grinder, 2, 101, 201, 241, 271, 301 . . . machine body, 3 . . . opening, 4 . . . intake port, 5, 105, 202, 242, 272, 302 . . . housing, 9, 108, 203, 243, 273, 303 . . . battery mounting portion, 10 . . . vent hole, 11, 121, 211 . . . motor, 12, 123, 213 . . . fan, 13, 124, 246 . . . controller, 15, 70, 75, 135, 155, 175, 225, 255 . . . terminal block, 16, 76, 136, 156, 176, 226, 256 . . . terminal holding member, 17, 71, 77, 137, 157 . . . machine side resin portion, 18 . . . penetrating hole, 19, 79, 139, 159 . . . pack side resin portion, 21, 81, 141, 161, 181, 261 . . . positive electrode connecting terminal, 21a . . . positive electrode side connection plate portion, 21b . . . positive electrode side connecting portion, 21c . . . positive electrode side lead connecting portion, 21d, 81a, 141a, 161a, 181a . . . positive electrode side heat radiation plate portion, 22, 82, 142, 162, 182, 262 . . . negative electrode connecting terminal, 22a . . . negative electrode side connection plate portion, 22b . . . negative electrode side connecting portion, 22c . . . negative electrode side lead connecting portion, 22d, 82a, 142a, 162a, 182a . . . negative electrode side heat radiation plate portion, 23 . . . signal connecting terminal, 23a . . . signal side connection plate portion, 23b . . . signal side connecting portion, 23c . . . signal side lead connecting portion, 38, 89, 149, 169 . . . contact restraining portion, 41, 42 . . . rear-end directional air path, 43 . . . front-end directional air path, 46 . . . positive electrode lead wire, 47 . . . negative electrode lead wire, 48 . . . signal lead wire, 50 . . . battery pack, 57 . . . battery, 60 . . . terminal block opposing surface, 66 . . . positive electrode terminal, 67 . . . negative electrode terminal, 68 . . . signal terminal, 72 . . . convex portion, 100, 200, 240, 270, 300 . . . driver drill, 115 . . . upper side intake port, 116 . . . lower end side intake port, 117 . . . exhaust port, 131, 132 . . . motor side cooling air passage, 133 . . . terminal block-side cooling air path, 177 . . . resin portion, 206 . . . exhaust port, 216, 236, 247 . . . heat radiation sheet, 230 . . . sheet arrangement region, 231-234 . . . rib, 257, 258 . . . heat radiation supporting portion, 259, 260 . . . heat radiation member, 277, 278 . . . main body side supporting portion, 302b . . . cover portion, 306 . . . lower intake port, 307 . . . lower exhaust port, 309 . . . auxiliary fan, 310 . . . inflow air path, 311 . . . discharge air path.

MODE FOR CARRYING OUT THE INVENTION

Exemplary embodiments of the present disclosure will be described herein below with reference to drawings.

Embodiment 1

(1) The Whole Configuration of Grinder

Figure 1:
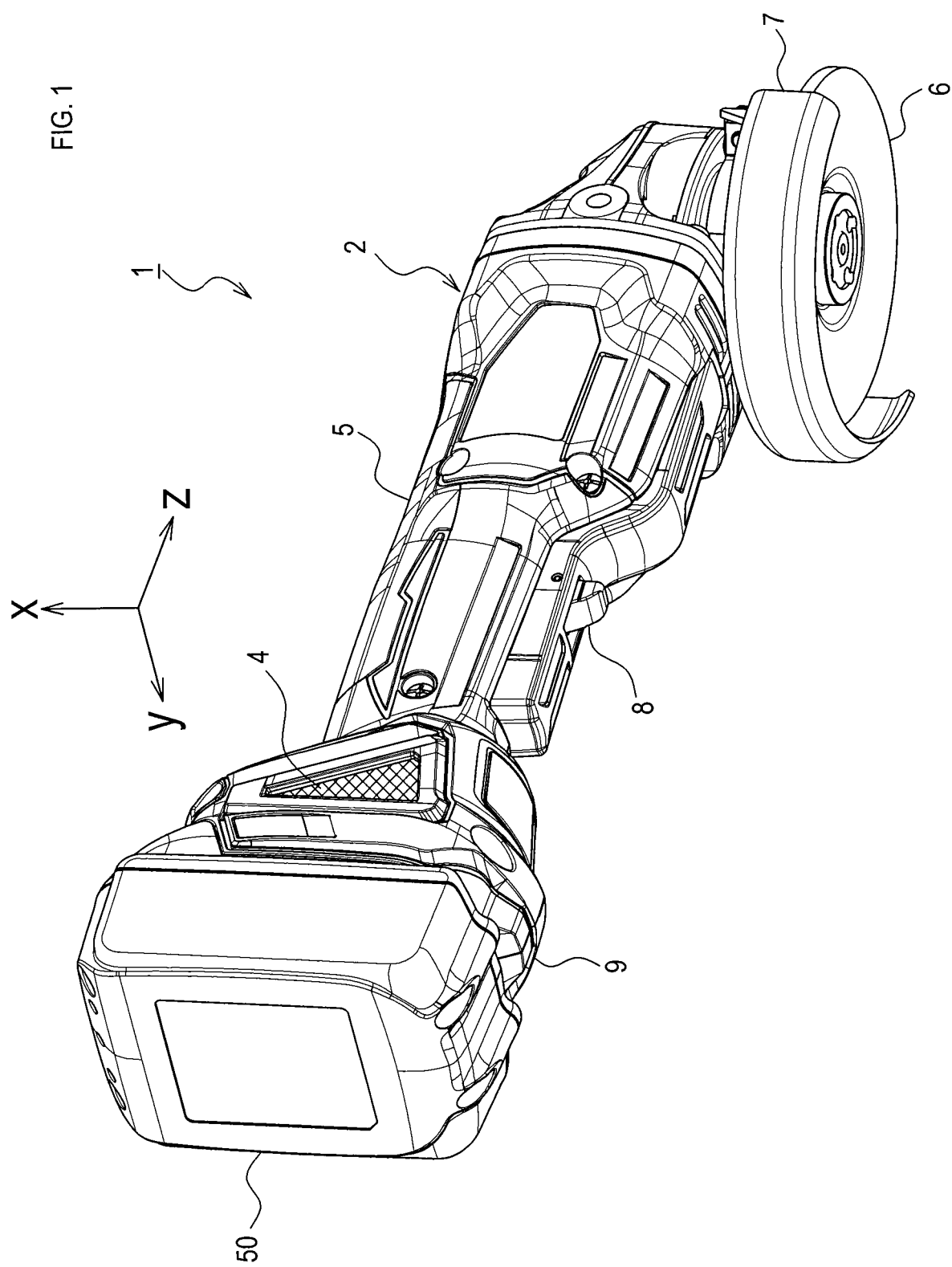
FIG. 1 is a perspective view of a grinder according to a first embodiment, in which a machine body is attached with a battery pack.
Figure 2:
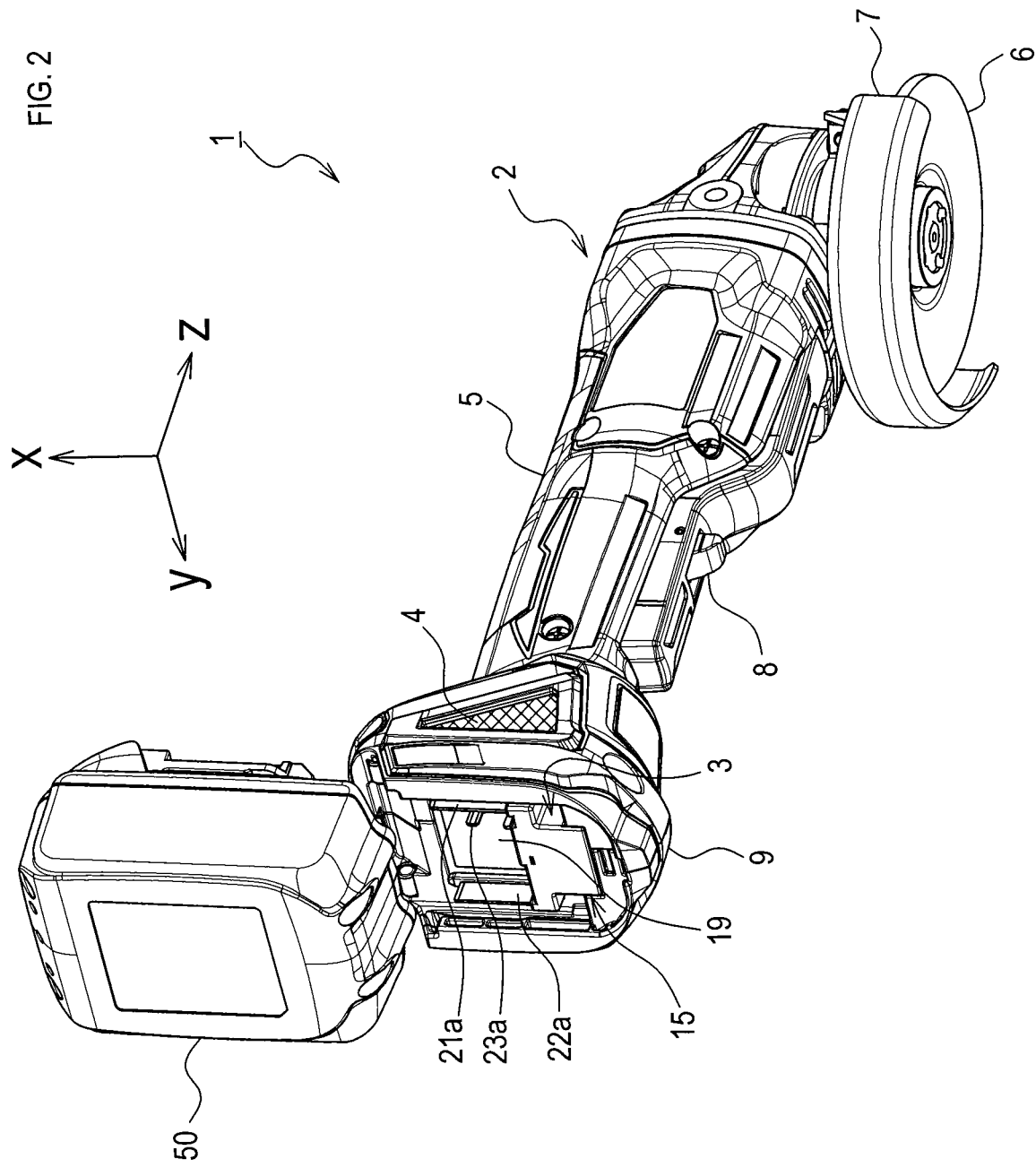
FIG. 2 is a perspective view of the grinder according to the first embodiment, in which the battery pack is detached from the machine body.
Figure 3:
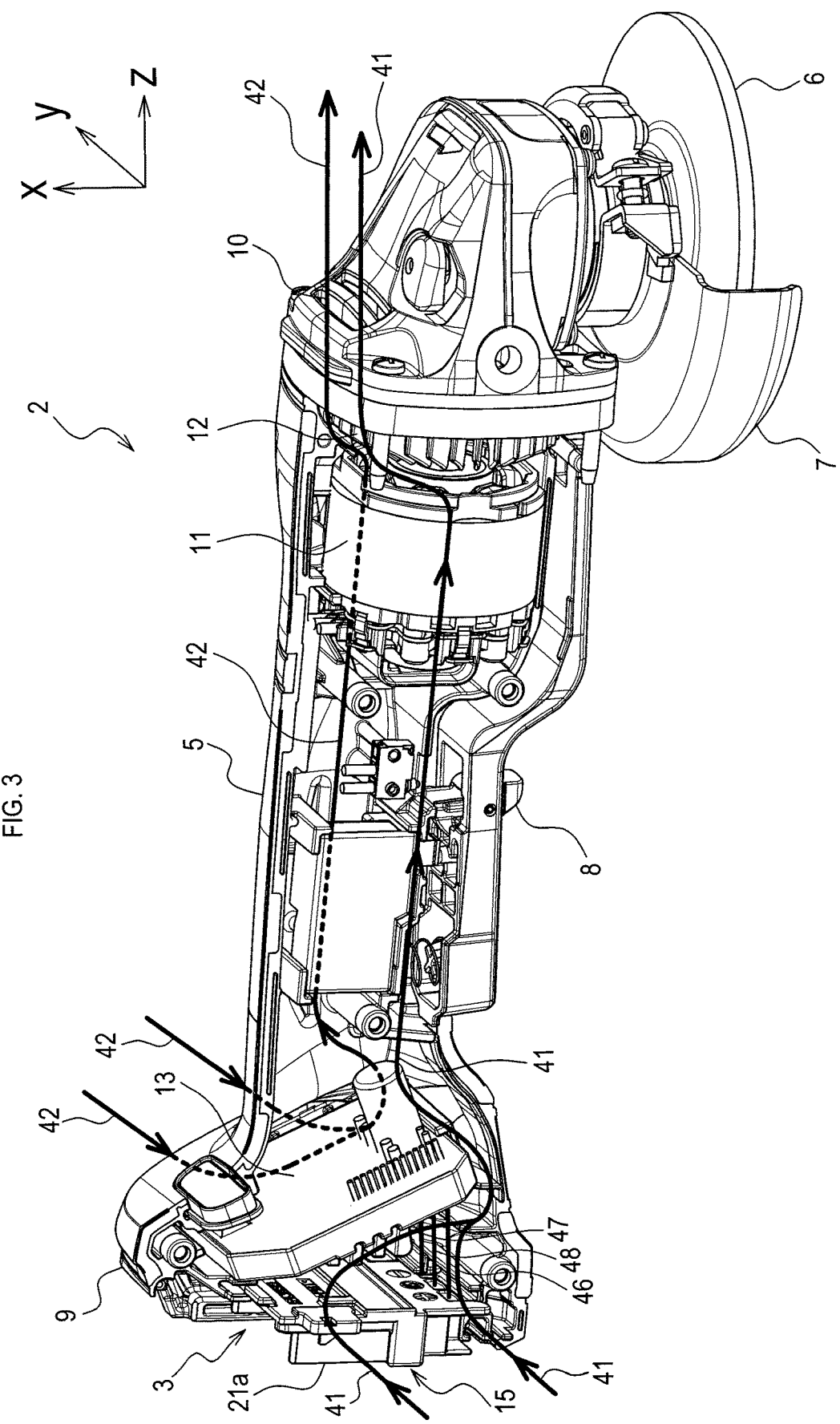
FIG. 3 is a perspective view illustrating an inside of the machine body of the grinder according to the first embodiment.

According to the first embodiment, a grinder 1 illustrated in FIGS. 1, 2, and 3 will be described as an example of an electric working machine. The grinder 1 is an electric working machine that is able to process workpieces, such as grinding, polishing, cutting, and so on. As illustrated in FIGS. 1 and 2, the grinder 1 includes a machine body 2 and a battery pack 50. FIG. 3 illustrates the machine body 2 only. Detailed configuration of the battery pack 50 will be illustrated in FIGS. 8A, 8B, 9A, and 9B.

As illustrated in FIGS. 1, 2, and 3, the machine body 2 includes a housing 5, a distal end work tool 6, a cover 7, and an operation switch 8. As illustrated in FIG. 3, housed inside the housing 5 are a motor 11, a fan 12, and a controller 13.

The housing 5 is an approximately cylindrically shaped member and is a part of a casing for the grinder 1. The motor 11 and the fan 12 are housed at the front end side inside the housing (right side in FIG. 3), while the controller 13 is housed at the rear end side inside the housing (left side in FIG. 3).

Attached to the side surface at the rear end side of the housing 5 is a battery mounting portion 9 to be mounted with the battery pack 50. The battery pack 50 is configured to be attached to and detached from the battery mounting portion 9. The battery pack 50 houses a battery 57 (see FIGS. 9A and 9B) therein. As illustrated in FIG. 1, when the battery pack 50 is mounted on the machine body 2, electric power of the battery 57 is able to be supplied from the battery pack 50 to the machine body 2. Electrical loads inside the machine body 2, including the controller 13 and the motor 11, are configured to operate according to the electric power supplied from the battery 57.

As illustrated in FIGS. 2 and 3, an opening 3 is also provided at the side surface at the rear end side of the housing 5. Further, at the rear end side of the housing 5, a terminal block 15 is provided in a manner of closing the opening 3. When the terminal block 15 is not provided at the opening 3, internal and external spaces of the housing 5 mutually communicate via the opening 3. The terminal block 15 may be provided to the housing 5 to fully close the opening 3 or to partially close the opening 3, i.e., to maintain a communication between the internal space and the external space of the housing 5.

As illustrated in FIG. 2, the terminal block 15 includes a positive electrode side connection plate portion 21a, a negative electrode side connection plate portion 22a, and a signal side connection plate portion 23a. As illustrated in FIG. 3, inside the machine body 2, a positive electrode lead wire 46, a negative electrode lead wire 47, and a signal lead wire 48 are connected between the terminal block 15 and the controller 13. The positive electrode side connection plate portion 21a of the terminal block 15 is connected to the controller 13 via the positive electrode lead wire 46, the negative electrode side connection plate portion 22a is connected to the controller 13 via the negative electrode lead wire 47, and the signal side connection plate portion 23a is connected to the controller 13 via the signal lead wire 48.

When the machine body 2 is mounted with battery pack 50, the positive electrode side connection plate portion 21a of the terminal block 15 is electrically connected to positive electrode terminals 66 (see FIG. 8B) of the battery pack 50, the negative electrode side connection plate portion 22a of the terminal block 15 is electrically connected to negative electrode terminals 67 (see FIG. 8B) of the battery pack 50, and the signal side connection plate portion 23a of the terminal block 15 is electrically connected to signal terminals 68 (see FIG. 8B) of the battery pack 50. Accordingly, electric power of the battery 57 inside the battery pack 50 is able to be supplied to electric loads including the controller 13 and the motor 11 inside the machine body 2. Further, signals are transmitted between the battery pack 50 and the controller 13.

The distal end work tool 6 is a member that comes in direct contact with a work object and proceeds working the work object. The distal end work tool 6 is rotatably driven by the motor 11 housed in the housing 5. The distal end work tool 6 of the grinder 1 are exemplified by a grinding stone, cutting stone, wire brush, and so on.

The cover 7 is provided for protecting an operator from scattering of broken pieces of the workpiece or the distal end work tool 6 that may occur when the distal end work tool 6 proceeds grinding, polishing, cutting, or the like. The cover 7 of the first embodiment is formed in an approximately semicircular shape in a manner of covering a part of an outer periphery (e.g., approximately half) of the distal end work tool 6.

The operation switch 8 is a switch operated by the operator in order to rotate the distal end work tool 6. When the operation switch 8 is pressed by the operator, the motor 11 is driven and the distal end work tool 6 is then rotatably driven.

The motor 11 is a driving source to drive the distal end work tool 6. When the motor 11 is driven for rotation, the rotation is transmitted to the distal end work tool 6 via a rotation transmitting mechanism that is not illustrated. As a result, the distal end work tool 6 is rotated. The motor 11 of the first embodiment is a brushless motor, for example. The motor 11 may be motors other than the brushless motor.

The controller 13 is operated by the electric power of the battery 57 and controls driving the motor 11. When the operation switch 8 is pressed by the operator, the controller 13 energizes the motor 11 so as to rotate the motor 11.

The fan 12 is provided to send cooling air to the motor 11 and is configured to rotate by rotational driving force of the motor 11. The fan 12 is provided closer to the front end side of the housing 5 than the motor 11 is.

The terminal block 15 and the controller 13 are provided positioning on an axis of a rotational shaft of the fan 12 in the housing 5. That is, the fan 12, the controller 13, and the terminal block 15 are in a positional relation with each other in which an extension of the rotational shaft of the fan 12 to the rear end side in the axial direction (z-axis direction in FIG. 3) penetrates the controller 13 and the terminal block 15 in order.

As illustrated in FIGS. 1 and 2, intake ports 4 are provided at both side surfaces in the y-axis direction at the rear end side of the housing 5 As illustrated in FIG. 3, a vent hole 10 is provided at the front end side of the housing.

Therefore, when the fan 12 rotates, cooling air passages 41 and 42, for example as illustrated in FIG. 3, are formed in the inner space of the housing 5. That is, when the fan 12 rotates, air flows are generated along the cooling air passages 41 and 42, in which air flows in to the housing 5 from the intake ports 4 and flows out of the housing 5 via the vent hole 10.

Therefore, when the fan 12 rotates, air is generated along the cooling air passages 41 and 42 by the fan rotation, and the air not only cools the motor 11 but also blows against the controller 13 and the terminal block 15 appearing on the air passages so as to cool the controller 13 and the terminal block 15. Regarding the terminal block 15, the air abuts on a surface side opposing to the inner space of the housing 5. Cooling effect is therefore improved by heat radiation specifically at the surface side of the terminal block 15.

(2) Configuration of Terminal Block

Figure 4A:
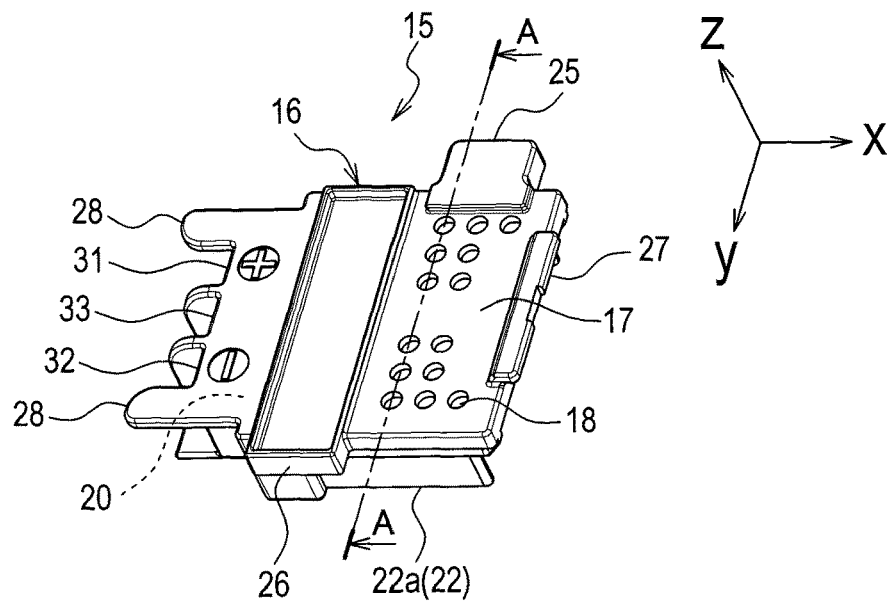
FIG. 4A is an upper perspective view.
Figure 4B:
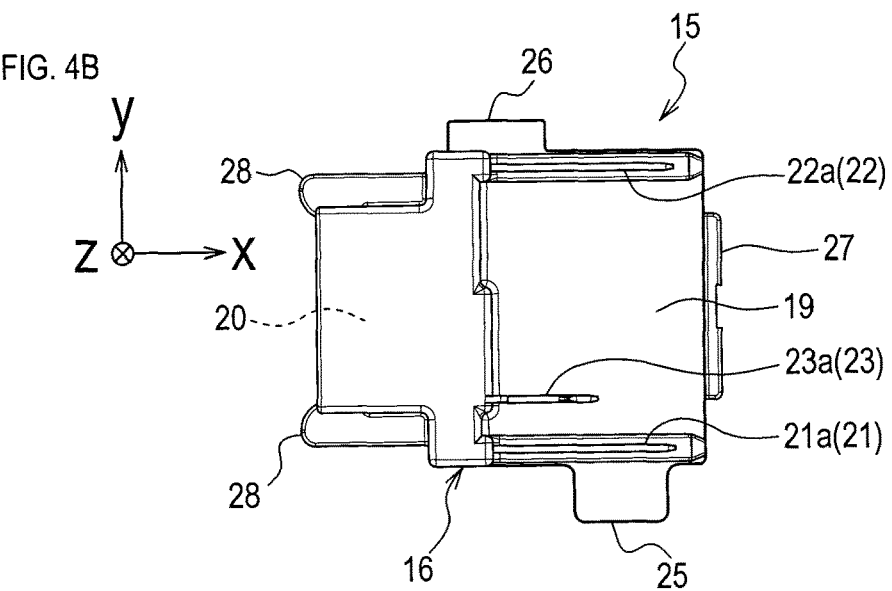
FIG. 4B is a bottom view.
Figure 4C:
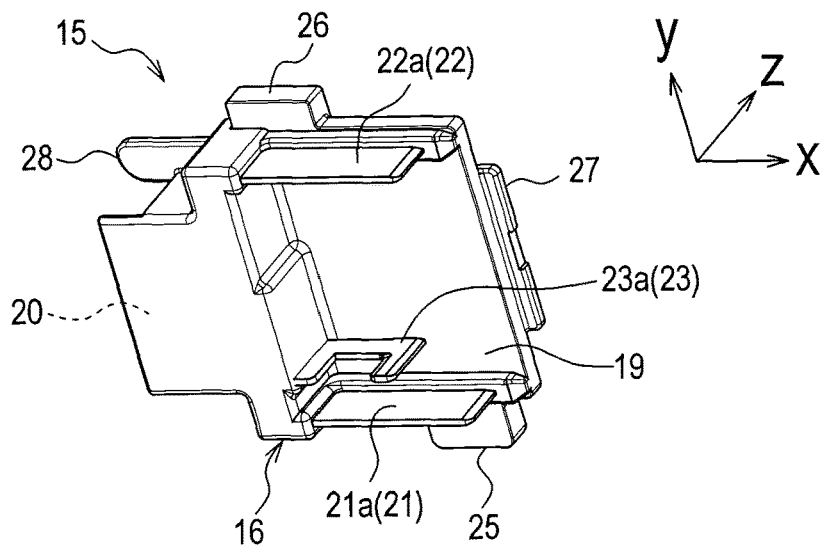
FIG. 4C is a lower perspective view.

The configuration of the terminal block 15 will be described in detail. As illustrated in FIGS. 4A, 4B, and 4C, the terminal block 15 includes a terminal holding member 16, a positive electrode connecting terminal 21, a negative electrode connecting terminal 22, and a signal connecting terminal 23. These connecting terminals 21, 22, and 23 are all conductors.

FIGS. 4A, 4B, and 4C illustrate the negative electrode side connection plate portion 22a that is a part of the negative electrode connecting terminal 22. FIGS. 4B and 4C illustrate the positive electrode side connection plate portion 21a, which is a part of the positive electrode connecting terminal 21, and the signal side connection plate portion 23a, which is a part of the signal connecting terminal 23, as well as the negative electrode side connection plate portion 22a. The positive electrode side connection plate portion 21a and the negative electrode side connection plate portion 22a are both rectangular-shaped plate members and are arranged in a manner that plate surfaces of the connection plate portions 21a and 22a face each other. The connecting terminals 21, 22, and 23 are held by the terminal holding member 16 in a positional relationship illustrated in FIGS. 4B, 4C, and 5.

Here, directions of the x-axis, y-axis, and z-axis are defined based upon the connecting terminals 21, 22, and 23 held by the terminal block 15. As illustrated in FIGS. 4A, 4B, and 4C, the left and right direction in each drawing, i.e., axes in the long-side directions of the positive electrode side connection plate portion 21a and the negative electrode side connection plate portion 22a is determined as the x-axis. The up and down direction in FIG. 4B, i.e., axis in a direction, in which the positive electrode side connection plate portion 21a faces the negative electrode side connection plate portion 22a, is determined as the y-axis. The axis perpendicular to the x-axis and y-axis is determined as the z-axis. The directions of the x-, y-, and z-axes illustrated in the drawings other than FIGS. 4A, 4B, and 4C are determined based upon the terminal block 15 in the same manner as FIGS. 4A, 4B, and 4C.

Described below with reference to FIGS. 6A, 6B, and 6C will be the positive electrode connecting terminal 21, the negative electrode connecting terminal 22, and the signal connecting terminal 23.

Figure 6A:
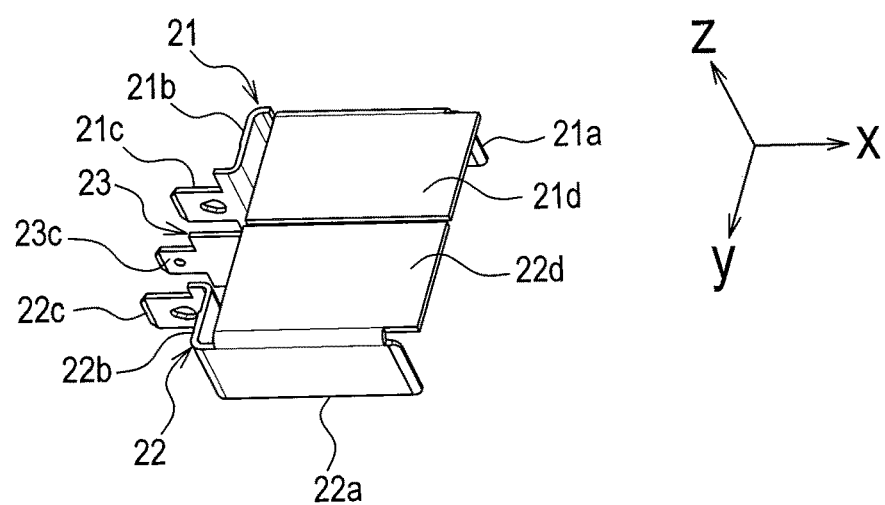
FIG. 6A is an upper perspective view.
Figure 6B:
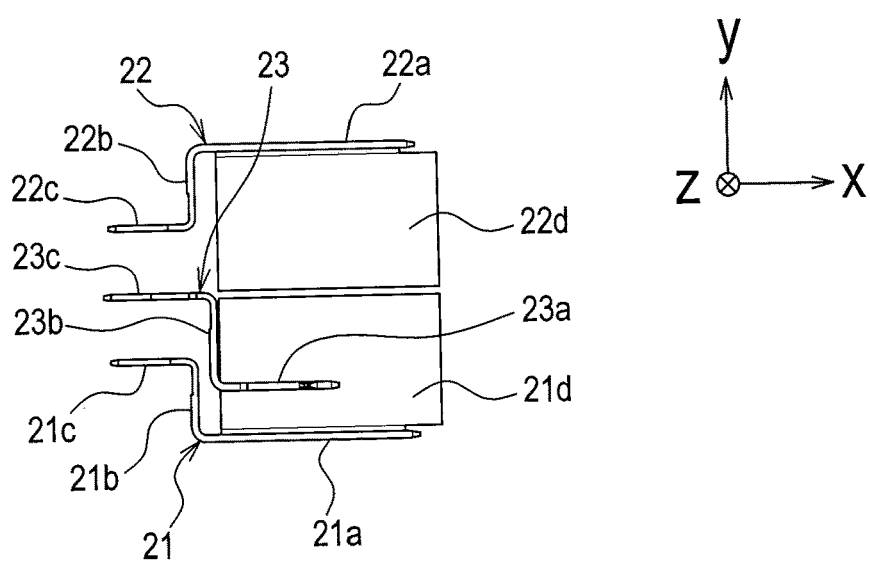
FIG. 6B is a bottom view.
Figure 6C:
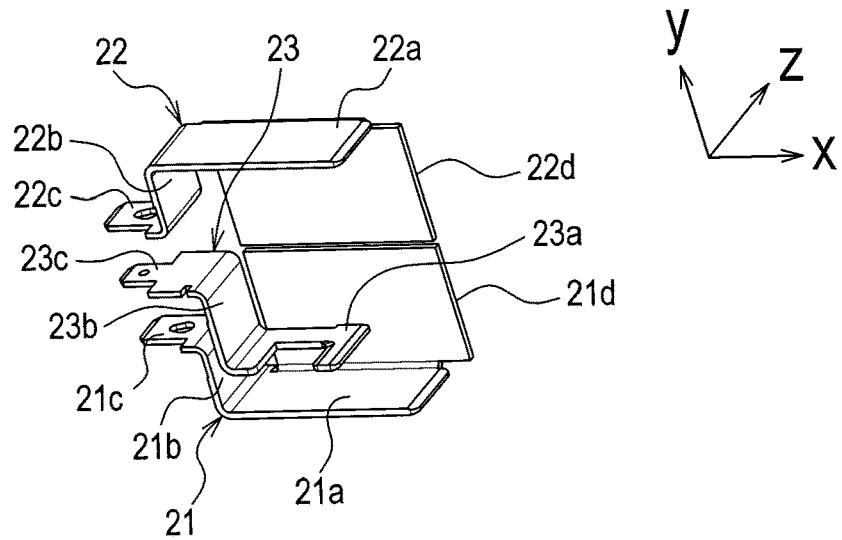
FIG. 6C is a lower perspective view.

As illustrated in FIGS. 6A, 6B, and 6C, the positive electrode connecting terminal 21 is entirely and integrally formed of a conductor and includes the positive electrode side connection plate portion 21a, a positive electrode side connecting portion 21b, a positive electrode side lead connecting portion 21c, and a positive electrode side heat radiation plate portion 21d.

The positive electrode side connection plate portion 21a is a plate member that comes in contact with the positive electrode terminals 66 of the battery pack 50 when the battery pack 50 is mounted on the battery mounting portion 9. The plate-shaped positive electrode side connecting portion 21b extends from one of the x-axis directional short sides of the positive electrode side connection plate portion 21a in a direction perpendicular to a plate surface (a surface parallel to an x-z plane) of the positive electrode side connection plate portion 21a. Further, the plate-shaped positive electrode side lead connecting portion 21c extends from an end of the positive electrode side connecting portion 21b in parallel with the plate surface of the positive electrode side connection plate portion 21a. The positive electrode side lead connecting portion 21c is connected to the positive electrode lead wire 46 illustrated in FIG. 3.

The positive electrode side heat radiation plate portion 21d is a plate-shaped member that extends from one of the long sides in the z-axis direction of the positive electrode side connection plate portion 21a and is bended in a direction perpendicular to the plate surface of the positive electrode side connection plate portion 21a. An area of the plate surface (surface horizontal to the x-y plane) of the positive electrode side heat radiation plate portion 21d is greater than an area of the plate surface of the positive electrode side connection plate portion 21a. The positive electrode side heat radiation plate portion 21d extends integrally from the positive electrode side connection plate portion 21a that is an heat radiation object, so that heat is able to be conducted between the members 21d and 21a. The positive electrode side heat radiation plate portion 21d is opposed in parallel to a terminal block opposing surface 60 (see FIG. 8A) of the battery pack 50 when the battery pack 50 is mounted on the machine body 2.

Like the positive electrode connecting terminal 21, the negative electrode connecting terminal 22 is entirely and integrally formed of a conductor and includes the negative electrode side connection plate portion 22a, a negative electrode side connecting portion 22b, a negative electrode side lead connecting portion 22c, and a negative electrode side heat radiation plate portion 22d.

The negative electrode side connection plate portion 22a is a plate-shaped member that comes in contact with the negative electrode terminals 67 of the battery pack 50 when the battery pack 50 is mounted on the battery mounting portion 9. The negative electrode side connection plate portion 22a is arranged in a manner that the plate surface of the negative electrode side connection plate portion 22a is opposed to the plate surface of the positive electrode side connection plate portion 21a while being separated therefrom in parallel.

The plate-shaped negative electrode side connecting portion 22b extends from one of the x-axis directional short sides of the negative electrode side connection plate portion 22a in a direction perpendicular to the plate surface of the negative electrode side connection plate portion 22a. Further, the plate-shaped negative electrode side lead connecting portion 22c extends from an end of the negative electrode side connecting portion 22b in parallel with the plate surface of the negative electrode side connection plate portion 22a. The negative electrode side lead connecting portion 22c is connected to the negative electrode lead wire 47 illustrated in FIG. 3.

The negative electrode side heat radiation plate portion 22d is a plate-shaped member that extends from one of the z-axis directional long sides of the negative electrode side connection plate portion 22a and is bended in a direction perpendicular to the plate surface of the negative electrode side connection plate portion 22a. An area of the plate surface of the negative electrode side heat radiation plate portion 22d is greater than an area of the plate surface of the negative electrode side connection plate portion 22a. The negative electrode side heat radiation plate portion 22d extends integrally from the negative electrode side connection plate portion 22a that is a heat radiation object, so that heat is able to be conducted between the members 22d and 22a. The negative electrode side heat radiation plate portion 22d is opposed in parallel to the terminal block opposing surface 60 (see FIG. 8A) of the battery pack 50 when the battery pack 50 is mounted on the machine body 2.

According to the first embodiment, the positive electrode side connection plate portion 21a and the negative electrode side connection plate portion 22a are both in an identical rectangular shape and have the plate surfaces having the same area. The positive electrode side heat radiation plate portion 21d and the negative electrode side heat radiation plate portion 22d are also both in an identical rectangular shape and have the plate surfaces having the same area.

As illustrated in FIGS. 5, 6A, 6B, and 6C, the respective plate surfaces of the positive electrode side heat radiation plate portion 21d and the negative electrode side heat radiation plate portion 22d are positioned on the same plane. That is, the heat radiation plate portions 21d and 22d are arranged in a manner that the mutual plate surfaces are in parallel and entirely exist on the same plane.

The positive electrode side heat radiation plate portion 21d extends from the positive electrode side connection plate portion 21a in a direction facing the negative electrode side connection plate portion 22a. The negative electrode side heat radiation plate portion 22d extends from the negative electrode side connection plate portion 22a in a direction facing the positive electrode side connection plate portion 21a. Therefore, the positive electrode side heat radiation plate portion 21d and the negative electrode side heat radiation plate portion 22d exist within a range between a plane including the plate surface of the positive electrode side connection plate portion 21a and a plane including the plate surface of the negative electrode side connection plate portion 22a. Further, the positive electrode side heat radiation plate portion 21d and the negative electrode side heat radiation plate portion 22d are arranged while being separated from each other at a fixed distance in the y-axis direction.

The signal connecting terminal 23 is entirely and integrally formed of a conductor and includes the signal side connection plate portion 23a, a signal side connecting portion 23b, and a signal side lead connecting portion 23c.

The signal side connection plate portion 23a is a plate-shaped member that comes in contact with the signal terminals 68 of the battery pack 50 when the battery pack 50 is mounted on the battery mounting portion 9. The signal side connection plate portion 23a is arranged within a range defined between the positive electrode side connection plate portion 21a and the negative electrode side connection plate portion 22a, where these two connection plate portions 21a and 22a face each other, while being in parallel with the two connection plate portions 21a and 22a.

Therefore, according to the first embodiment, as the electrode side connection plate portion 21a is seen from an outside of the terminal block 15 from the direction perpendicular to the plate surface of the positive electrode side connection plate portion 21a, the signal side connection plate portion 23a and the negative electrode side connection plate portion 22a both hide behind the positive electrode side connection plate portion 21a and are not viewable.

The plate-shaped signal side connecting portion 23b extends from the signal side connection plate portion 23a. Further, the plate-shaped signal side lead connecting portion 23c extends from the end of the signal side connecting portion 23b in parallel to the plate surface of the signal side connection plate portion 23a. The signal side lead connecting portion 23c is connected to the signal lead wire 48 illustrated in FIG. 3.

The terminal holding member 16 configuring the terminal block 15 will be described in detail mainly with reference to FIGS. 5, 7A, and 7B and with reference to FIGS. 4A, 4B, and 4C accordingly.

The terminal holding member 16 is a member to hold the positive electrode connecting terminal 21, the negative electrode connecting terminal 22, and the signal connecting terminal 23 in a positional relationship illustrated in FIGS. 4A and 6A. The terminal holding member 16 is entirely and integrally formed of an insulating member containing resin.

Figure 5:
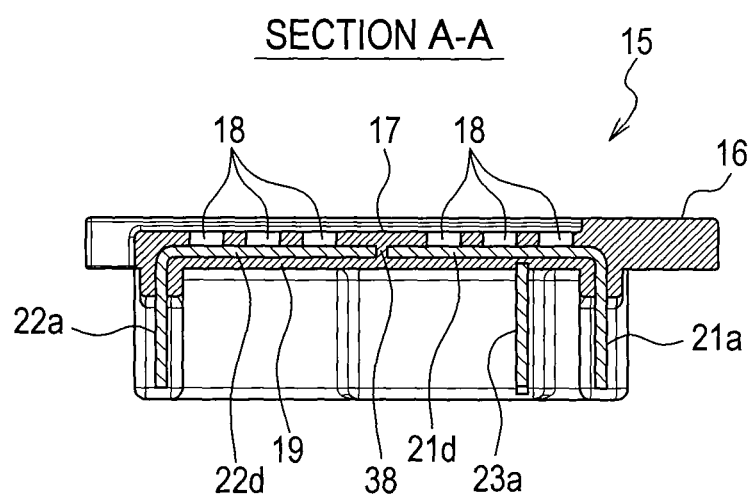
FIG. 5 is a cross sectional view of the terminal block taken along the line A-A in FIG. 4A.
Figure 7A:
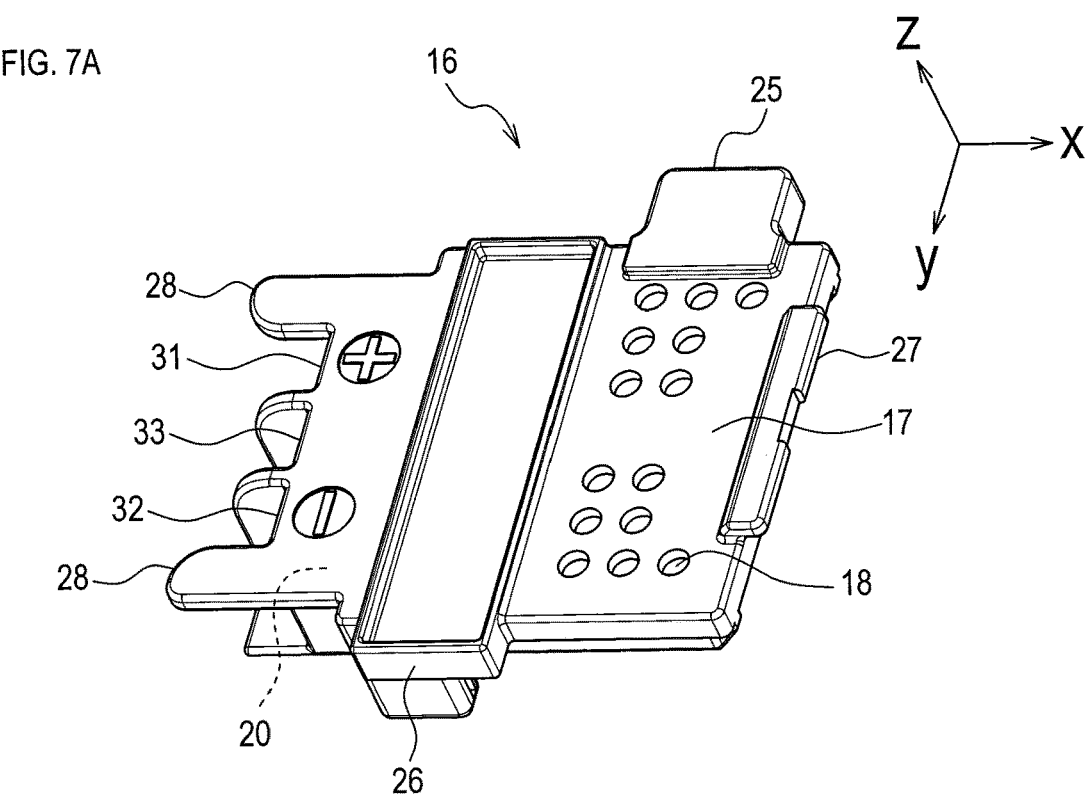
FIG. 7A is an upper perspective view and FIG. 7B is a bottom view.

The terminal holding member 16 is provided with a machine side resin portion 17 at the side of one of both surfaces parallel to the x-y plane, as illustrated in FIGS. 5 and 7A. The terminal holding member 16 is further provided with a pack side resin portion 19 at the side of the other one, as illustrated in FIGS. 5 and 7B.

Figure 7B:
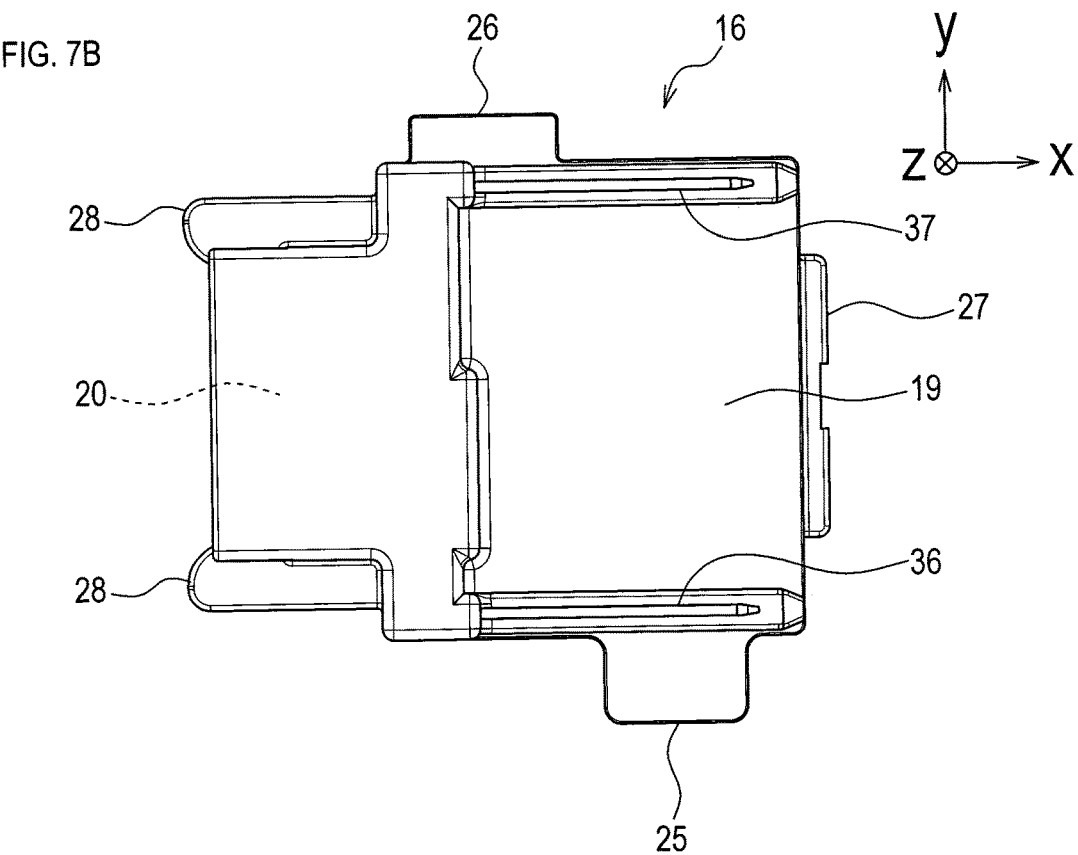

As illustrated in FIG. 7B, a positive electrode side supporting groove 36 and a negative electrode side supporting groove 37 are formed at the both y-axis directional ends of the surface of the pack side resin portion 19. The positive electrode side supporting groove 36 is inserted with an end at the long side of the positive electrode side connection plate portion 21a, so that the positive electrode side connection plate portion 21a is held perpendicularly to the surface of the pack side resin portion 19 as illustrated in FIGS. 4B, 4C, and 5. The negative electrode side supporting groove 37 is inserted with an end at the long side of the negative electrode side connection plate portion 22a, so that the negative electrode side connection plate portion 22a is held perpendicularly to the surface of the pack side resin portion 19, as illustrated in FIGS. 4B, 4C, and 5.

As illustrated in FIG. 2, the terminal block 15 is provided to the opening 3 of the housing 5 in a manner that the pack side resin portion 19 is exposed to the outside of the housing 5 and the machine side resin portion 17 faces the inner space of the housing 5. Accordingly, when the battery pack 50 is mounted on the machine body 2, the pack side resin portion 19 of the terminal block 15 faces the terminal block opposing surface 60 of the battery pack 50 (see FIG. 8A), while having its plate surface in parallel with the plate surface of the terminal block opposing surface 60.

The machine side resin portion 17 and the pack side resin portion 19 are both plate-shaped as a whole and are arranged facing each other in the z-axis direction. There is a space defined between the machine side resin portion 17 and the pack side resin portion 19 in the z-axis direction, in which the positive electrode side heat radiation plate portion 21d and the negative electrode side heat radiation plate portion 22d are housed. The positive electrode side heat radiation plate portion 21d and the negative electrode side heat radiation plate portion 22d are housed in this space, as illustrated in FIG. 5.

In other words, the machine side resin portion 17 of the terminal block 15 is provided so as to cover respective machine side plate surfaces (plate surfaces illustrated in FIG. 6A) of the positive electrode side heat radiation plate portion 21d and the negative electrode side heat radiation plate portion 22d, which are the plate surfaces not facing the battery pack 50 when the battery pack 50 is mounted. On the other hand, the pack side resin portion 19 of the terminal block 15 is provided so as to cover respective pack side plate surfaces (plate surfaces illustrated in FIG. 6B) of the positive electrode side heat radiation plate portion 21d and the negative electrode side heat radiation plate portion 22d, which are the plate surfaces facing the battery pack 50 when the battery pack 50 is mounted.

Further, as illustrated in FIG. 5, a contact restraining portion 38 is provided between the positive electrode side heat radiation plate portion 21d and the negative electrode side heat radiation plate portion 22d while being in contact with the heat radiation plate portions 21d and 22d. This contact restraining portion 38 is an insulating member which restrains contact between the positive electrode side heat radiation plate portion 21d and the negative electrode side heat radiation plate portion 22d. According to the first embodiment, the contact restraining portion 38 is integrally formed with the machine side resin portion 17 and the pack side resin portion 19.

As illustrated in FIGS. 4B and 5, the pack side resin portion 19 is provided so as to fully cover the pack side plate surfaces of the heat radiation plate portions 21d and 22d. On the other hand, as illustrated in FIGS. 5 and 7A, the machine side resin portion 17 includes a plurality of penetrating holes 18. The plurality of penetrating holes 18 penetrates the machine side resin portion 17 in the z-axis direction.

Therefore, regarding the terminal block 15, the machine side plate surfaces of the respective heat radiation plate portion 21d and 22d are partially exposed via the penetrating holes 18 of the machine side resin portion 17, i.e., the machine side plate surfaces partially communicate with the external space via the penetrating holes 18, as illustrated in FIG. 4A and 5.

As illustrated in FIGS. 4A and 7A, the terminal holding member 16 includes a positive electrode side insertion port 31, a negative electrode side insertion port 32, and a signal side insertion port 33. The positive electrode side lead connecting portion 21c is placed at the positive electrode side insertion port 31. The positive electrode lead wire 46 is inserted into the positive electrode side insertion port 31 and is connected to the positive electrode side lead connecting portion 21c. The negative electrode side lead connecting portion 22c is placed at the negative electrode side insertion port 32. The negative electrode lead wire 47 is inserted into the negative electrode side insertion port 32 and is connected to the negative electrode side lead connecting portion 22c. The signal side lead connecting portion 23c is placed at the signal side insertion port 33. The signal lead wire 48 is inserted into the signal side insertion port 33 and is connected to the signal side lead connecting portion 23c.

Further, as illustrated in FIGS. 4A, 7A and so on, the terminal holding member 16 includes a holding portion 20. The connecting portions 21b, 22b, and 23b of the connecting terminals 21, 22, and 23 are arranged on the holding portion 20 and are held by the holding portion 20.

As illustrated in FIGS. 4A, 7A and so on, formed at the outer periphery of the terminal holding member 16 are a first rib 25, a second rib 26, a third rib 27, and a fourth rib 28. The ribs 25, 26, 27, and 28 are formed to position and fix the terminal block 15 at the opening 3 of the machine body 2. Engagement grooves (not illustrated) are formed at the opening 3 of the machine body 2, which are engaged with the ribs 25, 26, 27, and 28. The terminal block 15 is positioned and fixed at the opening 3 of the terminal block 15 with the ribs 25, 26, 27, and 28 engaged with the corresponding engagement grooves.

(3) Configuration of Battery Pack

The configuration of the battery pack 50 will be described below with reference to FIGS. 8A, 8B, 9A, and 9B. The directions of the x-, y-, and z-axes illustrated in FIGS. 8A, 8B, 9A and 9B are the above-described defined directions based upon the terminal block 15 on the assumption that the battery pack 50 is mounted on the machine body 2 and the connection plate portions 21a, 22a, and 23a of the terminal block 15 are inserted into the battery pack 50.

Figure 8A:
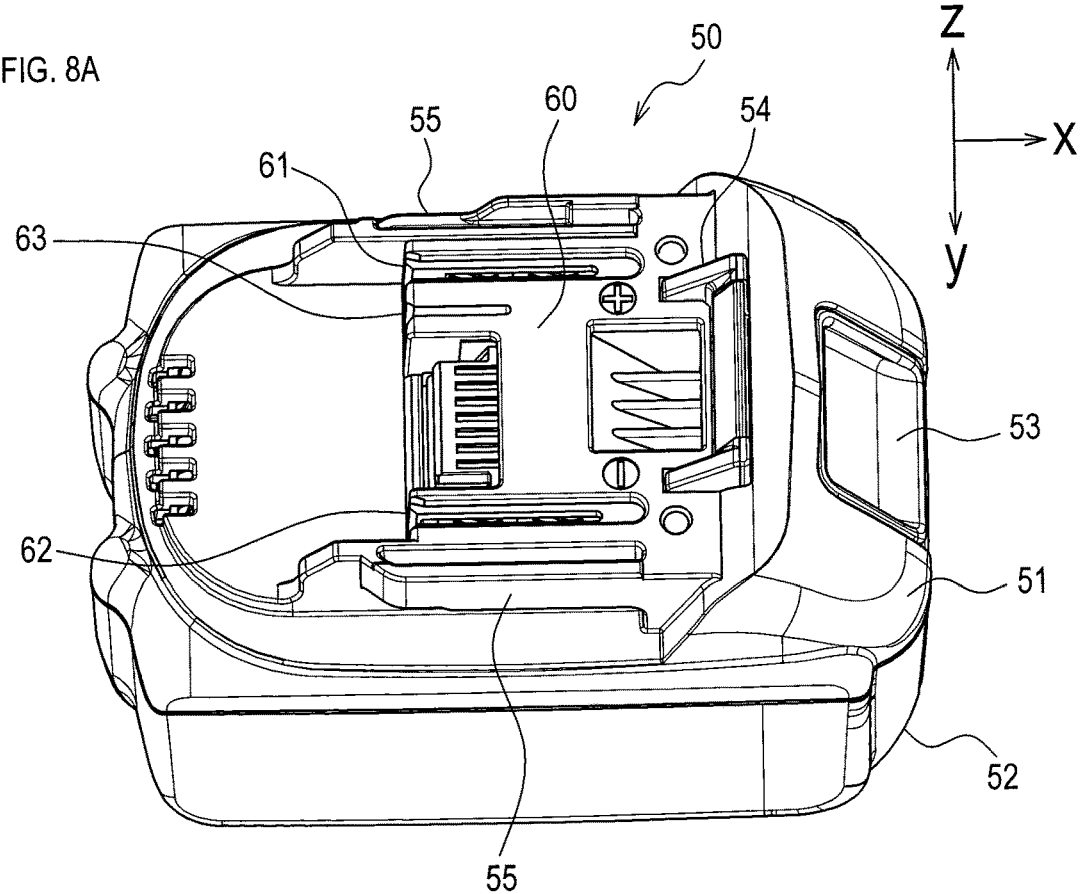
FIG. 8A is a perspective view of the battery pack.
Figure 8B:
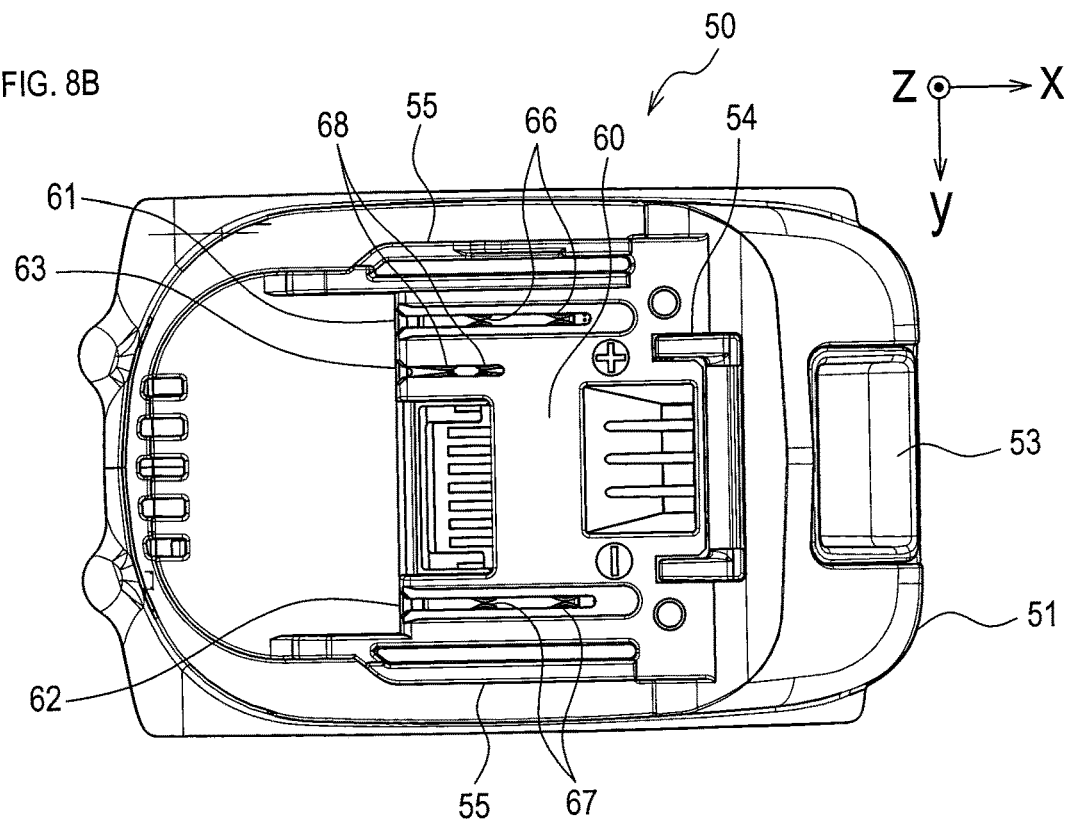
FIG. 8B is a top view of the battery pack.
Figure 9A:
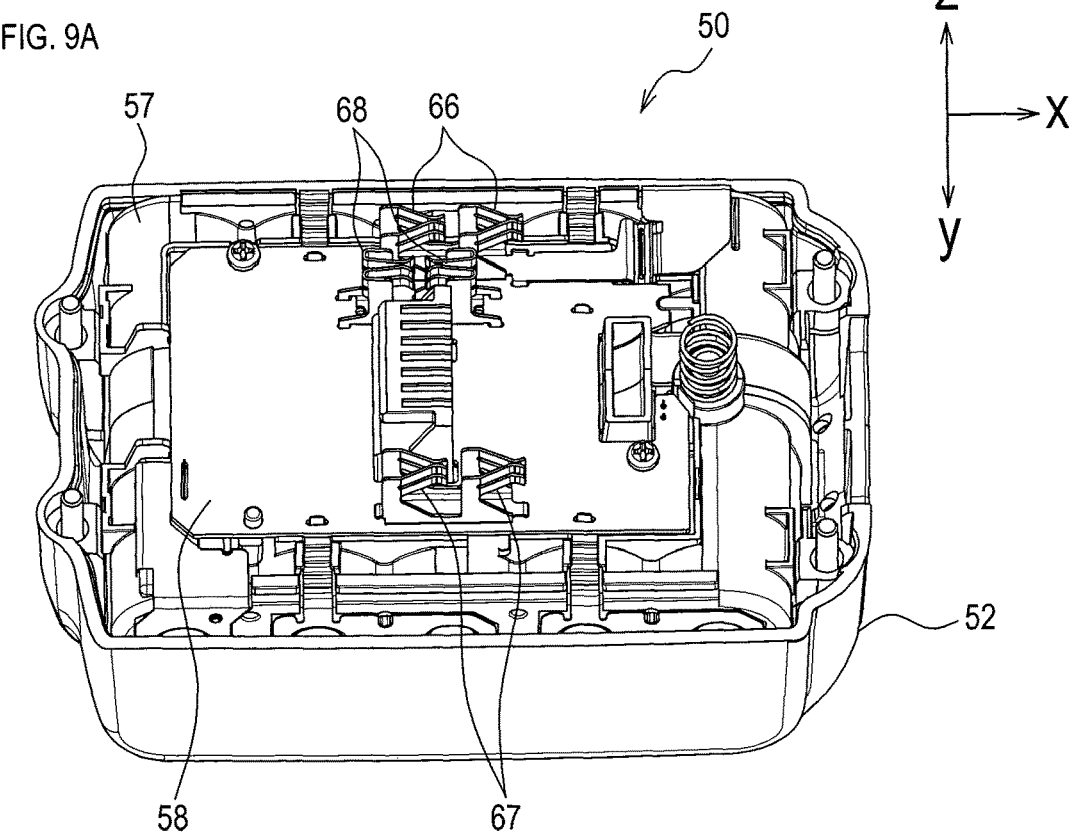
FIG. 9A is a perspective view and FIG. 9B is a top view.
Figure 9B:
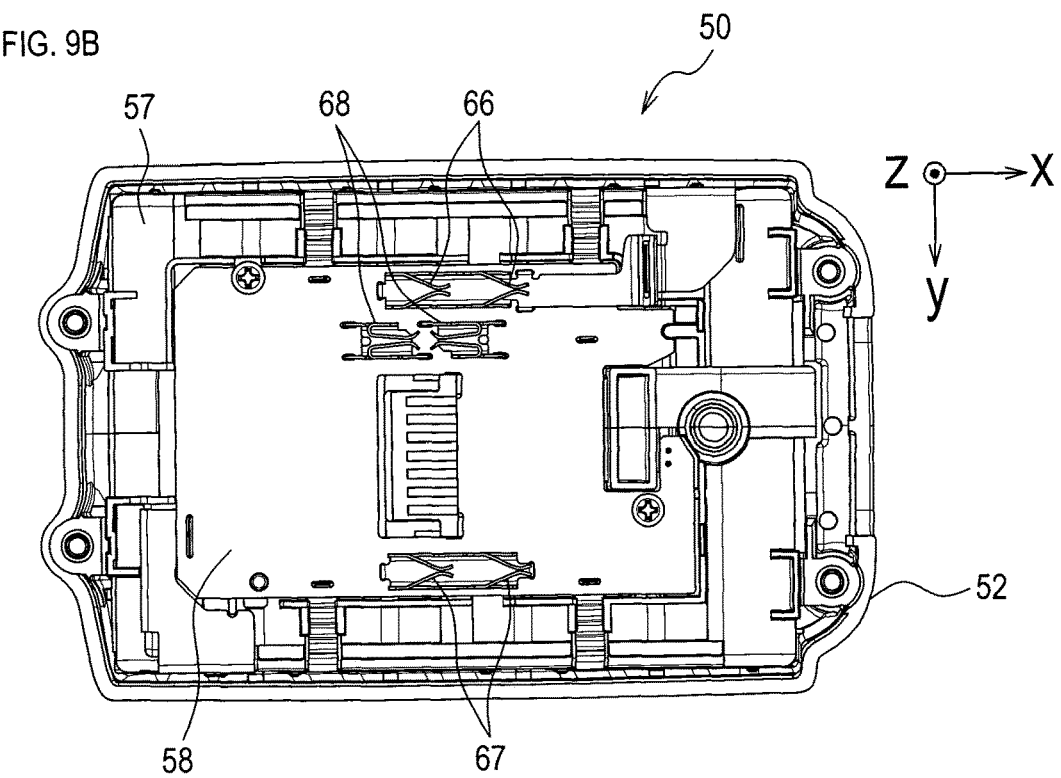

As illustrated in FIGS. 8A and 8B, the battery pack 50 includes a main body 52 and a cover portion 51. The cover portion 51 is fixed to the main body 52 by a predetermined fixing means. According to the first embodiment, the cover portion 51 is fastened by a plurality of screws, for example. When the fixed state by the fixing means is released, the cover portion 51 may be removed from the main body 52. FIGS. 9A and 9B illustrate a state where the cover portion 51 is removed from the main body 52.

As illustrated in FIGS. 9A and 9B, the battery pack 50 includes the battery 57 and a control board 58. The battery 57 of the first embodiment is a secondary battery that is rechargeable and dischargeable repeatedly. More specifically, the battery 57 is a lithium ion secondary battery, for example. The battery 57, however, may be secondary batteries other than the lithium ion secondary battery or may be a primary battery.

The control board 58 includes various circuits (not illustrated) in order to control charging and discharging the battery 57. The control board 58 further includes the two positive electrode terminals 66, the two negative electrode terminals 67, and the two signal terminals 68. The two positive electrode terminals 66 are terminals connected to the positive electrode of the battery 57, and the two negative electrode terminals 67 are terminals connected to the negative electrode of the battery 57. The two signal terminals 68 are terminals to transmit signals between the control board 58 and the controller 13 inside the machine body 2. The signal generated by the control board 58 and to be sent to the machine body 2 is outputted from the two signal terminals 68 to the machine body 2. A signal generated by the machine body 2 and to be sent to the battery pack 50 is inputted from the two signal terminals 68.

The positive electrode terminals 66, the negative electrode terminals 67, and the signal terminals 68 include two contacts provided to face each other in the y-axis direction, respectively. When the battery pack 50 is mounted on the machine body 2, the corresponding connection plate portion of the terminal block 15 is inserted between the two contact points. When the connection plate portion is inserted, both surfaces of the connection plate portion respectively come in contact with the contact points, wherein the connection plate portion and the contact points are electrically connected.

As illustrated in FIGS. 8A and 8B, the cover portion 51 is formed with slide guide portions 55 at both y-axis directional side surfaces at the upper portion of the cover portion 51, respectively. Each of the slide guide portions 55 is formed over a predetermined length along the x-axis direction. Formed at the battery mounting portion 9 of the machine body 2 are insertion grooves (not illustrated) over a predetermined length along the x-axis direction so that the slide guide portions 55 are inserted into the insertion grooves, respectively.

The cover portion 51 further includes an operation portion 53 and a hook portion 54. The operation portion 53 and the hook portion 54 are formed integrally and are energized by a not-illustrated elastic member (e.g., spring) to the above in the z-axis direction (upward in FIG. 8A). The operation portion 53 is a member pressed and operated by an operator. Regarding the battery pack 50 illustrated in FIG. 8A, when the operator presses the operation portion 53 downward in the z-axis direction, the hook portion 54 moves downward in the z-axis direction accordingly.

The cover portion 51 is further formed with the terminal block opposing surface 60. As described above, the terminal block opposing surface 60 is a surface facing the terminal block 15 of the machine body 2 when the battery pack 50 is mounted on the machine body 2. The terminal block opposing surface 60 is formed with a positive electrode insertion groove 61, a negative electrode insertion groove 62, and a signal insertion groove 63 along the x-axis direction.

The positive electrode insertion groove 61 is a groove to be inserted with the positive electrode side connection plate portion 21a of the terminal block 15. The negative electrode insertion groove 62 is a groove to be inserted with the negative electrode side connection plate portion 22a of the terminal block 15. The signal insertion groove 63 is a groove to be inserted with the signal side connection plate portion 23a of the terminal block 15.

Both y-axis directional walls inside the positive electrode insertion groove 61 are open, so that the two positive electrode terminals 66 are partially exposed through the openings, as illustrated in FIG. 8B. Both y-axis directional walls inside the negative electrode insertion groove 62 are also open, so that the two negative electrode terminals 67 are partially exposed through the openings, as illustrated in FIG. 8B. Both y-axis directional walls inside the signal insertion groove 63 are also open, so that the two signal terminals 68 are partially exposed through the openings, as illustrated in FIG. 8B.

In order to mount the battery pack 50 configured as described above on the machine body 2, while the battery pack 50 is being moved in the x-axis direction relative to the battery mounting portion 9 of the machine body 2, the respective slide guide portions 55 are inserted into the respective insertion grooves of the battery mounting portion 9. Specifically, when the battery pack 50 is to be mounted from the condition illustrated in FIG. 2, the battery pack 50 is slidably moved in the x-axis direction in a state where the battery pack 50 and the battery mounting portion 9 are positioned in a manner that the respective slide guide portions 55 of the battery pack 50 are inserted into the respective insertion grooves of the battery mounting portion 9. The slide guide portions 55 of the battery pack 50 are then inserted into the respective insertion grooves of the battery mounting portion 9. When the insertion is progressed to a predetermined mounting position, the insertion is stopped and the hook portion 54 of the battery pack 50 is fitted into the engagement groove of the battery mounting portion 9. Here, the insertion is completed.

When the mounting of the battery pack 50 on the machine body 2 is completed, the terminal block 15 and the battery pack 50 face each other. Specifically, the surface of the pack side resin portion 19 of the terminal block 15 and the terminal block opposing surface 60 of the battery pack 50 face each other in parallel. Further, regarding the relative positional relationship between the respective heat radiation plate portions 21d and 22d of the terminal block 15 and the terminal block opposing surface 60 of the battery pack 50, the mutual plate surfaces face each other in parallel.

In the process of mounting the battery pack 50 on the machine body 2, the connection plate portion 21a, 22a, and 23a of the terminal block 15 are respectively inserted into the corresponding insertion grooves 61, 62, and 63 of the battery pack 50 in the x-axis direction from the left to the right in FIGS. 8A and 8B. When the mounting is completed, the connection plate portions 21a, 22a, and 23a are respectively and mostly inserted into the corresponding insertion grooves 61, 62, and 63, and the connection plate portions 21a, 22a, and 23a are respectively connected to the corresponding terminals 66, 67, and 68 of the battery pack 50.

When the battery pack 50 is to be removed from the machine body 2, the operation portion 53 of the battery pack 50 is pressed so that the engagement between the hook portion 54 and the battery mounting portion 9 is released. In this state, the battery pack 50 is removed by sliding the battery pack 50 in a reverse direction to the mounting direction.

(4) Effects of the First Embodiment

As described above, regarding the terminal block 15 of the grinder 1 according to the first embodiment, the positive electrode side connection plate portion 21a is provided with the positive electrode side heat radiation plate portion 21d, and the negative electrode side connection plate portion 22a is provided with the negative electrode side heat radiation plate portion 22d. Further, the area of the plate surface of the positive electrode side heat radiation plate portion 21d is greater than the area of the plate surface of the positive electrode side connection plate portion 21a. The area of the plate surface of the negative electrode side heat radiation plate portion 22d is greater than the area of the plate surface of the negative electrode side connection plate portion 22a.

Therefore, when the positive electrode connecting terminal 21 and the negative electrode connecting terminal 22 generate heat as battery electric power is supplied from the battery pack 50 to the machine body 2, the heat is radiated from the respective connection plate portions 21a, 22a, the respective connecting portions 21b, 22b extending therefrom, and the respective lead connecting portions 21c, 22c, and the heat is also radiated from the respective heat radiation plate portions 21d and 22d. Accordingly, it is possible to supply the terminal block 15 having high heat radiation performance.

The positive electrode side heat radiation plate portion 21d extends integrally from the positive electrode side connection plate portion 21a, the negative electrode side heat radiation plate portion 22d extends integrally from the negative electrode side connection plate portion 22a. Therefore, compared with a heat radiation plate portion and a connection plate portion formed individually, it is possible to reduce manufacturing man-hours and manufacturing costs of the positive electrode connecting terminal 21 and the negative electrode connecting terminal 22.

Further, the positive electrode side heat radiation plate portion 21d and the negative electrode side heat radiation plate portion 22d are arranged within the range between the plane including the plate surface of the positive electrode side connection plate portion 21a and the plane including the plate surface of the negative electrode side connection plate portion 22a. Accordingly, it is possible to inhibit enlarging of the terminal block and thus to inhibit enlarging of the grinder 1.

Still further, the positive electrode side heat radiation plate portion 21d is provided in a manner that its plate surface becomes vertical to the positive electrode side connection plate portion 21a. The negative electrode side heat radiation plate portion 22d is provided in a manner that its plate surface becomes vertical to the negative electrode side connection plate portion 22a. The positive electrode side heat radiation plate portion 21d and the negative electrode side heat radiation plate portion 22d are provided in a manner that their plate surfaces are both positioned on the same plane. Accordingly, downsizing of the terminal block and thus the grinder 1 are achieved.

Still further, the machine side resin portion 17 is provided on the machine side plate surfaces of the respective heat radiation plate portions 21d and 22d. The pack side resin portion 19 is provided on the pack side plate surfaces of the respective heat radiation plate portions 21d and 22d. That is, both surfaces of the heat radiation plate portions 21d and 22d are covered by the resin portions 17, 19, respectively. Accordingly, it is possible to improve insulation performance between the respective heat radiation plate portions 21d and 22d and the outside of the terminal block 15.

Still further, the pack side resin portion 19 is formed so as to fully cover the pack side plate surfaces of the respective heat radiation plate portions 21d and 22d. Meanwhile, the machine side resin portion 17 includes the plurality of penetrating holes 18. Accordingly, compared with a machine side resin portion not including the penetrating holes 18, the surface area of the machine side resin portion 17 is increased by an area of inner walls of the penetrating holes 18. In addition, the penetrating holes 18 penetrate the machine side resin portion 17, so that the machine side plate surfaces of the respective heat radiation plate portions 21d and 22d are partially exposed to the outside via the penetrating holes 18. As a result, compared with the case not including the penetrating holes 18, high heat radiation performance is realized.

Further, the contact restraining portion 38 is provided between the positive electrode side heat radiation plate portion 21d and the negative electrode side heat radiation plate portion 22d while being in contact therewith, in order to inhibit the contact therebetween. Accordingly, the contact between the positive electrode side heat radiation plate portion 21d and the negative electrode side heat radiation plate portion 22d is inhibited at high level. As a result, insulation performance therebetween is maintained favorably and short of both is inhibited appropriately.

Still further, the signal connecting terminal 23 is arranged between the positive electrode connecting terminal 21 and the negative electrode connecting terminal 22, i.e., within the range in which both of them face each other. That is, the opposing space between the positive electrode connecting terminal 21 and the negative electrode connecting terminal 22 is effectively used as an arrangement position of the signal connecting terminal 23. Accordingly, compared with the signal connecting terminal 23 arranged outside the range, it is possible to downsize the terminal block.

Still further, the terminal block 15 is arranged to the housing 5 in a manner that the surface of the machine side resin portion 17 faces the inner space of the housing 5. Accordingly, it is possible to radiate heat generated at the terminal block 15 into the inner space of the housing 5.

In addition, the grinder 1 of the first embodiment includes, in the housing 5, the fan 12 rotatably driven by a rotational force of the motor 11 as the motor 11 rotates. With this configuration, when air flow is generated inside the housing 5 in response to the rotation of the fan 12, the flowing air also comes in contact with the terminal block 15. Accordingly, heat radiation from the terminal block 15 into the housing 5 is accelerated by the air generated by the fan 12, and higher heat radiation performance into the housing is realized.

Here, the battery mounting portion 9 corresponds to an example of a mounting portion of the present disclosure. The motor 11 and the controller 13 correspond to an example of a load portion of the present disclosure. The positive electrode side lead connecting portion 21c corresponds to an example of a positive electrode side power supply extension of the present disclosure. The negative electrode side lead connecting portion 22c corresponds to an example of a negative electrode side power supply extension of the present disclosure. The penetrating hole 18 corresponds to an example of a recess of the present disclosure. The signal side connection plate portion 23a corresponds to an example of a signal connecting portion of the present disclosure.

Embodiment 2

According to the first embodiment, the terminal block 15 configured as illustrated in FIGS. 3, 4, 5, and 6 is shown as an example of the terminal block. According to a second embodiment, another example of the terminal block will be described below, which is configured differently from the terminal block 15.

Figure 10:
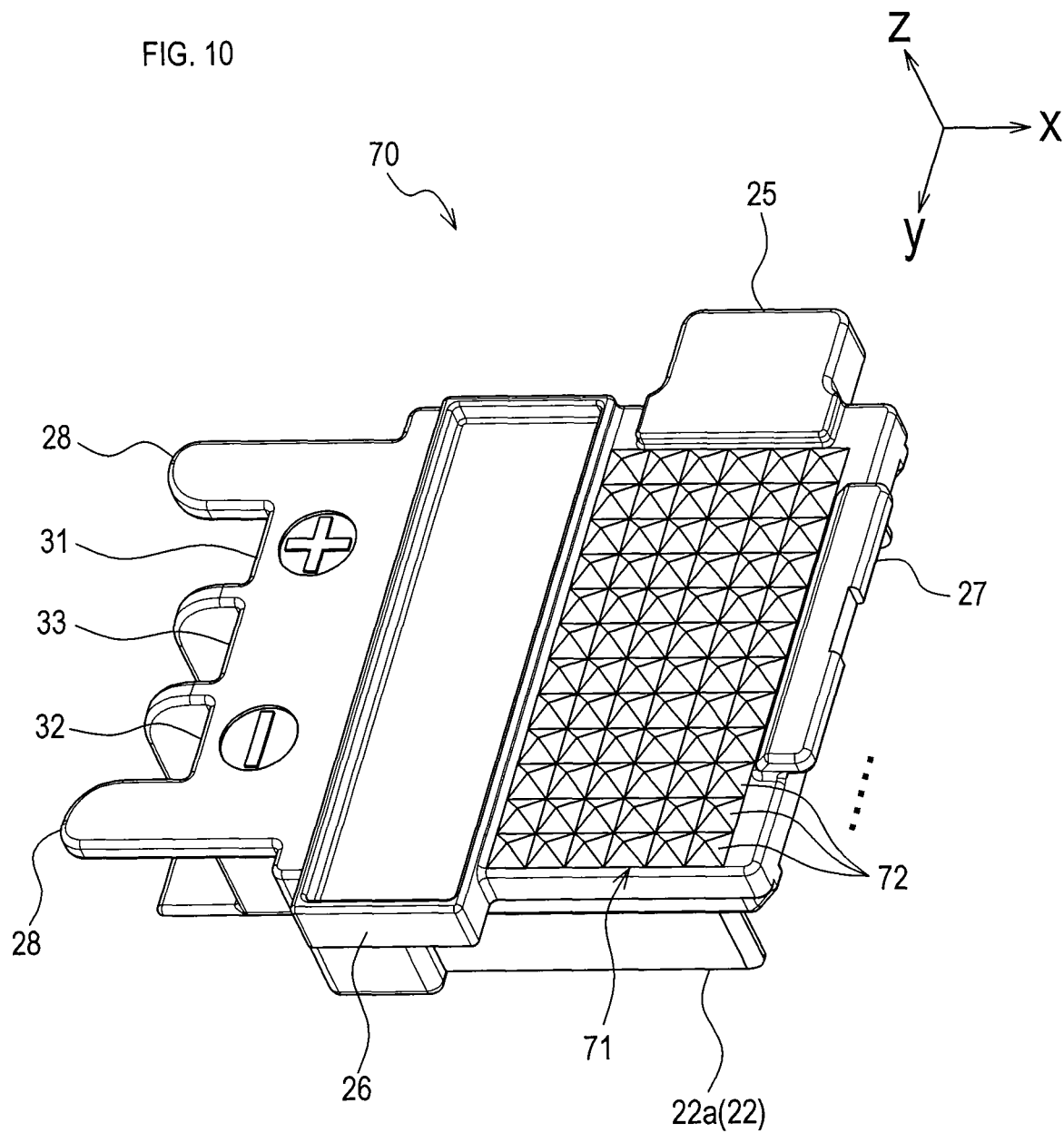
FIG. 10 is a perspective view of a terminal block according to a second embodiment.

A terminal block 70 of the second embodiment illustrated in FIG. 10 is different from the terminal block 15 of the first embodiment in terms of the shape of a surface side of a machine side resin portion 71. The configuration of the terminal block 70 other than the machine side resin portion 71 is the same as the terminal block 15 of the first embodiment. Accordingly, the description for the configuration of the second embodiment common to the first embodiment will be omitted below, and the machine side resin portion 71, which is different from the first embodiment in configuration, will be described below.

The above described terminal block 15 of the first embodiment includes the machine side resin portion 17 having the plurality of penetrating holes 18. On the other hand, as illustrated in FIG. 10, the terminal block 70 of the second embodiment includes a plurality of convex portions 72 on the surface of the machine side resin portion 71.

The convex portions 72 are respectively in the same quadrangular pyramid shape and are formed protruding in the z-axis direction from the plate surface (x-y plane) of the machine side resin portion 71.

According to the terminal block 70 configured as described above of the second embodiment, the machine side resin portion 71 includes the plurality of convex portions 72. Therefore, the surface area of the machine side resin portion 71 increases by the area of the side surfaces of the convex portions 72 than an area of a plane surface not having the convex portions 72. As a result, compared with the case not having the convex portions 72, it is possible to realize heat radiation performance as high as heat radiation performance of the terminal block 15 of the first embodiment.

Embodiment 3

According to the first embodiment, the grinder 1 is shown as an example of the electric working machine. According to a third embodiment, a driver drill 100 illustrated in FIG. 11 will be described as an example of the electric working machine other than the grinder 1. The driver drill 100 is an electric working machine that is capable of drilling a workpiece or fastening a screw into a workpiece.

Figure 11:
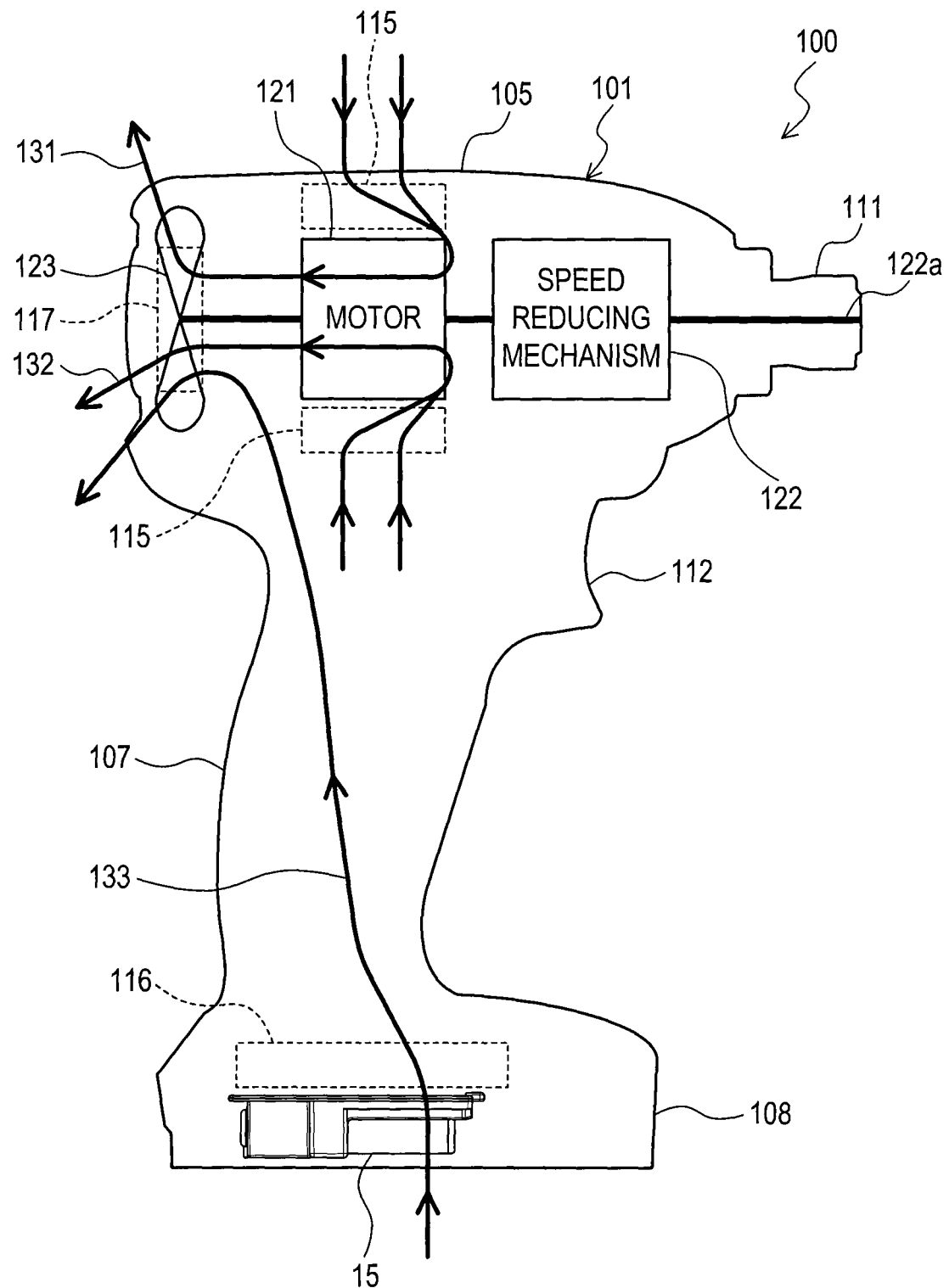
FIG. 11 is an explanatory view illustrating an approximate configuration of an inside of a machine body of a driver drill according to a third embodiment.

Like the grinder 1 of the first embodiment, also for the driver drill 100 of the third embodiment, the battery pack 50 is attachable to or detachable from a machine body 101. The driver drill 100 is configured to be activated by receiving electric power supply from the battery 57 when the battery pack 50 is mounted. FIG. 11 doesn't illustrate the battery pack 50 but the machine body 101 only.

As illustrated in FIG. 11, the machine body 101 of the driver drill 100 includes a housing 105. A grip 107 is formed at the housing 105 protruding downward so that the operator can grasp the grip 107. A battery mounting portion 108 is formed at the lower end of the grip 107. Further, an opening (not illustrated) is also formed at the lower end of the grip 107, and the terminal block 15 is provided closing the opening.

The terminal block 15 of the third embodiment is configured the same as the terminal block 15 of the first embodiment. The battery pack 50 may be mounted on the battery mounting portion 108 by slidably moving the battery pack 50 from the front to the back of the machine body 101 (i.e., to the left in FIG. 11).

Housed in the housing 105 are various components including a motor 121, a speed reducing mechanism 122, a fan 123, and so on. The grip 107 is provided with a trigger operation portion 112 operated by the fingers of the operator gripping the grip 107.

The motor 121 is a power source of the driver drill 100 and is housed in the housing 105 at the rear thereof (left side in FIG. 11). The speed reducing mechanism 122 is housed in the housing 105 in the front of the motor 121. A chuck portion 111 to be attached with a tool bit (not illustrated) is projected at the front end side (right side in FIG. 11) of an output shaft 122a of the speed reducing mechanism 122.

When the operator pulls the trigger operation portion 112, the motor 121 is energized by the battery pack 50, and thus the motor 121 rotates. In response to the rotation of the motor 121, the rotation speed is reduced by the speed reducing mechanism 122 and then is transmitted to the chuck portion 111. Accordingly, the chuck portion 111 rotates.

The fan 123 is provided behind the motor 121. The fan 123 is provided for the main purpose of cooling the motor 121 and is rotated by the rotational driving force of the motor 121.

Lower end side intake ports 116 are respectively provided at both side surfaces at the lower end side (i.e., lower end side of the grip 107) in the housing 105. Upper side intake ports 115 are respectively provided at both upper side surfaces in the housing 105. Exhaust ports 117 are respectively provided at both side surfaces at the upper rear end side of the housing 105. The inner and outer spaces of the housing 105 communicate each other via the intake ports 115, 116 and the exhaust ports 117.

Accordingly, as the fan 123 rotates, outside air flows into the housing 105 via the upper side intake ports 115 and the lower end side intake ports 116, and then air flows are generated along cooling air passages 131, 132, and 133 in the housing 105, as illustrated in FIG. 11 for example.

That is, when the fan 123 rotates, the motor-side cooling air passages 131 and 132 are formed, in which the outside air flows in mainly from the upper side intake ports 115 and flows to the outside through the exhaust ports 117 after blowing against the motor 121. Therefore, when the fan 123 rotates, the motor 121 is cooled by the air flows along the motor-side cooling air passages 131 and 132 generated by the rotation.

Further, when the fan 123 rotates, a terminal block-side cooling air passage 133 is formed, in which the outside air flows in mainly from the lower end side intake ports 116 and flows to the outside through the exhaust ports 117 via the upper surface of the terminal block 15 and the inside of the grip 107. Accordingly, when the fan 123 rotates, the terminal block 15 is cooled by the air flow along the terminal block-side cooling air passage 133 generated by the rotation.

Still further, the terminal block 15 is positioned not on the axis (coaxial with the output shaft 122a) of the rotational shaft of the fan 123 but being separated in a direction vertical to the axis. However, because of the provision of the lower end side intake ports 116, the terminal block-side cooling air passage 133 flowing in from the lower end side intake ports 116 is also formed in the housing 105 in addition to the motor-side cooling air passages 131 and 132. Accordingly, in response to the rotation of the fan 123, the cooling air along the terminal block-side cooling air passage 133 blows against the terminal block 15, so that the terminal block 15 is cooled.

As a result, the driver drill 100 of the third embodiment provides the same effects as the first embodiment.

Embodiment 4

Figure 12A:
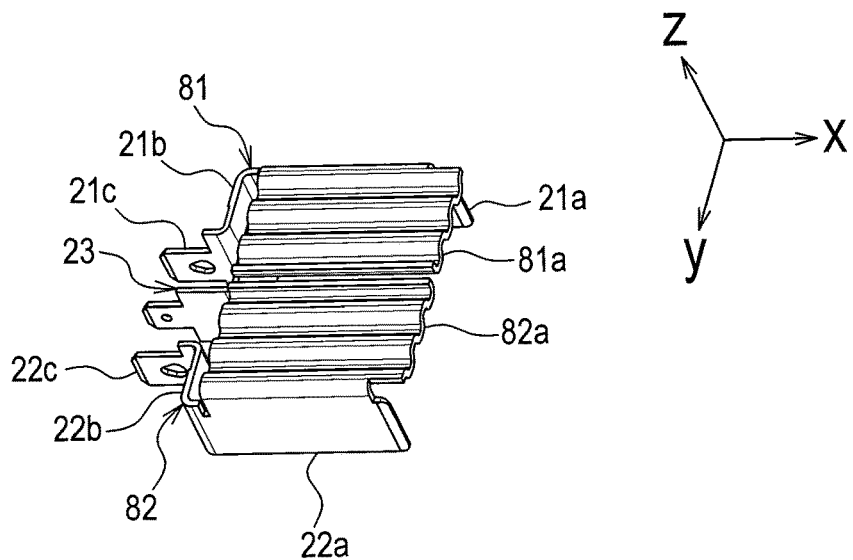
FIG. 12A is an upper perspective view.
Figure 12B:
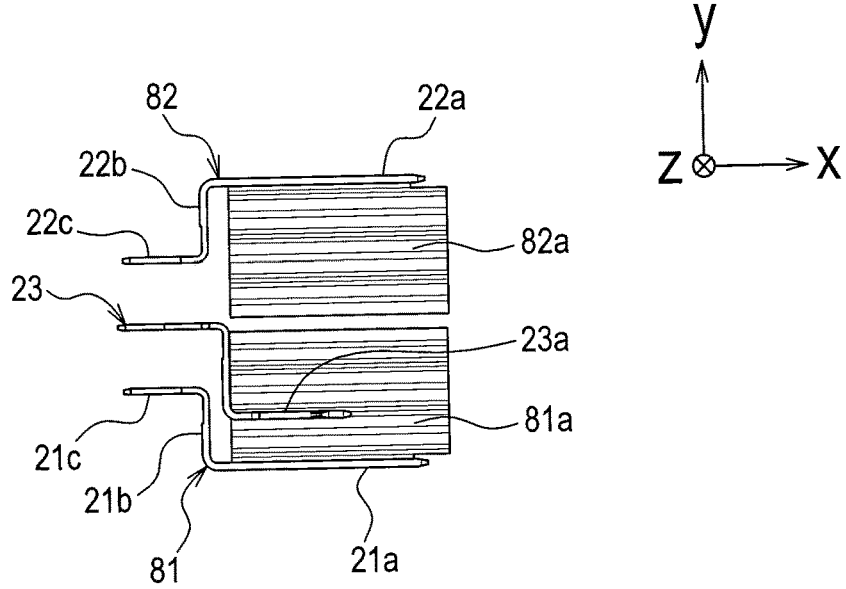
FIG. 12B is a bottom view.
Figure 12C:
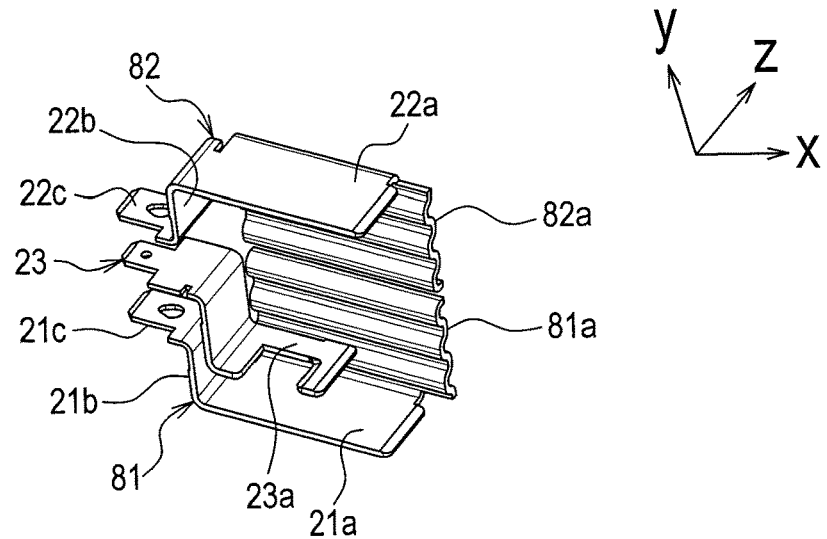
FIG. 12C is a lower perspective view.
Figure 13A:
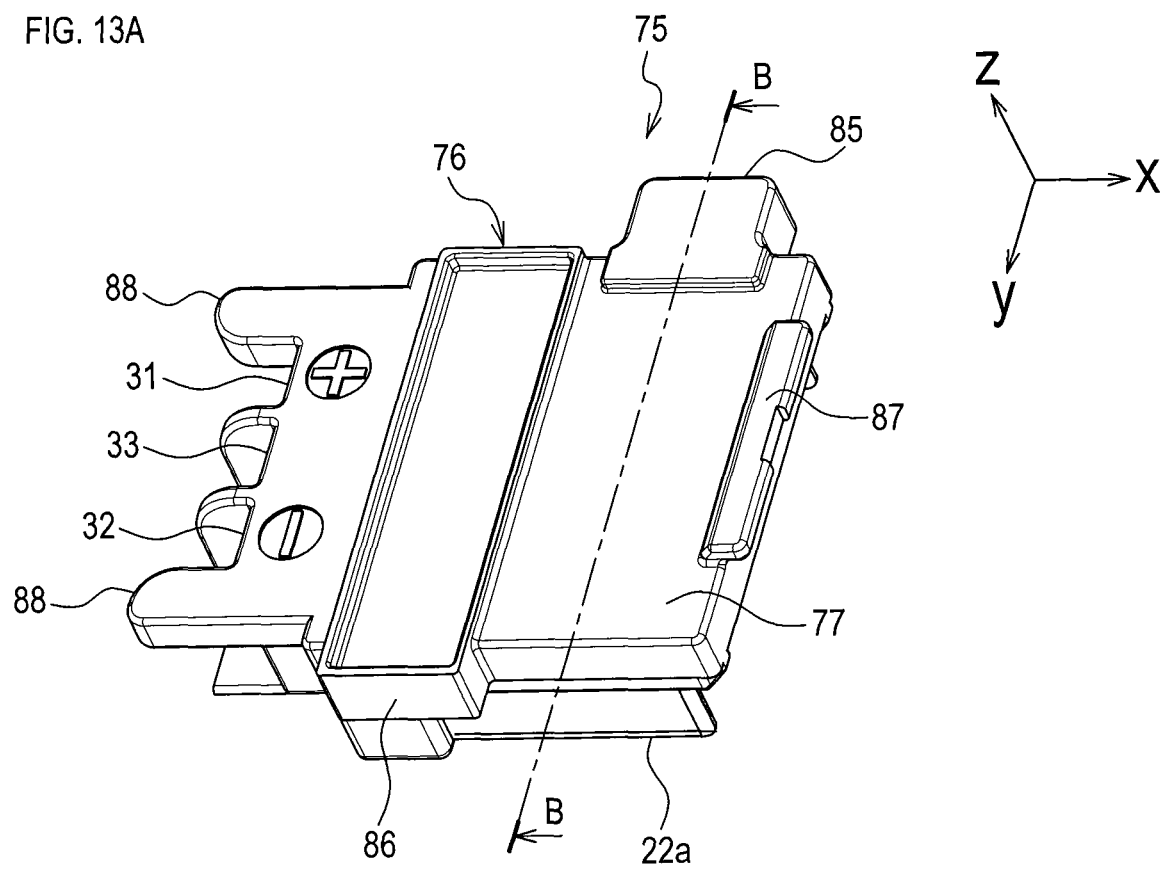
FIG. 13A is an upper perspective view.
Figure 13B:
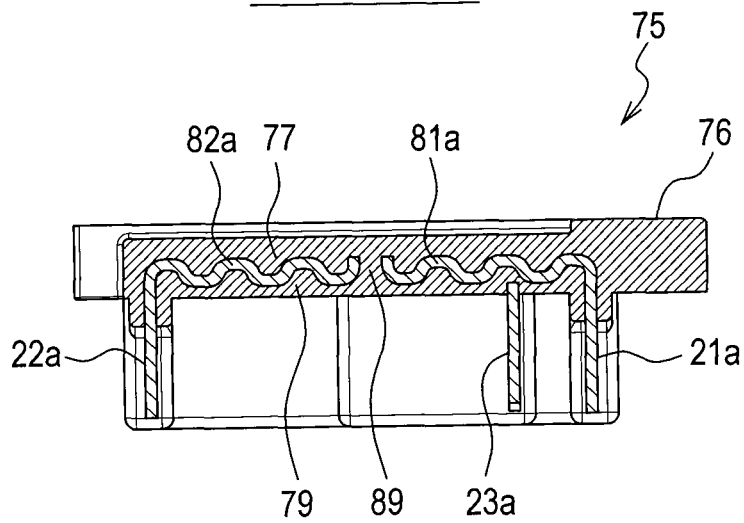
FIG. 13B is a cross sectional view taken along the line B-B in FIG. 13A.

Another example of the connecting terminal of the terminal block will be described as the fourth embodiment. FIGS. 12A, 12B, and 12C illustrate configurations of connecting terminals 81, 82, and 23 of a terminal block 75 of the fourth embodiment. The entire configuration of the terminal block 75 is illustrated in FIGS. 13A and 13B.

The terminal block 75 of the fourth embodiment is different from the terminal block 15 of the first embodiment in configuration that respective heat radiation plate portions of a positive electrode connecting terminal and a negative electrode connecting terminal are not in a flat plate shape but shaped having curved surfaces. The terminal block 75 of the fourth embodiment is basically the same as the terminal block 15 of the first embodiment, except that the respective heat radiation plate portions have the curved surface. Accordingly, the same configuration as the first embodiment will be described with reference to the same reference numbers as the first embodiment, and the detailed description thereof will be omitted.

As illustrated in FIGS. 12A, 12B, 12C, and 13B, an entirety of a positive electrode side heat radiation plate portion 81a of the positive electrode connecting terminal 81 and an entirety of a negative electrode side heat radiation plate portion 82a of the negative electrode connecting terminal 82 are each not in a flat plate shape but in a curved shape. Specifically, each heat radiation plate portion 81a and 82a is entirely formed in a corrugated plate shape.

The respective heat radiation plate portions 81a and 82a extend from the respective corresponding connection plate portions 21a and 22a in the same shape and same direction as the first embodiment. Accordingly, it is considered that the heat radiation plate portions 81a and 82a are provided in parallel and on the same flat surface as a whole. That is, the heat radiation plate portions 81a and 81b extend to be in a positional relationship that the heat radiation plate portions 81a and 81b extend along the common two-dimensional plane and entirely in parallel to the two-dimensional plane.

As illustrated in FIGS. 13A and 13B, the connecting terminals 81, 82, and 23 are held by a terminal holding member 76. The terminal holding member 76 includes a machine side resin portion 77, a pack side resin portion 79, a contact restraining portion 89, and ribs 85, 86, 87, and 88, in the same manner as the terminal holding member 16 of the first embodiment.

Strictly speaking, the terminal holding member 76 of the fourth embodiment is different from the terminal holding member 16 of the first embodiment in that the machine side resin portion 77 does not include the penetrating holes 18. Further, because the heat radiation plate portions 81a and 82a are shaped having curved surfaces, the z-axis directional thickness of the terminal holding member 76 is slightly greater than the terminal holding member 16 of the first embodiment.

According to the terminal block 75 of the fourth embodiment configured as described above, the respective heat radiation plate portions 81a and 82a are not a single flat plate but are formed in a curved shape. Therefore, it is possible to increase the surface areas of the respective heat radiation plate portions 81a and 82a. As a result, it is possible to improve heat radiation performance of the respective heat radiation plate portions 81a and 82a.

It may be determined accordingly which parts of the respective heat radiation plate portions 81a and 82a are to be formed curvedly. For example, a partial range of each heat radiation plate portion 81a and 82a may be curved and the other range thereof may be formed in a flat surface shape. Further, the curved shape may be a corrugated plate shape as an example and may be formed in other shapes.

Embodiment 5

Figure 14A:
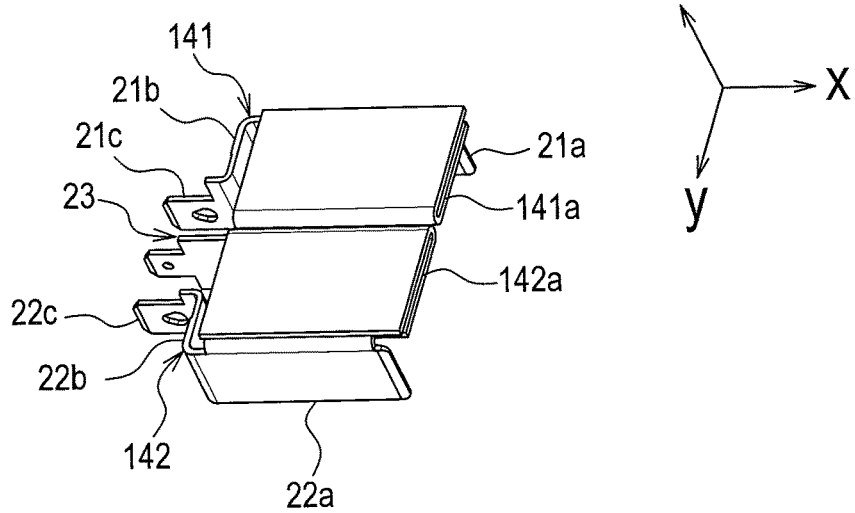
FIG. 14A is an upper perspective view.
Figure 14B:
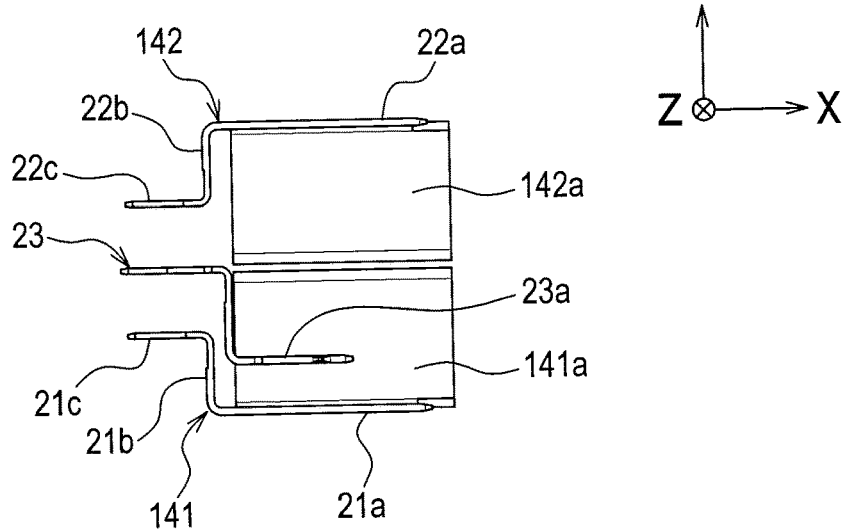
FIG. 14B is a bottom view.
Figure 14C:
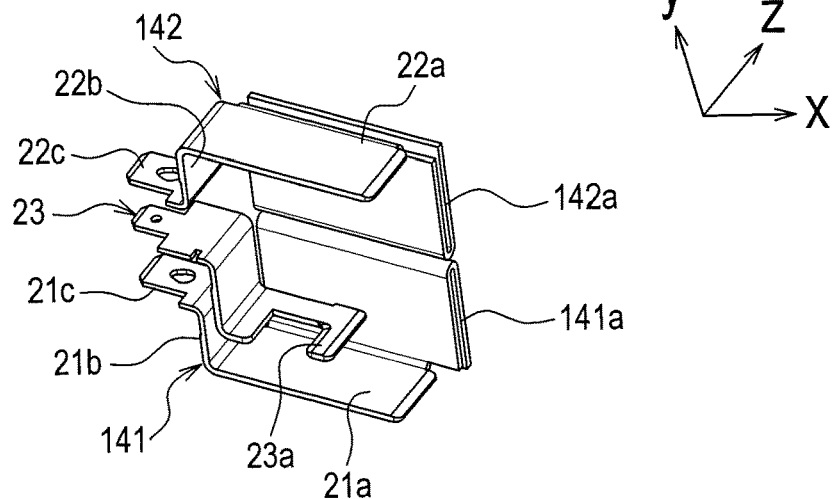
FIG. 14C is a lower perspective view.
Figure 15:
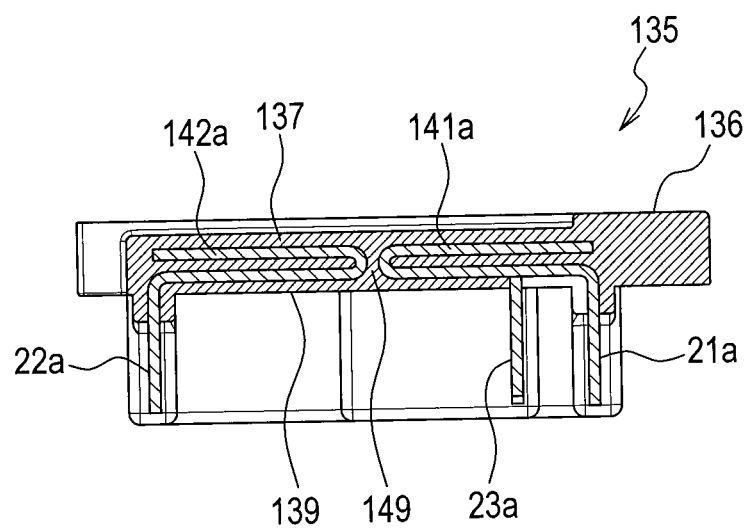
FIG. 15 is a cross sectional view of the terminal block of the fifth embodiment.

Another example of the connecting terminals of the terminal block will be described as a fifth embodiment. FIGS. 14A, 14B, and 14C illustrate configurations of connecting terminals 141, 142, and 23 of a terminal block 135 of the fifth embodiment. FIG. 15 is a cross sectional view illustrating the entire terminal block 135 of the fifth embodiment. The cross sectional view illustrates a cross-sectional portion of the terminal block 135 equivalent to a cross-sectional portion taken along the line B-B in FIG. 13A The terminal block 135 of the fifth embodiment is mainly different from the terminal block 75 of the fourth embodiment in configuration that respective heat radiation plate portions of a positive electrode connecting terminal and of a negative electrode connecting terminal are formed in folded back shape. The terminal block 135 of the fifth embodiment is basically the same as the terminal block 75 of the fourth embodiment other than the heat radiation plate portions in the folded back shape. Accordingly, the same configuration as the fourth embodiment will be described with reference to the same reference numbers as the fourth embodiment, and the detailed description thereof will be omitted.

As illustrated in FIGS. 14A, 14B, 14C, and 15, a positive electrode side heat radiation plate portion 141*a* of a positive electrode connecting terminal 141 and a negative electrode side heat radiation plate portion 142*a* of a negative electrode connecting terminal 142 are each formed in a manner that a flat plate having an approximately rectangular plate surface is folded back in a U-shape at 180 degrees at an approximately intermediate portion of the flat plate.

According to the fifth embodiment, it is considered that the heat radiation plate portions 141*a* and 142*a* are provided to entirely appear in parallel and on the same plane. That is, the heat radiation plate portions 141*a* and 141*b* extend to be in a positional relationship that the heat radiation plate portions 141*a* and 141*b* extend along the common two-dimensional plane and entirely in parallel to the two-dimensional plane.

As illustrated in FIG. 15, the connecting terminals 141, 142, and 23 are held by a terminal holding member 136. The terminal holding member 136 includes a machine side resin portion 137, a pack side resin portion 139, and a contact restraining portion 149, in the same manner as the terminal holding member 76 of the fourth embodiment.

According to the terminal block 135 configured as described above, the respective heat radiation plate portions 141*a* and 142*a* are formed by folding back the single flat plates in a U-shape. Therefore, it is possible to increase the surface areas of the respective heat radiation plate portions 141*a* and 142*a*. As a result, it is possible to improve heat radiation performance from the respective heat radiation plate portions 141*a* and 142*a*.

It may be determined accordingly the entire shape or size of each heat radiation plate portion 141*a* and 142*a* prior to be folded back and after having folded back. Further, each heat radiation plate portion 141*a* and 142*a* may be folded back two times or more to produce three or more layers that are accumulated and spaced as a whole.

Embodiment 6

Figure 16A:
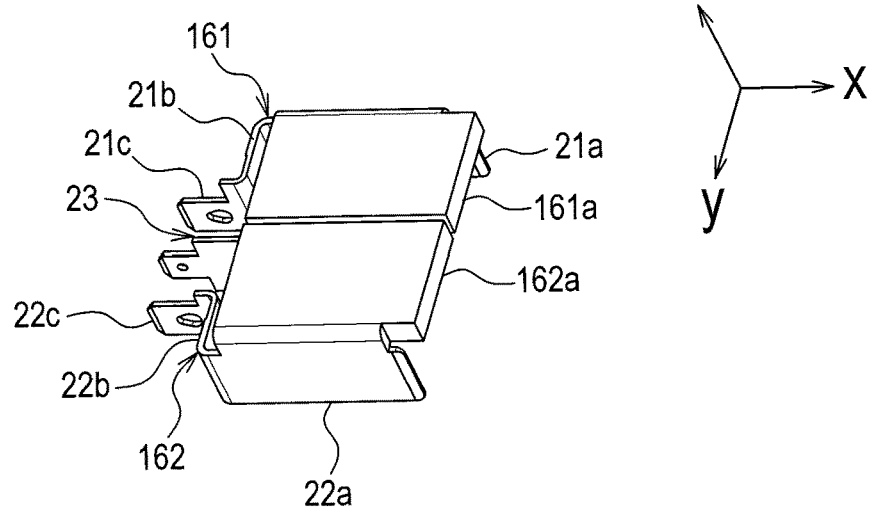
FIG. 16A is an upper perspective view.
Figure 16B:
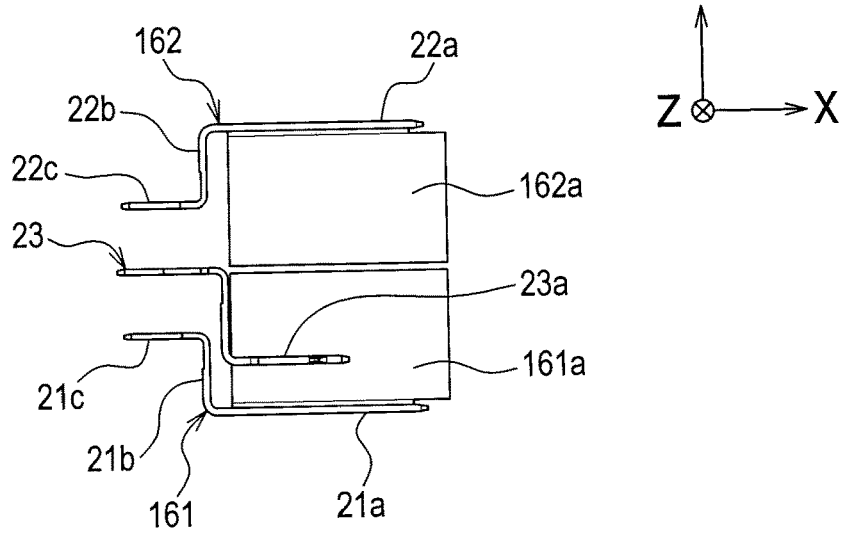
FIG. 16B is a bottom view.
Figure 16C:
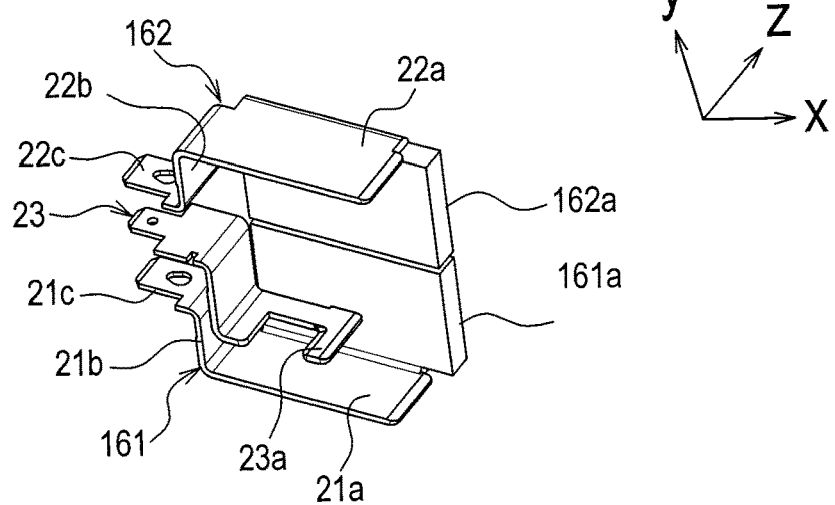
FIG. 16C is a lower perspective view.
Figure 17:
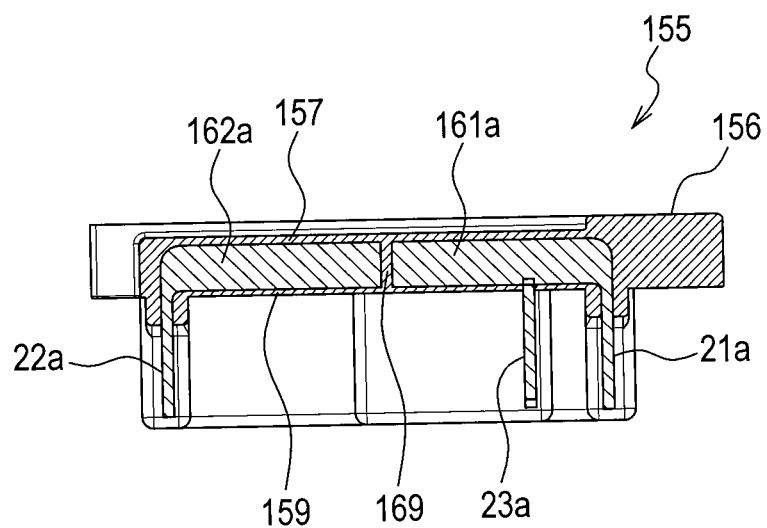
FIG. 17 is a cross sectional view of the terminal block of the sixth embodiment.

Another example of the connecting terminals of the terminal block will be described as a sixth embodiment. FIGS. 16A, 16B, and 16C illustrate configurations of connecting terminals 161, 162, and 23 of a terminal block 155 of the sixth embodiment. FIG. 17 is a cross sectional view illustrating the entire terminal block 155 of the sixth embodiment. The cross sectional view in FIG. 17 illustrates a cross-sectional portion of the terminal block 155 equivalent to a cross-sectional portion taken along the line B-B in FIG. 13A.

The terminal block 155 of the sixth embodiment is mainly different from the terminal block 15 of the first embodiment in configuration that respective heat radiation plate portions of a positive electrode connecting terminal and of a negative electrode connecting terminal have plate thicknesses greater than the plate thicknesses of the respective connection plate portions. The terminal block 155 of the sixth embodiment is basically the same as the terminal block 15 of the first embodiment except that the respective heat radiation plate portions have plate thicknesses greater than the respective connection plate portions. Accordingly, the same configuration as the first embodiment will be described with reference to the same reference numbers as the first embodiment, and the detailed description thereof will be omitted.

As illustrated in FIGS. 16A, 16B, 16C, and 17, a positive electrode side heat radiation plate portion 161*a* of a positive electrode connecting terminal 161 and a negative electrode side heat radiation plate portion 162*a* of a negative electrode connecting terminal 162 are each formed in a single flat plate shape as a whole. However, each heat radiation plate portion 161*a* and 162*a* has a plate thickness greater than a plate thickness of each connection plate portion 21*a* and 22*a*. Each connection plate portion 21*a* and 22*a* has the same plate thickness, and each heat radiation plate portion 161*a* and 162*a* has the same plate thickness. According to the sixth embodiment, the heat radiation plate portions 161*a* and 162*a* are arranged to entirely appear in parallel to each other and on the same plane.

As illustrated in FIG. 17, the connecting terminals 161, 162, and 23 are held by a terminal holding member 156. The terminal holding member 156 includes a machine side resin portion 157, a pack side resin portion 159, and a contact restraining portion 169, in the same manner as the terminal holding member 16 of the first embodiment.

According to the terminal block 155 configured as described above, each heat radiation plate portion 161*a* and 162*a* has a plate thickness greater than a plate thickness of each connection plate portion 21*a* and 22*a*. Therefore, it is possible to increase a surface area of each heat radiation plate portion 161*a* and 162*a*. Further, it is possible to increase a heat capacity capable of being conducted from the respective connection plate portions 21*a* and 22*a* to the respective heat radiation plate portions 161*a* and 162*a*. As a result, it is possible to improve heat radiation performance of the respective heat radiation plate portions 161*a* and 162*a*.

It is not essential to make the plate thickness of each heat radiation plate portion 161*a* and 162*a* the same, and the plate thickness may be different. In this case, for example, one of the heat radiation plate portions may have the same plate thickness as the connection plate portion, and the other one may be thicker than the connection plate portion. Further, the one heat radiation plate portion may have the plate surface of two different thicknesses or more. For example, the one heat radiation plate portion may have a partial range being thicker than the connection plate portion and the other range being the same thick as the connection plate portion.

Embodiment 7

Figure 18A:
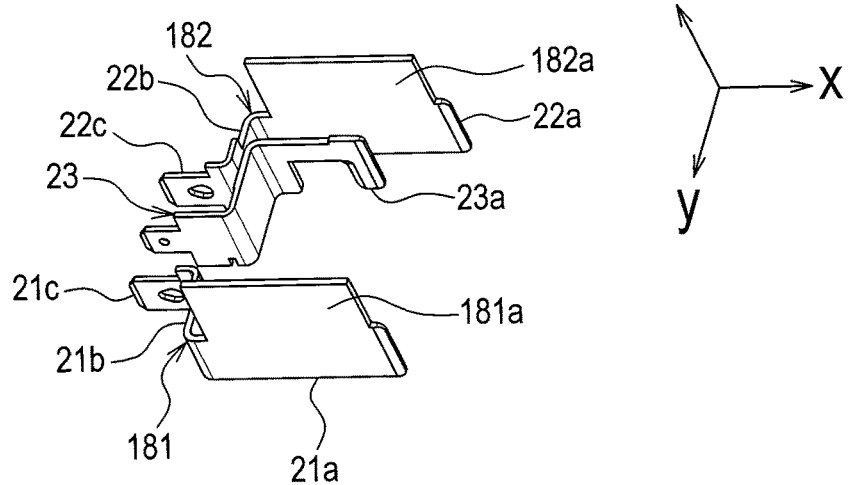
FIG. 18A is an upper perspective view.
Figure 18B:
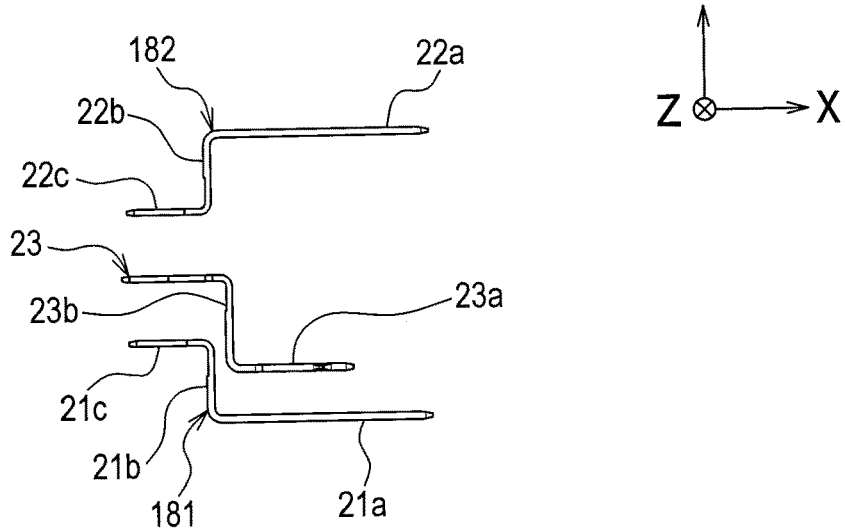
FIG. 18B is a bottom view.
Figure 18C:
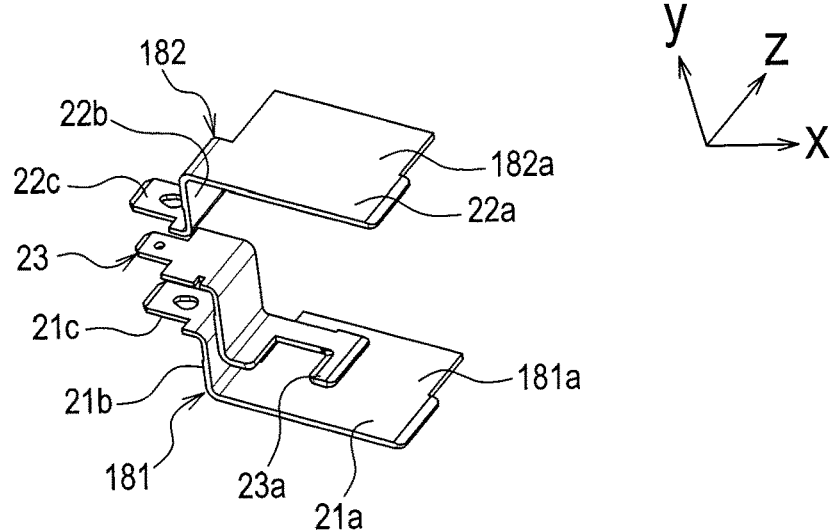
FIG. 18C is a lower perspective view.
Figure 19A:
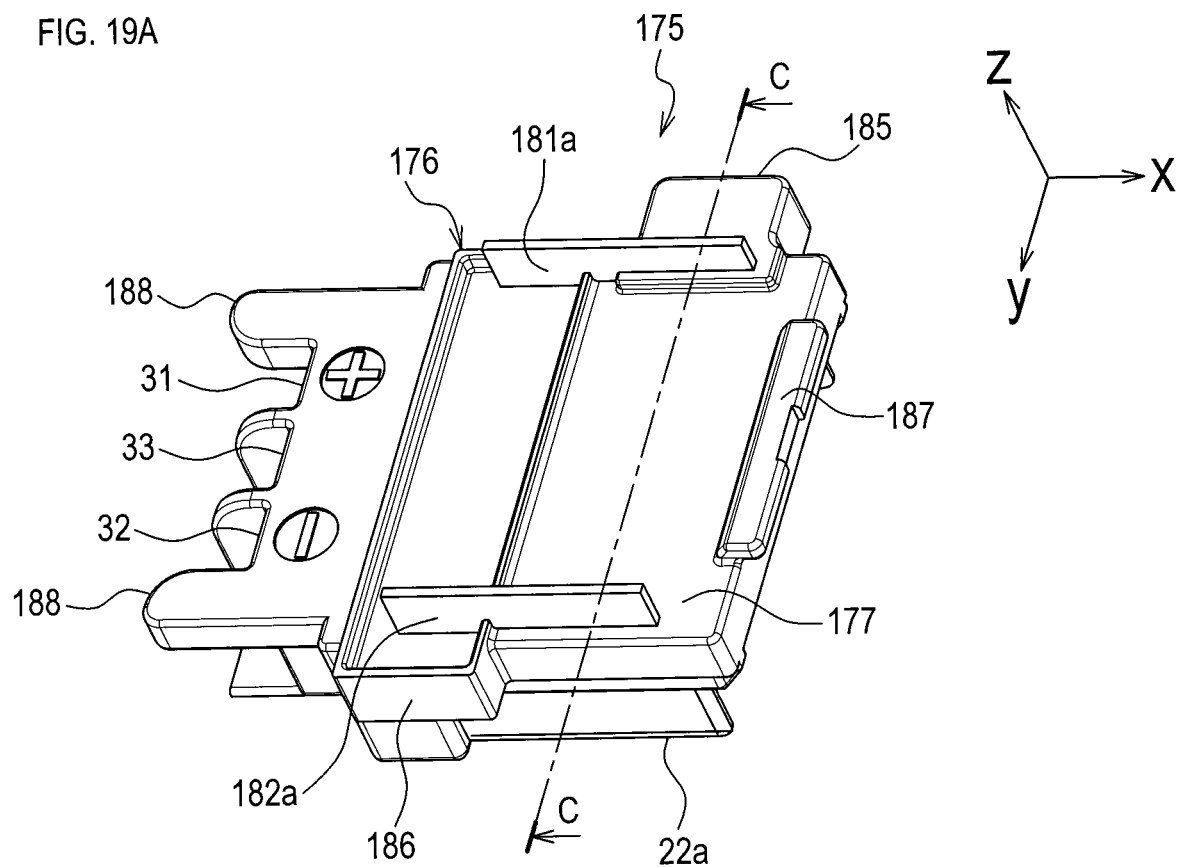
FIG. 19A is an upper perspective view.
Figure 19B:
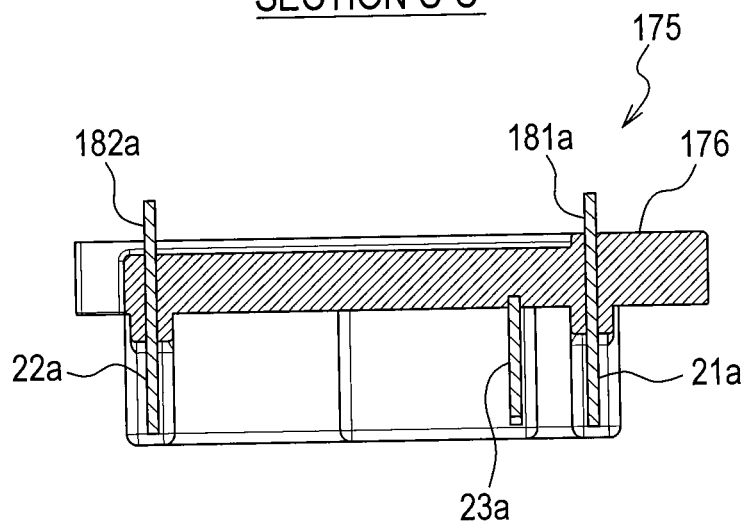
FIG. 19B is a cross sectional view taken along the line C-C in FIG. 19A.

Another example of the connecting terminals of the terminal block will be described as a seventh embodiment. FIGS. 18A, 18B, and 18C illustrate configurations of connecting terminals 181, 182, and 23 of a terminal block 175 of the seventh embodiment. FIGS. 19A and 19B illustrate the entire configuration of the terminal block 175 of the seventh embodiment.

The terminal block 175 of the seventh embodiment is mainly different from the terminal block 15 of the first embodiment in configuration that respective heat radiation plate portions of a positive electrode connecting terminal and of a negative electrode connecting terminal extend in a direction parallel to the plate surfaces of respective connection plate portions. The terminal block 175 of the seventh embodiment is basically the same as the terminal block 15 of the first embodiment other than the respective heat radiation plate portions extending in a direction parallel to the plate surfaces of the respective connection plate portions. Accordingly, the same configuration as the first embodiment will be described with reference to the same reference numbers as the first embodiment, and the detailed description thereof will be omitted.

As illustrated in FIGS. 18A, 18B, 18C, and 19B, a positive electrode side heat radiation plate portion 181a of a positive electrode connecting terminal 181 and a negative electrode side heat radiation plate portion 182a of a negative electrode connecting terminal 182 extend from the corresponding connection plate portions 21a and 22a in the z-axis direction on the respective same planes.

As illustrated in FIGS. 19A and 19B, the connecting terminals 181, 182, and 23 are held by a terminal holding member 176. The terminal holding member 176 includes a resin portion 177 and ribs 185, 186, 187, and 188.

The respective heat radiation plate portions 181a and 182a are provided protruding from the resin portion 177 in the z-axis direction relative to the terminal holding member 176. That is, the respective heat radiation plate portions 181a and 182a are configured relative to the terminal holding member 176 to extend in a direction opposite to an extending direction of the respective connection plate portions 21a and 22a in the z-axis direction and to protrude outwardly from the terminal holding member 176.

According to the terminal block 175 configured as described above of the seventh embodiment, the respective heat radiation plate portions 181a and 182a protrude from the terminal holding member 176 to the inner space of the electric working machine. As a result, heat radiation to the inner space of the electric working machine is performed favorably.

Embodiment 8

Figure 20:
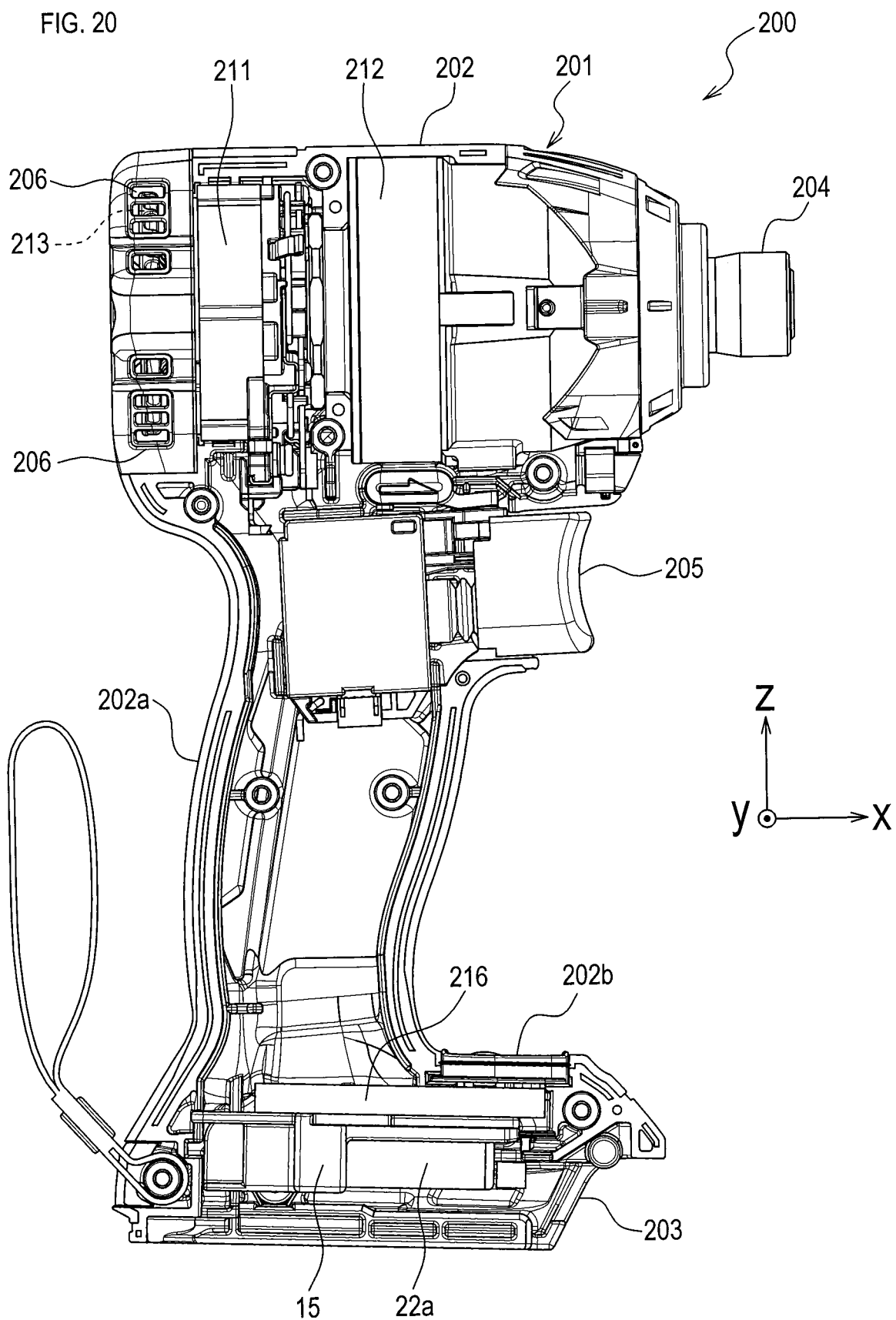
FIG. 20 is a side sectional view of a driver drill according to an eighth embodiment.
Figure 21:
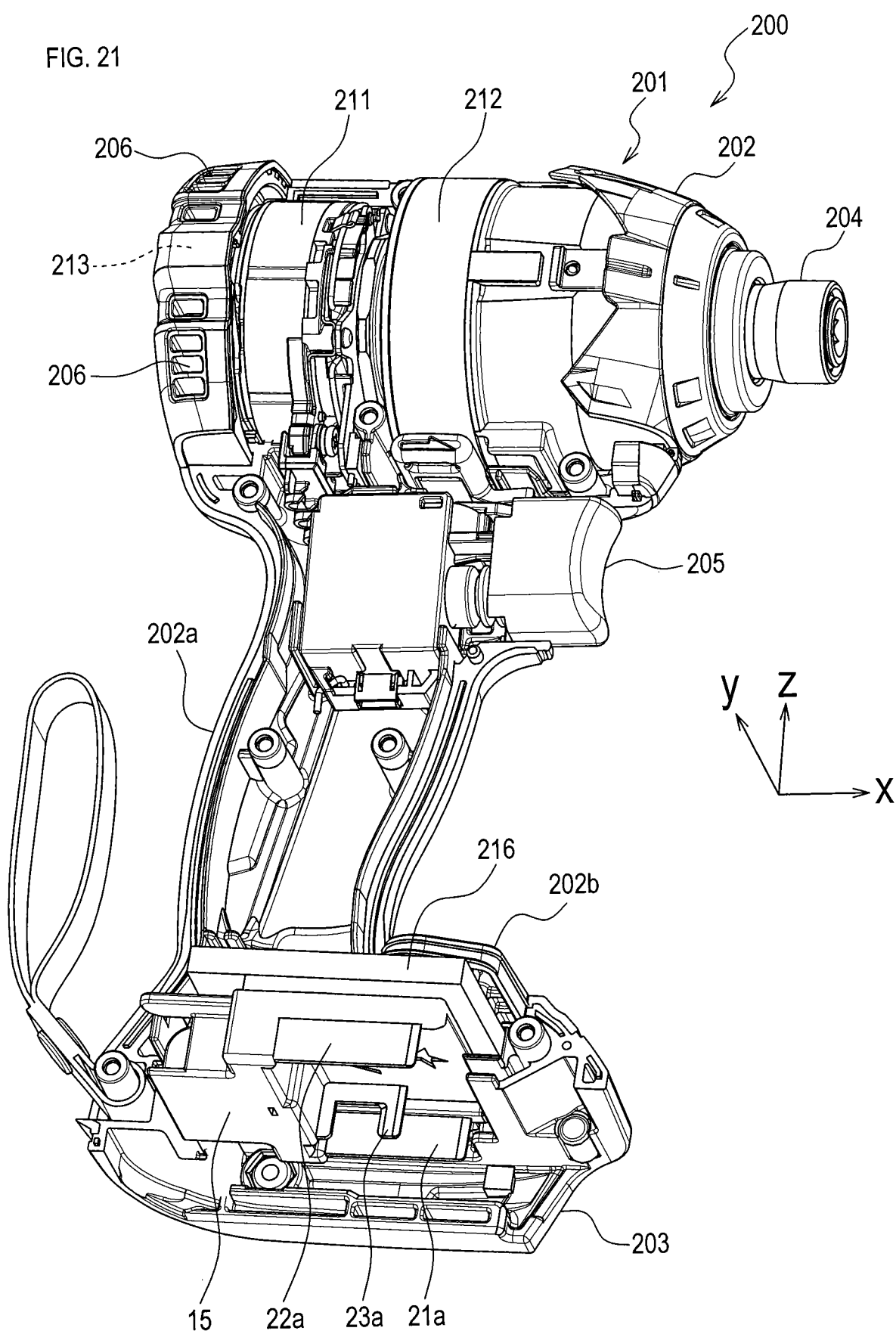
FIG. 21 is a perspective sectional view of the driver drill of the eighth embodiment.

An electric working machine of an eighth embodiment will be described with reference to FIGS. 20, 21, and 22. As illustrated in FIGS. 20 and 21, the electric working machine of the eighth embodiment is configured as a driver drill 200.

The driver drill 200 of the eighth embodiment is basically configured in the same manner as the driver drill 100 of the fourth embodiment, except that the driver drill 200 includes a heat radiation sheet 216 described below. That is, for the driver drill 200 of the eighth embodiment, the battery pack 50 is attachable to and detachable from a machine body 201.

As illustrated in FIGS. 20 and 21, the machine body 201 of the driver drill 200 includes a housing 202. The housing 202 is formed in a manner that a grip 202a protrudes from the housing 202 downwardly. The grip 202a is provided with a trigger operation portion 205. A battery mounting portion 203 is formed at the lower end of the grip 202a. The battery pack 50 is mounted on the battery mounting portion 203 by slidably moving the battery pack 50 from the front to the back of the machine body 201 relative to the battery mounting portion 203.

An opening (not illustrated) is formed at the lower end of the grip 202a, and the terminal block 15 is provided to close the opening. According to the eighth embodiment, the terminal block 15 of the first embodiment is illustrated as the terminal block. However, the other terminal blocks of the other embodiments or other terminal blocks may be employed.

A cover portion 202b is provided at the lower front part of the grip 202a of the housing 202. The cover portion 202b is a part of the housing 202 and is configured to be removable from the housing 202. The housing 202 may not include the cover portion 202b and the portion of the cover portion 202b may be formed as a part of the casing side surface in the same manner as other parts.

Housed in the housing 202 are various components including a motor 211, a speed reducing mechanism 212, a fan 213, and so on. The positional relationship of these components is the same as the fourth embodiment. The motor 211 and the speed reducing mechanism 212 are the same as the motor 121 and the speed reducing mechanism 122 of the driver drill 100 of the fourth embodiment.

When the operator pulls the trigger operation portion 205, the motor 211 is energized by the battery pack 50, and thus the motor 211 rotates. The rotation speed of the motor 211 is reduced by the speed reducing mechanism 212, and the reduced rotation speed is transmitted to a chuck portion 204.

The fan 213 is rotatably driven by the motor 211, but the direction of the flow of the wind is opposite to the one of the fan 123 of the fourth embodiment. Exhaust ports 206 are formed at the rear side surface of the housing 202, and not-illustrated intake ports are formed at the front side surface of the housing 202. Air flows generated as described above cool the components inside the housing 202, including the motor 211.

According to the eighth embodiment, the heat radiation sheet 216 is provided on the upper surface of the terminal block 15, i.e., on the upper surface of the terminal holding member 16. The heat radiation sheet 216 is arranged to come in direct contact with the terminal holding member 16 and with an inner wall surface (mainly a reverse surface of the cover portion 202b in the eighth embodiment) of the housing 202.

The heat radiation sheet 216 as the heat radiation member is provided for the main purpose of radiating heat generated at the terminal block 15 to the housing 202. Because the terminal block 15 and the housing 202 are thermally connected to each other via the heat radiation sheet 216, it is possible to efficiently radiate heat generated at the terminal block 15. It may be determined accordingly which material is to be employed as the heat radiation sheet. For example, a material containing silicon as a main component may be used.

It may be determined accordingly how the heat radiation sheet 216 is arranged and positioned relative to the terminal block 15. The heat radiation sheet 216 illustrated in FIGS. 20 and 21 is fixed to the terminal block 15, for example, by an adhesive.

Further, for example, the terminal block may be provided with ribs and the heat radiation sheet may be positioned based upon the ribs. FIG. 22 illustrates an example of a terminal block including ribs for the heat radiation sheet. A terminal block 225 illustrated in FIG. 22 is basically the same as the terminal block 15 of the first embodiment, except that four L-shaped ribs 231, 232, 233, and 234 are provided on the upper surface of a terminal holding member 226.

Provided on the upper surface of the terminal holding member 226 is a sheet arrangement region 230 to be arranged with a heat radiation sheet 236 thereon. The four ribs 231, 232, 233, and 234 are arranged to surround the four corners of the sheet arrangement region 230. When the heat radiation sheet 236 is arranged at the sheet arrangement region 230, the four corners of the heat radiation sheet 236 are positioned at the four corresponding ribs 231, 232, 233, and 234, respectively. Accordingly, the movement of the heat radiation sheet 236 relative to the terminal block 225 in a horizontal direction (x-y plane direction) is restrained thereby.

Figure 22:
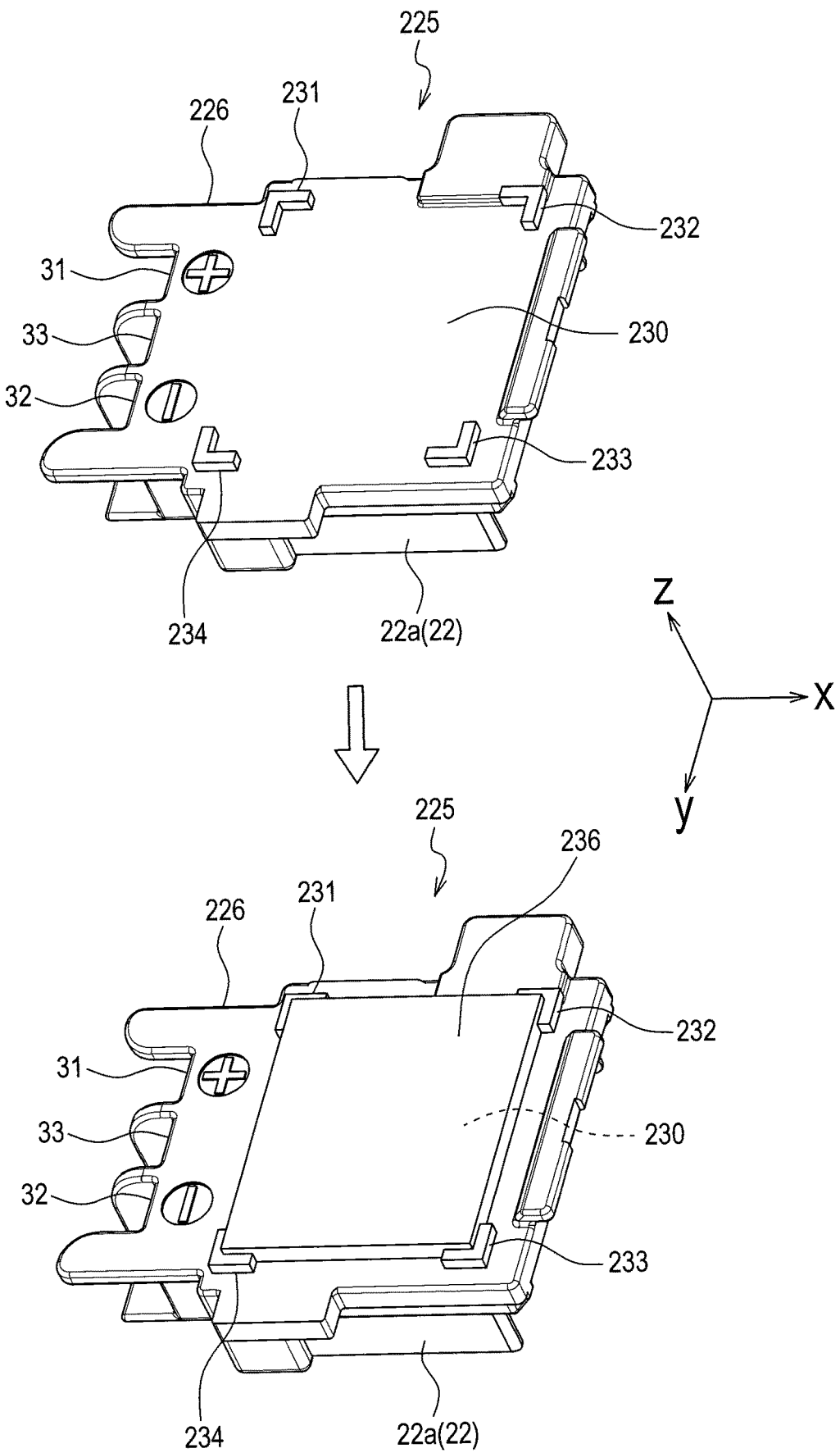
FIG. 22 is a perspective view of a terminal block of the eighth embodiment.

Also for the driver drill 200 illustrated in FIGS. 20 and 21, the heat radiation sheet is stably positioned by employing the terminal block 225 of FIG. 22 as the terminal block.

Embodiment 9

An electric working machine according to a ninth embodiment will be described with reference to FIGS. 23 and 24. The electric working machine of the ninth embodiment is configured as a driver drill 240. The driver drill 240 is different from the driver drill 200 of the eighth embodiment of FIGS. 20 and 21 in that the driver drill 240 includes a controller 246 and a heat radiation sheet 247 is provided between the terminal block 15 and the controller 246.

Figure 23:
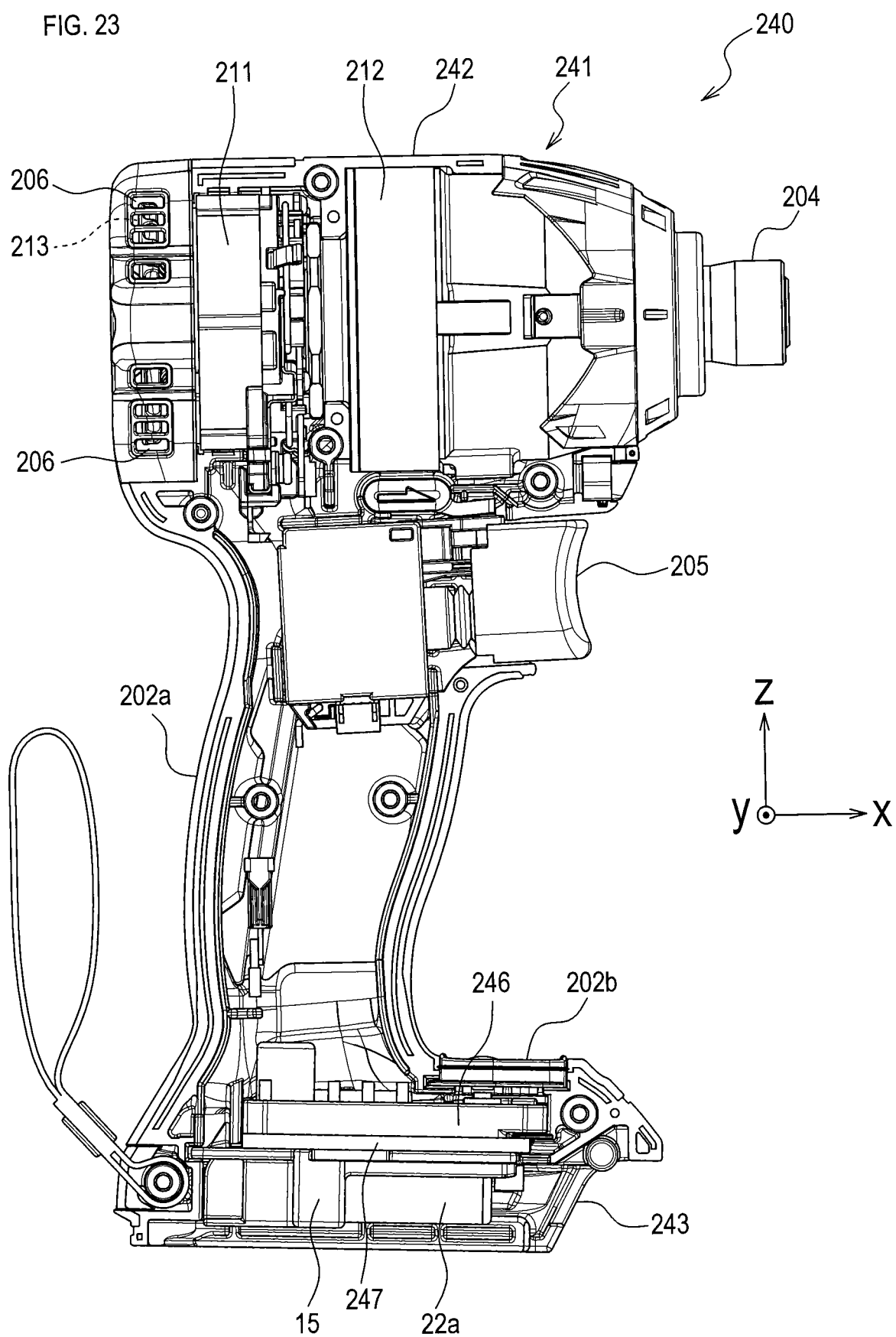
FIG. 23 is a side sectional view of a driver drill according to a ninth embodiment.
Figure 24:
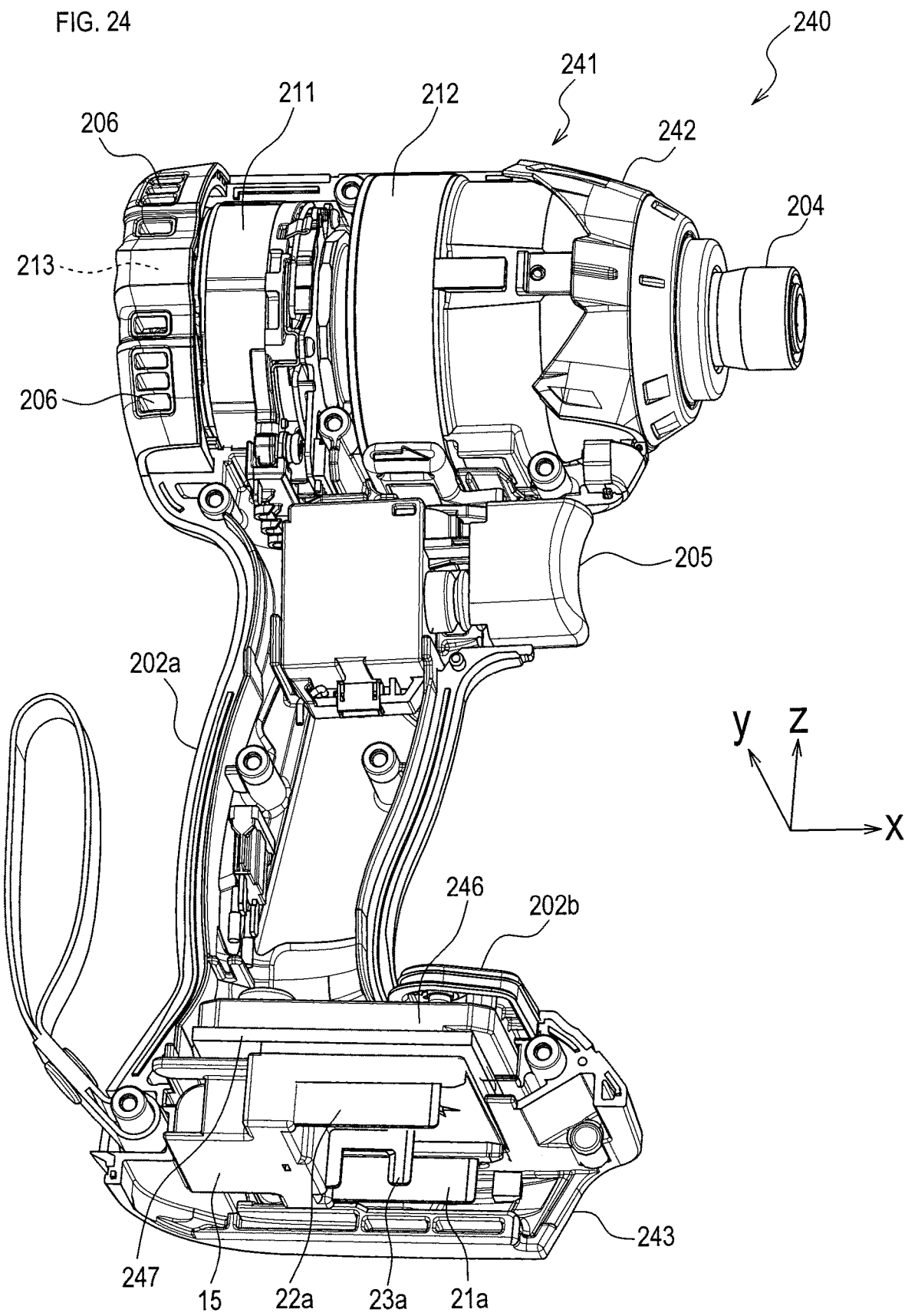
FIG. 24 is a perspective sectional view of the driver drill of the ninth embodiment.

As illustrated in FIGS. 23 and 24, a machine body 241 of the diver drill 240 includes a housing 242, and a battery mounting portion 243 is formed at the lower portion of the housing 242. The controller 246 is provided above the terminal block 15 at the lower end side in the housing 242. The terminal block 15 and the controller 246 are electrically connected to each other by a positive electrode lead wire, a negative electrode lead wire, and a signal lead wire (none of them illustrated). The controller 246 functions basically in the same manner as the controller 124 of the fourth embodiment and controls electric power supply from the battery pack 50 to the inside load portions such as the motor 211, based upon the operation condition of the trigger operation portion 205 and so on.

A heat radiation sheet 247 is provided between an upper surface of the terminal block 15 and a lower surface of the controller 246 so as to contact these upper and lower surfaces. According to such configuration, the heat generated at the terminal block 15 is able to be radiated favorably to the controller 246 via the heat radiation sheet 247.

Embodiment 10

Another example of a configuration to radiate heat from a terminal block to a housing of an electric working machine will be described as a tenth embodiment. A terminal block 255 of the tenth embodiment will be described with reference to FIGS. 25, 26A, 26B, and 26C.

The terminal block 255 of the tenth embodiment is different from the terminal block 15 of the first embodiment mainly in terms of the following two points; the configurations of a positive electrode connecting terminal and a negative electrode connecting terminal and a shape of a terminal holding member.

Figure 26A:
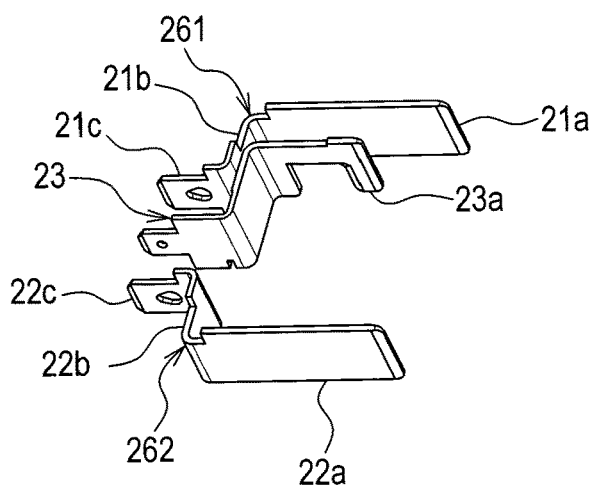
FIG. 26A is an upper perspective view.
Figure 26A:
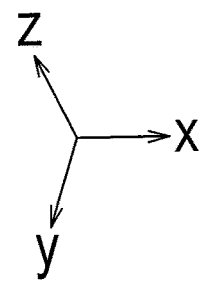
Figure 26B:
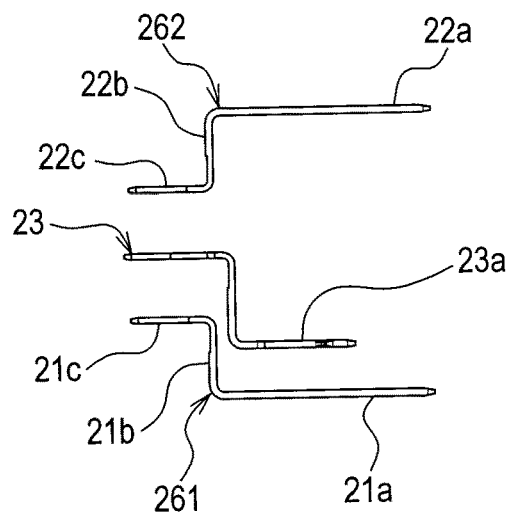
FIG. 26B is a bottom view.
Figure 26B:
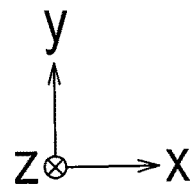
Figure 26C:
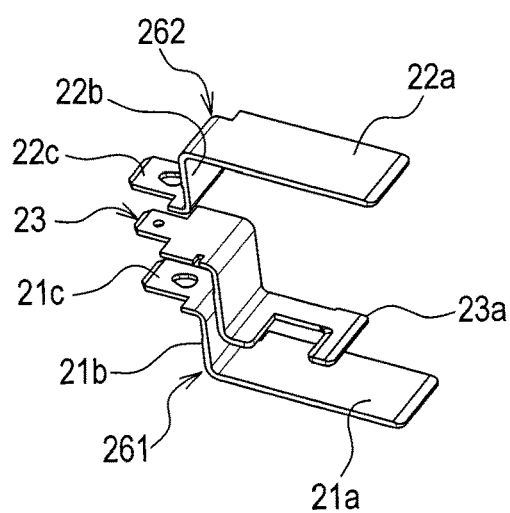
FIG. 26C is a lower perspective view.
Figure 26C:
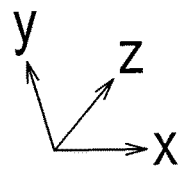

As illustrated in FIGS. 26A, 26B, and 26C, a positive electrode connecting terminal 261 of the terminal block 255 of the tenth embodiment is configured in a manner that the positive electrode side heat radiation plate portion 21d is omitted from the positive electrode connecting terminal 21 of the first embodiment. The same applies to a negative electrode connecting terminal 262. The negative electrode connecting terminal 262 is configured in a manner that the negative electrode side heat radiation plate portion 22d is omitted from the negative electrode connecting terminal 22 of the first embodiment.

Figure 25:
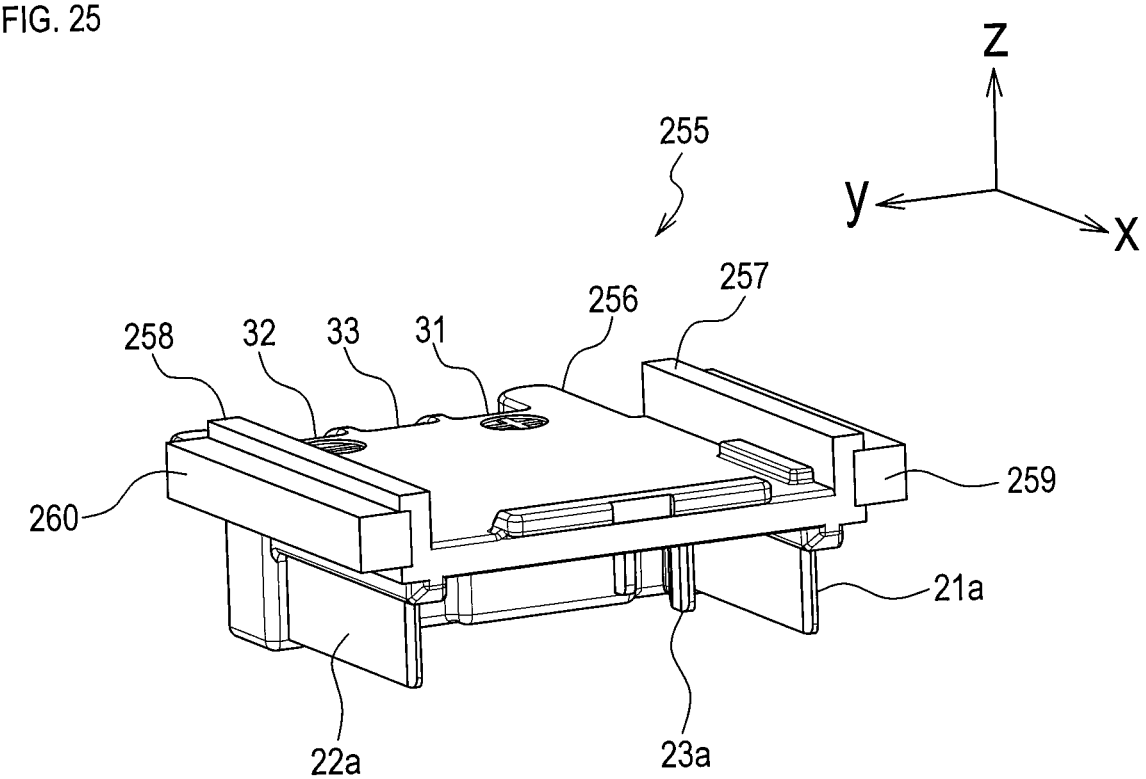
FIG. 25 is a perspective view of a terminal block according to a tenth embodiment.

As illustrated in FIG. 25, a terminal holding member 256 of the terminal block 255 of the tenth embodiment is formed with heat radiation supporting portions 257 and 258 at both ends in the y-axis direction. Each heat radiation supporting portion 257 and 258 is a groove-shaped member extending in the x-axis direction. Heat radiation members 259 and 260 are arranged in groove ranges of the groove-shaped heat radiation supporting portions 257 and 258, respectively. The heat radiation members 259 and 260 are in long square column shape and are fitted into the groove ranges of the heat radiation supporting portions 257 and 258, respectively.

Figure 27:
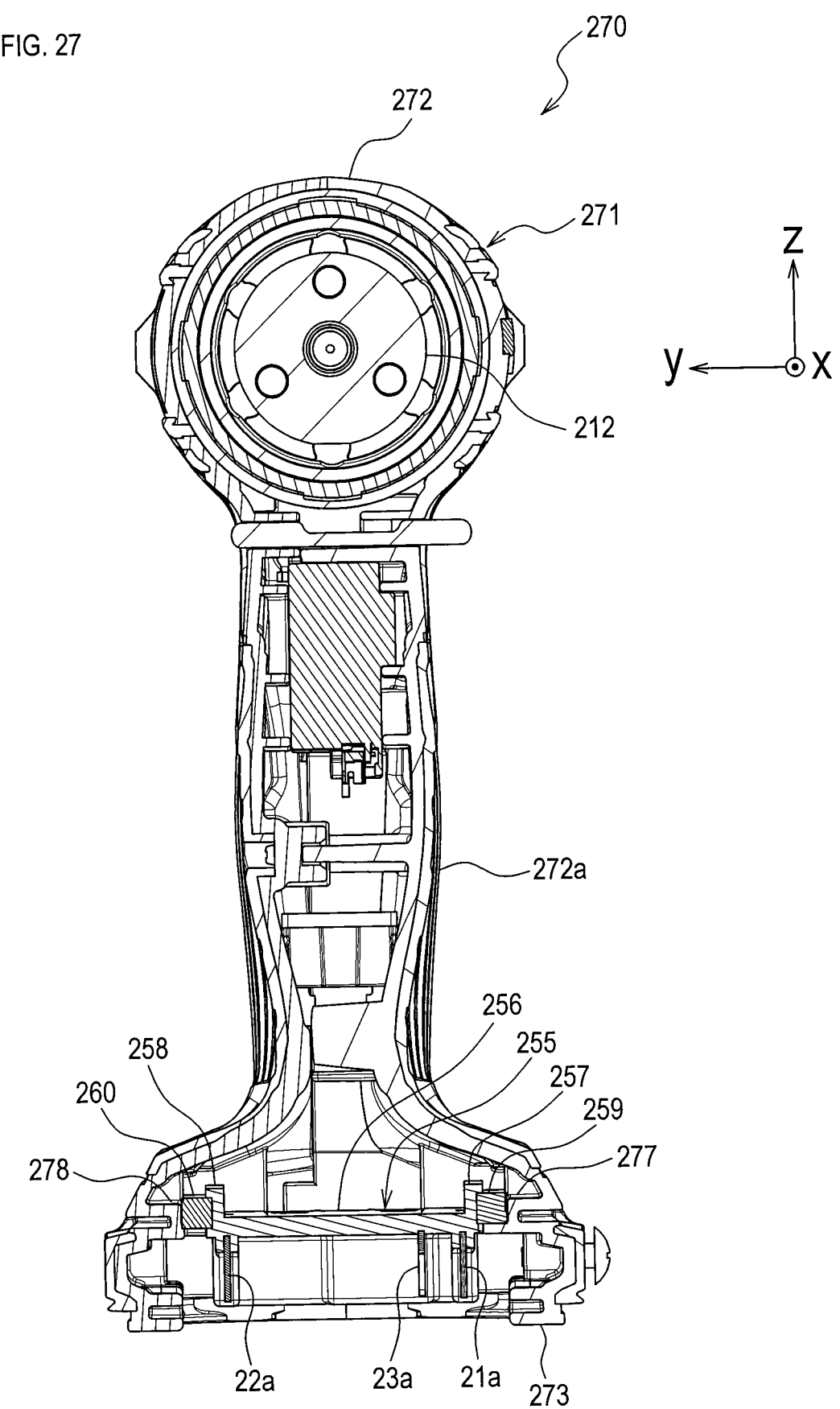
FIG. 27 is a front sectional view of a driver drill of the tenth embodiment.

The terminal block 255 is arranged in the electric working machine as illustrated in FIG. 27. The electric working machine in FIG. 27 is configured as a driver drill 270. A machine body 271 of the driver drill 270 includes a housing 272, and a battery mounting portion 273 is formed at the lower portion of the housing 272.

The terminal block 255 is arranged as illustrated in FIG. 27 within the housing 272 of the machine body 271. Main body side supporting portions 277 and 278 are formed at portions of the lower inner wall of the housing 272, which face the heat radiation members 259 and 260. The heat radiation members 259 and 260 are arranged so as to contact the opposing main body side supporting portions 277 and 278, respectively.

That is, the terminal holding member 256 of the terminal block 255 is thermally connected to the housing 272 via the heat radiation members 259 and 260. Accordingly, heat generated at the terminal block 255 is favorably radiated to the housing 272 via the heat radiation members 259 and 260.

Specific shapes of the heat radiation members 259 and 260 and the positional relationship thereof relative to the terminal block may be determined accordingly. Further, it may be determined accordingly which material is used for the heat radiation members 259 and 260. For example, material having silicone as a main component may be employed.

According to the tenth embodiment, each connecting terminal 261 and 262 does not include the heat radiation plate portion. However, it is configured in a manner that the heat generated at the terminal block 255 is favorably radiated to the housing 272 via the heat radiation members 259 and 260. Accordingly, it is possible to favorably radiate heat from the terminal block 255 as the entire electric working machine.

That is, as specific means to improve heat radiation performance of the terminal block, various means can be employed other than the provision of the heat radiation plate portions at the connecting terminals of the terminal block, such as heat radiation to the housing via the heat radiation members as described in the tenth embodiment, heat radiation to the housing via the heat radiation sheet as described in the eighth and ninth embodiments, and cooling by use of a separately provided fan device for cooling a terminal block according to an eleventh embodiment as described below. By employing such various means, good heat radiation from the terminal block can be achieved even without providing the heat radiation plate portions at the respective connecting terminals of the terminal block.

Embodiment 11

Figure 28:
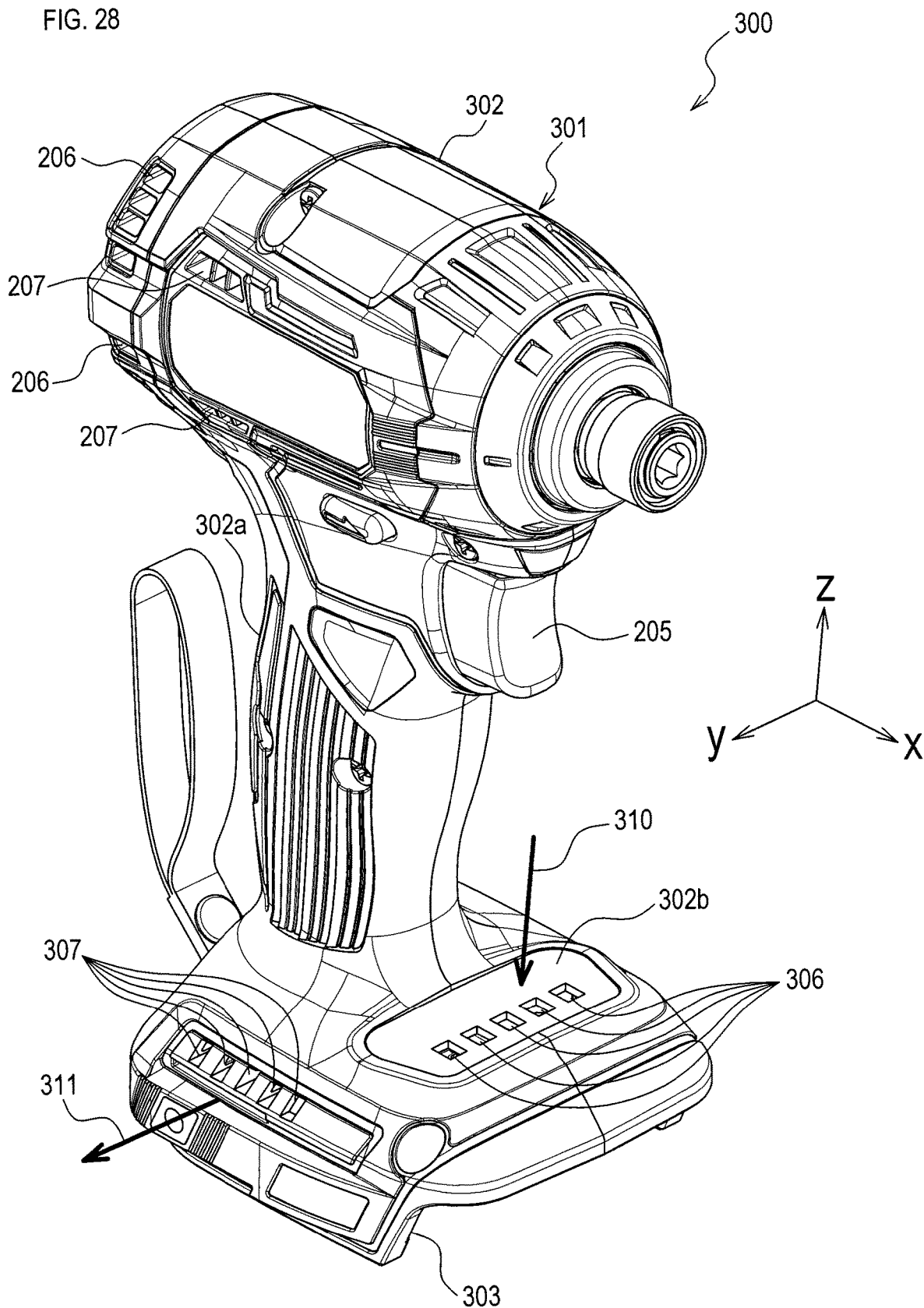
FIG. 28 is a perspective view of a driver drill according to an eleventh embodiment.
Figure 29:
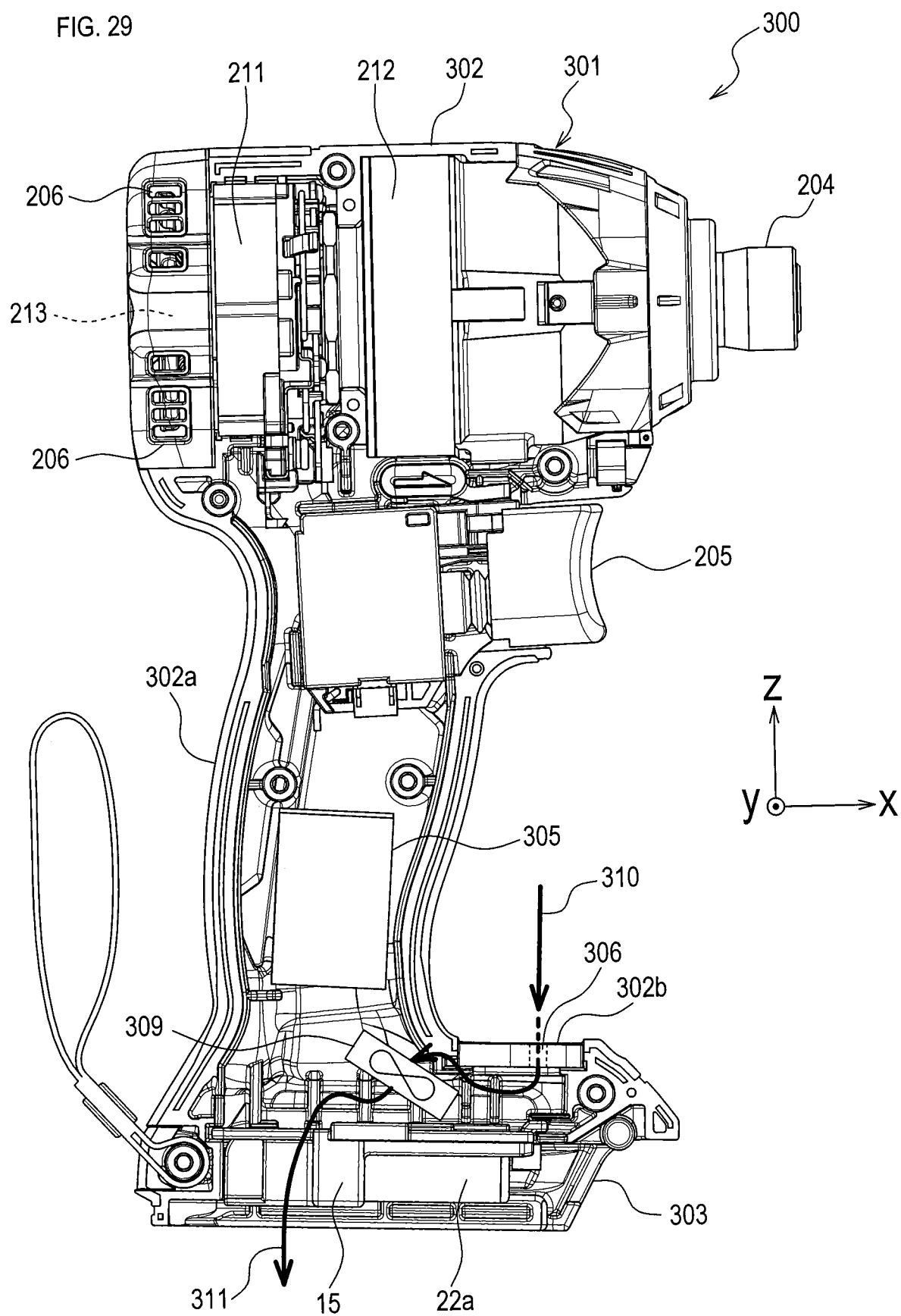
FIG. 29 is a side sectional view of the driver drill of the eleventh embodiment.

Another example of the electric working machine will be described as an eleventh embodiment. The electric working machine of the eleventh embodiment illustrated in FIGS. 28 and 29 is configured as a driver drill 300. A machine body 301 of the driver drill 300 includes a housing 302, and a battery mounting portion 303 is formed at the lower portion of the housing 302. The components of the driver drill 300 the same as the components of the driver drill 200 of the eighth embodiment are attached with the same reference numbers as the eighth embodiment.

Regarding the driver drill 300, a cover portion 302b is provided at the lower front part of the housing 302, in the same manner as the eighth embodiment. The cover portion 302b of the eleventh embodiment is formed with a plurality of lower intake ports 306. The quantity or shape of the lower intake ports 306 may be determined accordingly.

Further, at the lower portion of the housing 302, a plurality of lower exhaust ports 307 is formed at both side surfaces in the y-axis direction. The quantity or shape of the lower exhaust ports 307 may be determined accordingly.

As illustrated in FIG. 29, the terminal block 15 is provided inside the housing 302. A controller is provided above the terminal block 15 at a certain distance therefrom. A fan assist mainly for cooling the terminal block 15 (hereinafter, referred to as "auxiliary fan") 309 is provided within the space between the terminal block 15 and the controller.

The auxiliary fan 309 is configured to operate by electric power of the battery pack 50 when the battery pack 50 is connected. For example, the auxiliary fan 309 is operated while electric power is being supplied from the battery pack 50 into the machine body 301 via the terminal block 15 in response to the pulling operation of the trigger operation portion 205.

In response to the operation of the auxiliary fan 309, air flows along air paths 310 and 311 are generated inside the housing 302 exemplarily as illustrated in FIGS. 28 and 29. That is, in response to the operation of the auxiliary fan 309, an outside air flows in from the lower intake ports 306 into the housing 302 along the inflow air path 310, and the air inside the housing 302 is discharged to the outside from the lower exhaust ports 307 along the discharge air path 311.

As described above, according to the eleventh embodiment, the auxiliary fan 309 to cool the terminal block 15 is provided. It is thus possible to more effectively radiate heat generated at the terminal block 15. In addition, the air sent from the auxiliary fan 309 blows against the terminal block 15 prior to blowing against the controller. Therefore, it is possible to inhibit a part of cooling effects yielded by the auxiliary fan 309 from being deprived by the controller and to rapidly and effectively cool the terminal block 15.

According to the eleventh embodiment, the auxiliary fan 309 corresponds to a second fan, and the fan 213 to cool the motor corresponds to a first fan.

OTHER EMBODIMENTS

The embodiments of the present disclosure were described above. However, the present disclosure is not limited to the above embodiments and various modes are applicable.

(1) According to the above embodiments, regarding the terminal block 15, the positive electrode side connection plate portion 21a, the negative electrode side connection plate portion 22a, the positive electrode side heat radiation plate portion 21d, and the negative electrode side heat radiation plate portion 22d are all in rectangular plate-shape, but the shapes are not necessarily limited to the rectangular shape. For example, these components may be shaped in polygonal shape other than rectangular or may have outer peripheries at least partially including curves, as far as the shapes are considered as plate shapes as a whole.

(2) According to the above embodiments, regarding the terminal block 15, the positive electrode side heat radiation plate portion 21d is configured to extend integrally from the positive electrode side connection plate portion 21a. However, it is not essential that the positive electrode side heat radiation plate portion 21d is formed integrally with the positive electrode side connection plate portion 21a. For example, the positive electrode side heat radiation plate portion 21d may be provided to the positive electrode side connection plate portion 21a via another member, for example. That is, the positive electrode side heat radiation plate portion 21d may be provided to the positive electrode side connection plate portion 21a as far as heat conducting is allowed therebetween. The same applies to the relationship between the negative electrode side connection plate portion 22a and the negative electrode side heat radiation plate portion 22d. The positive electrode side heat radiation plate portion 21d and the negative electrode side heat radiation plate portion 22d are not necessarily limited to conductors.

(3) According to the first embodiment, the penetrating holes 18 formed penetrating the machine side resin portion 17 are exemplified as the example of the recess provided at the machine side resin portion 17 of the terminal block 15. Such configuration of penetrating the machine side resin portion 17 is merely one example of the recess.

For example, the machine side resin portion 17 may be provided with a bottomed-shaped recess that is recessed from the surface of the machine side resin portion 17 and yet does not penetrate the machine side resin portion 17. Further, the recess, i.e., the inner wall of the recess, may be formed in various shapes in both cases of bottomed shape and bottomless shape. For example, the recess may be conical form, frustum form, or other equivalent forms thereto. For example, the recess may be in a bottomed bowl shape.

The quantity or position of the recess may be determined accordingly. Further, the recess provided penetrating like the penetrating holes 18 of the first embodiment and the recess provided not penetrating may exist mixedly.

(4) In case of the machine side resin portion including the convex portion, the quadrangular pyramid shape such as the convex portions 72 of the second embodiment is merely one example. The shape, quantity, and position of the convex portion may be determined accordingly. For example, the machine side resin portion may include a convex portion in other shapes, such as conical form, frustum form, or other equivalent forms thereto. Still further, the machine side resin portion may include a convex portion in hemisphere shape or other shapes equivalent thereto, for example.

The convex portions and the recesses may exist mixedly.

(5) The machine side resin portion may be made of any materials as far as it is an insulating member including resin. Further, like the first embodiment, the single machine side resin portion may cover the machine side plate surfaces of the two heat radiation plate portions 21d and 22d. Alternatively, separate machine side resin portions may cover the heat radiation plate portions 21d and 22d, respectively. The same applies to the pack side resin portion.

Regarding the pack side resin portion, it is not essential that the pack side plate surfaces of the heat radiation plate portions 21d and 22d are entirely covered, but the pack side plate surfaces may be exposed partially.

The pack side resin portion and the machine side resin portion are not essential and can be omitted.

(6) It is not essential to provide the heat radiation plate portion vertically to the connection plate portion. An angle made by the plate surface of the connection plate portion and the plate surface of the heat radiation plate portion may be other than 90 degrees. It is not essential that the heat radiation plate portion is provided within the range between the plate surfaces of the connection plate portions. For example, the positive electrode side heat radiation plate portion 21*d* may extend not to the side of the negative electrode connecting terminal 22 but to the side opposite to the negative electrode connecting terminal 22 side. Further, it is not essential that the heat radiation plate portions are positioned on the same plane.

(7) Regarding the positive electrode connecting terminal and the negative electrode connecting terminal, the connection between the connection plate portion and the heat radiation plate portion may be completed in various ways. According to the above embodiments, the heat radiation plate portion is configured extending integrally from the connection plate portion. However, the connection plate portion and the heat radiation plate portion may be separate components and may be connected to each other in various connecting ways.

For example, the connection plate portion and the heat radiation plate portion may be bonded to each other by an adhesive. As another example, the connection plate portion and the heat radiation plate portion may be fixed to each other by a rivet, a screw, and so on. As still further example, the connection plate portion and the heat radiation plate portion may be connected to each other in various ways by which both can be connected thermally.

(8) The heat radiation plate portion may be configured based upon a combination of various shapes described according to the above embodiments. For example, one heat radiation plate portion may have a curved range and a flat plate-shaped range mixedly. Still further, one heat radiation plate portion may be in a folded-back shape as described above in the fifth embodiment and have a plate surface partially or entirely in a curved shape. Still further, one heat radiation member may have ranges having different plate thicknesses. Still further, it is not essential that the positive electrode side heat radiation plate portion and the negative electrode side heat radiation plate portion are in the same shape, and yet both may have different shapes. For example, the positive electrode side heat radiation plate portion may be in a curved shape and the negative electrode side heat radiation plate portion may be in a folded back shape.

It is not essential that the positive electrode side connection plate portion 21*a* and the negative electrode side connection plate portion 22*a* have the respective heat radiation plate portions. One of the positive electrode side connection plate portion 21*a* and the negative electrode side connection plate portion 22*a* may be provided with the heat radiation plate portion.

(8) According to the above embodiments, the motor and the controller are described as the load portion. However, these are merely one example of the load portion. There may be other load portions operated by electric power supplied from the battery 57.

(9) The battery pack 50 according to the above embodiments are merely one example of the battery pack. The battery pack may be configured to have a battery, to be attachable to and detachable from the machine body, to include the positive electrode terminal connected to the positive electrode of the battery and the negative electrode terminal connected to the negative electrode of the battery, and to include the positive electrode terminal and the negative electrode terminal connected to the respective connecting terminals of the terminal block of the machine body when the battery pack is mounted on the machine body.

The shape, quantity and position of the positive electrode terminal and the negative electrode terminal of the battery pack are not limited to the configuration of the battery pack 50 of the above described embodiments. The battery of the battery pack may have a single battery cell or a plurality of cells connected in series, in parallel, or in series and parallel.

According to the above embodiments, the control board 58 is equipped in the battery pack 50. However, the control board 58 is not necessarily mounted in the battery pack 50. The battery pack may have only two types of positive electrode terminal and negative electrode terminal as the terminal connected to the machine body. Further, the battery pack may have at least one type of terminal as well as the positive electrode terminal and the negative electrode terminal.

The battery pack is not limited to the configuration of the battery pack 50 of the above embodiments in which various components such as the battery and the positive and negative terminals are provided in the single casing. For example, a casing housing a battery and a casing having positive and negative terminals are connected to each other by electric wirings.

(10) According to the above embodiments, the grinder 1 and the driver drill 100 are illustrated as the electric working machine. However, these are merely one example. The present disclosure is applicable to various types of electric working machines which the battery pack is attachable to and detachable from.

(11) Functions of the single component according to the above embodiments may be distributed to a plurality of components, and functions of the plurality of components may be integrated to the single component. Further, at least a part of the configurations of the above embodiments may be replaced by a known configuration having the same function. Still further, a part of the configurations of the above embodiments may be omitted. Still further, at least a part of the configurations of the above embodiments may be added to or replaced to the configurations of the other embodiment. Still further, all modes contained in technical ideas specified by the text only described in the scope of claims are the embodiments of the present disclosure.

(12) The present disclosure can be achieved by various modes, such as a system having the grinder 1 or the driver drill 100 as a component, a terminal block configuring the grinder 1 or the driver drill 100, at least one component configuring the terminal block, and so on, other than the grinder 1 or the driver drill 100.

The invention claimed is:

1. An electric working machine comprising:
   a mounting portion configured so that a battery pack is attachable thereto and detachable therefrom; and
   a terminal block including:
      a positive electrode connecting terminal configured to connect to a positive electrode terminal of the battery pack when the battery pack is mounted on the mounting portion, the positive electrode connecting terminal including a plate-shaped positive electrode side connection plate portion configured to contact the positive electrode terminal when the battery pack is mounted on the mounting portion;
      a negative electrode connecting terminal configured to connect to a negative electrode terminal of the battery pack when the battery pack is mounted on the mounting portion, the negative electrode connecting terminal including a negative electrode side connection plate portion that is a plate-shaped member configured to contact the negative electrode terminal when the battery pack is mounted on the mounting portion and is arranged at a distance relative to the positive electrode side connection plate portion so that a plate surface of the negative electrode side connection plate portion faces and is parallel with the positive electrode side connection plate portion;

a first heat radiation plate portion that is a plate-shaped member provided at a first heat radiation object in a thermally conductive manner, the first heat radiation object being the positive electrode side connection plate portion or the negative electrode side connection plate portion; and a machine side resin portion that is an insulating member including a resin and is configured to cover a machine side plate surface that is a plate surface of the first heat radiation plate portion and that does not face the battery pack when the battery pack is mounted on the mounting portion, wherein the first heat radiation plate portion is configured such that a plate surface of the first heat radiation plate portion is non-parallel to a plate surface of the first heat radiation object and the first heat radiation plate portion faces the battery pack when the battery pack is mounted on the mounting portion, the first heat radiation plate portion is configured so as to exist within a range between a plane including the plate surface of the positive electrode side connection plate portion and a plane including the plate surface of the negative electrode side connection plate portion, a surface of the machine side resin portion includes at least one recess, and at least one of the at least one recess penetrates the machine side resin portion.

2. An electric working machine comprising:

a mounting portion configured so that a battery pack is attachable thereto and detachable therefrom; and a terminal block including:

a positive electrode connecting terminal configured to connect to a positive electrode terminal of the battery pack when the battery pack is mounted on the mounting portion, the positive electrode connecting terminal including a plate-shaped positive electrode side connection plate portion configured to contact the positive electrode terminal when the battery pack is mounted on the mounting portion;

a negative electrode connecting terminal configured to connect to a negative electrode terminal of the battery pack when the battery pack is mounted on the mounting portion, the negative electrode connecting terminal including a negative electrode side connection plate portion that is a plate-shaped member configured to contact the negative electrode terminal when the battery pack is mounted on the mounting portion and is arranged at a distance relative to the positive electrode side connection plate portion so that a plate surface of the negative electrode side connection plate portion faces and is parallel with the positive electrode side connection plate portion; and a first heat radiation plate portion that is a plate-shaped member provided at a first heat radiation object in a thermally conductive manner, the first heat radiation object being the positive electrode side connection plate portion or the negative electrode side connection plate portion, the first heat radiation plate portion and the first heat radiation object being formed integrally as a single component, wherein the first heat radiation plate portion is folded back in a U-shape.

3. An electric working machine comprising:

a mounting portion configured so that a battery pack is attachable thereto and detachable therefrom;

a terminal block including:

a positive electrode connecting terminal configured to connect to a positive electrode terminal of the battery pack when the battery pack is mounted on the mounting portion, the positive electrode connecting terminal including a plate-shaped positive electrode side connection plate portion configured to contact the positive electrode terminal when the battery pack is mounted on the mounting portion;

a negative electrode connecting terminal configured to connect to a negative electrode terminal of the battery pack when the battery pack is mounted on the mounting portion, the negative electrode connecting terminal including a negative electrode side connection plate portion that is a plate-shaped member configured to contact the negative electrode terminal when the battery pack is mounted on the mounting portion and is arranged at a distance relative to the positive electrode side connection plate portion so that a plate surface of the negative electrode side connection plate portion faces and is parallel with the positive electrode side connection plate portion;

a first heat radiation plate portion that is a plate-shaped member provided at a first heat radiation object in a thermally conductive manner, the first heat radiation object being the positive electrode side connection plate portion or the negative electrode side connection plate portion, the first heat radiation plate portion and the first heat radiation object being formed integrally as a single component; and a terminal holding member that is an insulating member including a resin and is configured to hold the positive electrode connecting terminal and the negative electrode connecting terminal;

a housing that is provided with the mounting portion and the terminal block and houses therein a load portion configured to operate by electric power supplied from the battery pack via the terminal block;

a controller provided inside the housing and configured to control electric power supply from the battery pack to the load portion; and a heat radiation member that is provided to contact both of the terminal holding member and the controller and is configured to radiate heat generated at the terminal block to the controller.

4. An electric working machine comprising:

a mounting portion configured so that a battery pack is attachable thereto and detachable therefrom;

a terminal block including:

a positive electrode connecting terminal configured to connect to a positive electrode terminal of the battery pack when the battery pack is mounted on the mounting portion, the positive electrode connecting terminal including a plate-shaped positive electrode side connection plate portion configured to contact the positive electrode terminal when the battery pack is mounted on the mounting portion;

a negative electrode connecting terminal configured to connect to a negative electrode terminal of the battery pack when the battery pack is mounted on the mounting portion, the negative electrode connecting terminal including a negative electrode side connection plate portion that is a plate-shaped member configured to contact the negative electrode terminal when the battery pack is mounted on the mounting portion and is arranged at a distance relative to the positive electrode side connection plate portion so that a plate surface of the negative electrode side connection plate portion faces and is parallel with the positive electrode side connection plate portion;

a first heat radiation plate portion that is a plate-shaped member provided at a first heat radiation object in a thermally conductive manner, the first heat radiation object being the positive electrode side connection plate portion or the negative electrode side connection plate portion, the first heat radiation plate portion and the first heat radiation object being formed integrally as a single component; and a terminal holding member that is an insulating member including a resin and is configured to hold the positive electrode connecting terminal and the negative electrode connecting terminal;

a housing that is provided with the mounting portion and the terminal block; and a heat radiation member that is provided to contact both of the terminal holding member and the housing and is configured to radiate heat generated at the terminal block to the housing, wherein the terminal holding member includes at least one rib that restrains movement of the heat radiation member in a specific direction, and the heat radiation member is arranged to the terminal holding member at a specific position defined by the at least one rib.

5. An electric working machine comprising:
a mounting portion configured so that a battery pack is attachable thereto and detachable therefrom;
a terminal block including:
   a positive electrode connecting terminal configured to connect to a positive electrode terminal of the battery pack when the battery pack is mounted on the mounting portion, the positive electrode connecting terminal including a plate-shaped positive electrode side connection plate portion configured to contact the positive electrode terminal when the battery pack is mounted on the mounting portion;
   a negative electrode connecting terminal configured to connect to a negative electrode terminal of the battery pack when the battery pack is mounted on the mounting portion, the negative electrode connecting terminal including a negative electrode side connection plate portion that is a plate-shaped member configured to contact the negative electrode terminal when the battery pack is mounted on the mounting portion and is arranged at a distance relative to the positive electrode side connection plate portion so that a plate surface of the negative electrode side connection plate portion faces and is parallel with the positive electrode side connection plate portion;
   a first heat radiation plate portion that is a plate-shaped member provided at a first heat radiation object in a thermally conductive manner, the first heat radiation object being the positive electrode side connection plate portion or the negative electrode side connection plate portion; and
   a terminal holding member that is an insulating member including a resin and is configured to hold the positive electrode connecting terminal and the negative electrode connecting terminal;
a housing provided with the mounting portion and the terminal block; and
a heat radiation member that is provided to contact both of the terminal holding member and the housing and is configured to radiate heat generated at the terminal block to the housing.

6. An electric working machine comprising:
a mounting portion configured so that a battery pack is attachable thereto and detachable therefrom;
a terminal block including:
   a positive electrode connecting terminal configured to connect to a positive electrode terminal of the battery pack when the battery pack is mounted on the mounting portion, the positive electrode connecting terminal including a plate-shaped positive electrode side connection plate portion configured to contact the positive electrode terminal when the battery pack is mounted on the mounting portion;
   a negative electrode connecting terminal configured to connect to a negative electrode terminal of the battery pack when the battery pack is mounted on the mounting portion, the negative electrode connecting terminal including a negative electrode side connection plate portion that is a plate-shaped member configured to contact the negative electrode terminal when the battery pack is mounted on the mounting portion and is arranged at a distance relative to the positive electrode side connection plate portion so that a plate surface of the negative electrode side connection plate portion faces and is parallel with the positive electrode side connection plate portion;
   a first heat radiation plate portion that is a plate-shaped member provided at a first heat radiation object in a thermally conductive manner, the first heat radiation object being the positive electrode side connection plate portion or the negative electrode side connection plate portion; and
   a terminal holding member that is an insulating member including a resin and is configured to hold the positive electrode connecting terminal and the negative electrode connecting terminal;
a housing that is provided with the mounting portion and the terminal block and houses therein a load portion configured to operate by electric power supplied from the battery pack via the terminal block;
a controller provided inside the housing and configured to control electric power supply from the battery pack to the load portion; and
a heat radiation member that is provided to contact both of the terminal holding member and the controller and is configured to radiate heat generated at the terminal block to the controller.

* * * * *